United States Patent
Mazzaferri

(10) Patent No.: US 8,341,208 B2
(45) Date of Patent: *Dec. 25, 2012

(54) METHODS AND SYSTEMS FOR PROVIDING, BY A REMOTE MACHINE, ACCESS TO FUNCTIONALITY ASSOCIATED WITH A RESOURCE EXECUTING ON A LOCAL MACHINE

(75) Inventor: Richard James Mazzaferri, Mooney Mooney (AU)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/240,971

(22) Filed: Sep. 22, 2011

(65) Prior Publication Data

US 2012/0011198 A1  Jan. 12, 2012

Related U.S. Application Data

(62) Division of application No. 12/210,181, filed on Sep. 12, 2008, now Pat. No. 8,046,403.

(60) Provisional application No. 60/971,688, filed on Sep. 12, 2007, provisional application No. 61/054,402, filed on May 19, 2008.

(51) Int. Cl.
*G06F 15/16* (2006.01)
(52) U.S. Cl. ........ 709/202; 709/200; 715/734; 715/740; 718/100; 719/328; 719/330
(58) Field of Classification Search .................. 709/200, 709/202; 715/734, 740; 718/100; 719/328, 719/330
See application file for complete search history.

(56) References Cited

U.S. PATENT DOCUMENTS

| | | | |
|---|---|---|---|
| 5,181,200 | A | 1/1993 | Harrison |
| 5,218,637 | A | 6/1993 | Angebaud et al. |
| 5,280,627 | A | 1/1994 | Flaherty et al. |
| 5,341,477 | A | 8/1994 | Pitkin et al. |
| 5,404,527 | A | 4/1995 | Irwin et al. |
| 5,408,602 | A | 4/1995 | Giokas et al. |
| 5,613,090 | A | 3/1997 | Willems |
| 5,757,916 | A | 5/1998 | MacDoran et al. |
| 5,764,230 | A | 6/1998 | Baradel et al. |

(Continued)

FOREIGN PATENT DOCUMENTS

CA 2351078 A1 5/2000

(Continued)

OTHER PUBLICATIONS

Restriction Requirement DTD Apr. 18, 2011.

(Continued)

*Primary Examiner* — John Follansbee
*Assistant Examiner* — Anthony Mejia
(74) *Attorney, Agent, or Firm* — Foley and Lardner LLP; John D. Lanza

(57) ABSTRACT

A method for providing, by a remote machine, access to functionality associated with a resource executing on a local machine includes receiving, by a remote agent executing on a remote machine, an identification of a shell extension associated with a resource provided by a local machine. The remote agent installs a proxy handler associated with the identified shell extension. The proxy handler receives a request for access to the shell extension and redirects the request to a shell extension invoker executing on the local machine.

27 Claims, 29 Drawing Sheets

U.S. PATENT DOCUMENTS

| | | | |
|---|---|---|---|
| 5,784,562 A | 7/1998 | Diener | |
| 5,812,129 A * | 9/1998 | Kacor et al. | 715/810 |
| 5,838,916 A * | 11/1998 | Domenikos et al. | 709/219 |
| 5,887,065 A | 3/1999 | Audebert | |
| 5,909,545 A | 6/1999 | Frese et al. | |
| 5,987,611 A | 11/1999 | Freund | |
| 6,021,495 A | 2/2000 | Jain et al. | |
| 6,029,175 A | 2/2000 | Chow et al. | |
| 6,070,245 A | 5/2000 | Murphy et al. | |
| 6,072,486 A | 6/2000 | Sheldon et al. | |
| 6,076,108 A | 6/2000 | Courts et al. | |
| 6,105,136 A | 8/2000 | Cromer et al. | |
| 6,110,229 A | 8/2000 | Yamaguchi | |
| 6,141,758 A | 10/2000 | Benantar et al. | |
| 6,145,083 A | 11/2000 | Shaffer et al. | |
| 6,161,182 A | 12/2000 | Nadooshan | |
| 6,195,694 B1 | 2/2001 | Chen et al. | |
| 6,199,113 B1 | 3/2001 | Alegre et al. | |
| 6,253,326 B1 | 6/2001 | Lincke et al. | |
| 6,295,276 B1 | 9/2001 | Datta et al. | |
| 6,304,969 B1 | 10/2001 | Wasserman et al. | |
| 6,329,984 B1 * | 12/2001 | Boss et al. | 715/723 |
| 6,345,291 B2 | 2/2002 | Murphy et al. | |
| 6,393,569 B1 | 5/2002 | Orenshteyn | |
| 6,418,472 B1 | 7/2002 | Mi et al. | |
| 6,437,803 B1 | 8/2002 | Panasyuk et al. | |
| 6,470,453 B1 | 10/2002 | Vilhuber | |
| 6,480,967 B1 | 11/2002 | Jensen et al. | |
| 6,493,341 B1 | 12/2002 | Datta et al. | |
| 6,505,241 B2 | 1/2003 | Pitts | |
| 6,615,255 B1 * | 9/2003 | Blaszczak | 709/220 |
| 6,697,806 B1 * | 2/2004 | Cook | 1/1 |
| 6,725,238 B1 * | 4/2004 | Auvenshine | 1/1 |
| 6,782,411 B2 * | 8/2004 | Navare et al. | 709/203 |
| 6,826,624 B1 | 11/2004 | Fell, Jr. | |
| 6,856,330 B1 | 2/2005 | Chew et al. | |
| 6,873,988 B2 | 3/2005 | Herrmann et al. | |
| 6,886,024 B1 * | 4/2005 | Fujita et al. | 709/201 |
| 6,918,113 B2 | 7/2005 | Patel et al. | |
| 6,947,992 B1 | 9/2005 | Shachor | |
| 6,950,990 B2 | 9/2005 | Rajarajan et al. | |
| 6,950,991 B2 * | 9/2005 | Bloomfield et al. | 715/738 |
| 6,959,320 B2 | 10/2005 | Shah et al. | |
| 6,996,778 B2 | 2/2006 | Rajarajan et al. | |
| 7,043,524 B2 | 5/2006 | Shah et al. | |
| 7,069,560 B1 * | 6/2006 | Cheyer et al. | 719/317 |
| 7,093,020 B1 | 8/2006 | McCarty et al. | |
| 7,149,771 B1 | 12/2006 | Gifford | |
| 7,149,803 B2 | 12/2006 | Douglis et al. | |
| 7,188,138 B1 | 3/2007 | Schneider | |
| 7,194,552 B1 | 3/2007 | Schneider | |
| 7,240,150 B1 | 7/2007 | Todd et al. | |
| 7,331,061 B1 | 2/2008 | Ramsey et al. | |
| 7,343,486 B1 | 3/2008 | McCarty et al. | |
| 7,386,889 B2 | 6/2008 | Shay | |
| 7,454,706 B1 * | 11/2008 | Matthews et al. | 715/713 |
| 7,681,134 B1 | 3/2010 | Grechishkin et al. | |
| 7,698,388 B2 * | 4/2010 | Hoover et al. | 709/219 |
| 7,725,527 B2 * | 5/2010 | Janssen et al. | 709/203 |
| 7,757,004 B2 * | 7/2010 | Mahajan et al. | 709/248 |
| 7,757,293 B2 * | 7/2010 | Caceres et al. | 726/25 |
| 7,813,964 B2 * | 10/2010 | Son-Bell et al. | 705/26.8 |
| 7,908,315 B2 * | 3/2011 | Parkinson | 709/203 |
| 2001/0020274 A1 * | 9/2001 | Shambroom | 713/201 |
| 2001/0049741 A1 | 12/2001 | Skene et al. | |
| 2001/0052016 A1 | 12/2001 | Skene et al. | |
| 2001/0054147 A1 | 12/2001 | Richards | |
| 2002/0023225 A1 | 2/2002 | Lomnes | |
| 2002/0026572 A1 * | 2/2002 | Joory | 713/100 |
| 2002/0080822 A1 | 6/2002 | Brown et al. | |
| 2002/0083183 A1 | 6/2002 | Pujare et al. | |
| 2002/0087883 A1 | 7/2002 | Wohlgemuth et al. | |
| 2002/0091763 A1 | 7/2002 | Shah et al. | |
| 2002/0111999 A1 * | 8/2002 | Andersson | 709/203 |
| 2002/0112058 A1 * | 8/2002 | Weisman et al. | 709/227 |
| 2002/0133723 A1 | 9/2002 | Tait | |
| 2002/0146129 A1 | 10/2002 | Kaplan | |
| 2002/0161908 A1 | 10/2002 | Benitez et al. | |
| 2002/0188672 A1 | 12/2002 | Janssen et al. | |
| 2003/0004882 A1 | 1/2003 | Holler et al. | |
| 2003/0005118 A1 | 1/2003 | Williams | |
| 2003/0005300 A1 | 1/2003 | Noble et al. | |
| 2003/0009537 A1 | 1/2003 | Wang | |
| 2003/0009538 A1 | 1/2003 | Shah et al. | |
| 2003/0033351 A1 * | 2/2003 | Ricciardi | 709/202 |
| 2003/0033545 A1 | 2/2003 | Wenisch et al. | |
| 2003/0063750 A1 | 4/2003 | Medvinsky et al. | |
| 2003/0083991 A1 | 5/2003 | Kikinis | |
| 2003/0084165 A1 | 5/2003 | Kjellberg et al. | |
| 2003/0172138 A1 | 9/2003 | McCormack et al. | |
| 2003/0206554 A1 | 11/2003 | Dillon | |
| 2003/0208562 A1 | 11/2003 | Hauck et al. | |
| 2003/0233544 A1 | 12/2003 | Erlingsson | |
| 2004/0107360 A1 | 6/2004 | Herrmann et al. | |
| 2004/0172635 A1 * | 9/2004 | Watt et al. | 719/318 |
| 2004/0215826 A1 | 10/2004 | Pfitzner | |
| 2004/0230797 A1 | 11/2004 | Ofek et al. | |
| 2004/0255048 A1 | 12/2004 | Lev Ran et al. | |
| 2004/0268261 A1 | 12/2004 | Elliott et al. | |
| 2005/0080915 A1 * | 4/2005 | Shoemaker et al. | 709/231 |
| 2005/0273849 A1 | 12/2005 | Araujo et al. | |
| 2006/0005187 A1 | 1/2006 | Neil | |
| 2006/0031165 A1 | 2/2006 | Nave et al. | |
| 2006/0075381 A1 | 4/2006 | Laborczfalvi et al. | |
| 2006/0116991 A1 * | 6/2006 | Calderwood | 707/3 |
| 2006/0143200 A1 * | 6/2006 | Powlette | 707/100 |
| 2006/0224361 A1 * | 10/2006 | McIntyre et al. | 702/183 |
| 2006/0230156 A1 | 10/2006 | Shappir et al. | |
| 2006/0288306 A1 * | 12/2006 | Mahajan et al. | 715/804 |
| 2007/0067255 A1 | 3/2007 | Bissett et al. | |
| 2007/0113269 A1 | 5/2007 | Zhang | |
| 2007/0179955 A1 | 8/2007 | Croft et al. | |
| 2007/0244987 A1 * | 10/2007 | Pedersen et al. | 709/217 |
| 2007/0245409 A1 | 10/2007 | Harris et al. | |
| 2008/0049786 A1 | 2/2008 | Ram et al. | |
| 2008/0148261 A1 * | 6/2008 | Ferlitsch | 718/101 |
| 2008/0222160 A1 | 9/2008 | MacDonald et al. | |
| 2009/0007139 A1 * | 1/2009 | Jacobson et al. | 719/313 |
| 2009/0077174 A1 | 3/2009 | Janssen et al. | |
| 2009/0113320 A1 * | 4/2009 | Gn et al. | 715/762 |
| 2009/0193340 A1 * | 7/2009 | Mahajan et al. | 715/746 |
| 2012/0005269 A1 * | 1/2012 | Janssen et al. | 709/203 |

FOREIGN PATENT DOCUMENTS

| | | |
|---|---|---|
| CA | 2286534 | 4/2001 |
| EP | 1331556 | 7/2003 |
| EP | 1 398 715 A2 | 3/2004 |
| JP | 2004-533054 T | 10/2004 |
| KR | 990003481 | 2/1999 |
| KR | 990068380 | 12/1999 |
| KR | 2000057127 | 9/2000 |
| WO | WO-2006/074072 A3 | 7/2006 |
| WO | WO-2008/051842 A2 | 5/2008 |
| WO | WO-2008/112691 A2 | 9/2008 |
| WO | WO-2008/112698 A2 | 9/2008 |

OTHER PUBLICATIONS

US Office Action DTD Jul. 19, 2011.
International Search Report from PCT/US2008/076326, mailed Apr. 16, 2009.
Written Opinion of the International Searching Authority, from PCT/US2008/076326, dated Apr. 16, 2009.
Restriction Requirement dated Feb. 15, 2011.
US Notice of Allowance dated Oct. 4, 2010.
Foreign Search Report dated Feb. 16, 2011.
Foreign Search Report dated Mar. 2, 2011.
US Notice of Allowance dated Jun. 23, 2011.
US Office Action dated Aug. 17, 2011.
US Office Action dated Aug. 2, 2011.
Office Action on U.S. Appl. No. 12/210,174 dated Jan. 12, 2012.
Office Action on U.S. Appl. No. 12/210,177 dated Jan. 10, 2012.
Office Action on U.S. Appl. No. 12/986,704 dated Mar. 9, 2012.

* cited by examiner

1400

```
┌─────────────────────────────────────┐
│ Receiving, by a Local Agent Executing on a │
│ Local Machine, an Icon Associated with a    │   1410
│ Resource Provided by a Remote Machine       │
└─────────────────────────────────────┘
                  │
                  ▼
┌─────────────────────────────────────┐
│ Incorporating, by the Local Agent, the Icon │
│ Associated with the Resource Provided by the│
│ Remote Machine into a Local Window          │   1420
│ Displaying a Plurality of Icons in a Local  │
│ Desktop Environment, the Plurality of Icons │
│ Including at Least One Icon Associated with a│
│ Resource Provided by the Local Machine      │
└─────────────────────────────────────┘
                  │
                  ▼
┌─────────────────────────────────────┐
│ Re-parenting, by the Local Agent, the Local │
│ Window Displaying the Plurality of Icons in the│   1430
│ Local Desktop Environment to a Window       │
│ Displaying, to a User of the Local Machine, a│
│ Desktop Environment Maintained by the       │
│ Remote Machine and Providing Integrated     │
│ Access to Both Resources Provided by the Local│
│ Machine and Resources Provided by the Remote│
│ Machine                                     │
└─────────────────────────────────────┘
```

```
┌─────────────────────────────────┐
│ Receiving, by a First Agent Executing on a │
│ Remote Machine, an Identification of a Desk │    1610
│ Band Associated with a Resource Provided by a │
│       Local Machine              │
└─────────────────────────────────┘
                 │
                 ▼
┌─────────────────────────────────┐
│ Maintaining, by the First Agent, in │
│ Communication with a Shell Executing on the │
│ Remote Machine, a Taskbar Window in a │
│ Desktop Environment on the Remote machine, │
│ the Taskbar Window Including At Least One │    1620
│ Window Associated With a Resource Provided │
│ by the Remote Machine and Including a │
│ Window Region Representing the Desk Band by │
│ Using Graphical Data Stored on the Remote │
│            Machine               │
└─────────────────────────────────┘
                 │
                 ▼
┌─────────────────────────────────┐
│ Transmitting, by the First Agent, to a Second │
│ Agent Executing on the Local Machine, │
│ Window Attribute Data and Output Data │    1630
│ Associated with the Taskbar Window in the │
│ Desktop Environment on the Remote Machine │
└─────────────────────────────────┘
                 │
                 ▼
┌─────────────────────────────────┐
│ Displaying, by the Second Agent, at Least a │
│ Portion of the Received Output Data in a Local │    1640
│ Window on a Desktop Environment on the │
│           Local Machine          │
└─────────────────────────────────┘
```

1810 Receiving, by a Local Agent Executing on a Local Machine, Window Attribute Data Associated with a Taskbar Window Maintained by a Remote Machine

1820 Displaying, by the Local Agent, to a User of the Local Machine, a First Local Window Representing the Taskbar Window Maintained on the Remote Machine, Responsive to the Received Window Attribute Data

1830 Re-Parenting by the Local Agent, a Second Local Window Displaying a Desk Band Associated With a Resource Provided by the Local Machine, to the First Local Window Representing the Taskbar Window Maintained on the Remote Machine

*Fig. 18*

METHODS AND SYSTEMS FOR PROVIDING, BY A REMOTE MACHINE, ACCESS TO FUNCTIONALITY ASSOCIATED WITH A RESOURCE EXECUTING ON A LOCAL MACHINE

RELATED APPLICATIONS

The present application is a divisional of and claims priority to U.S. patent application Ser. No. 12/210,181, entitled "Methods and Systems for Providing, by a Remote Machine, Access to Functionality Associated with a Resource Executing on a Local Machine", filed Sep. 12, 2008, which itself claims priority to: U.S. Provisional Patent Application Ser. No. 60/971,688, entitled "Methods and Systems for Generating Desktop Environments Providing Integrated Access to Remote and Local Resources," filed Sep. 12, 2007; and also to U.S. Provisional Patent Application Ser. No. 61/054,402, entitled "Methods and Systems For Generating Desktop Environments Providing Integrated Access to Remote and Local Resources and Associated Graphical User Interface Elements," filed May 19, 2008, all of which are incorporated herein by reference in their entirety.

FIELD OF THE INVENTION

The present disclosure relates to methods and systems for generating desktop environments. In particular, the present disclosure relates to methods and systems for generating a remote desktop environment on a remote machine for display on a local machine, the remote desktop environment providing integrated access both to resources provided by the local machine and to resources provided by the remote machine.

BACKGROUND

Conventional efforts to combine output data from various remote machines with output data generated on a client machine into a single display do not typically display an integrated desktop environment. One system providing segregated access to remote and local applications is the RES POWERFUSE product manufactured by Real Enterprise Solutions Development B.V. of the Netherlands. However, rather than provide a single, integrated desktop environment displaying output data in a combined windowing environment, the RES POWERFUSE product displays local windows either on top of a display of a remote desktop, or to be minimized. As a result, a local window is not typically visible when a user focuses on a remote window, which is frustrating and counter-intuitive for WINDOWS users. Additionally, the RES POWERFUSE may be limited to environments running the WINDOWS operating systems.

SUMMARY

In one aspect, a method for providing, in a networked computing system, by a remote machine, access to functionality associated with a resource executing on a local machine, includes receiving, by a remote agent executing on a remote machine, an identification of a shell extension associated with a resource provided by a local machine. The method includes installing, by the remote agent, a proxy handler associated with the identified shell extension. The method includes receiving, by the proxy handler, a request for access to the shell extension. The method includes redirecting, by the proxy handler, the request to a shell extension invoker executing on the local machine.

In one embodiment, the method includes receiving, by the proxy handler, a result of executing the shell extension on the local machine. In another embodiment, the method includes displaying, in a desktop environment generated by the remote machine, a received result of executing the shell extension on the local machine. In another embodiment, the method includes receiving, by the proxy handler from a shell, the request for access to the shell extension. In still another embodiment, the method includes intercepting a request for an identification of a handler.

In another aspect, a networked computing system for providing, by a remote machine, access to functionality associated with a resource executing on a local machine includes a remote agent, a shell extension invoker, and a proxy handler. The remote agent executes on a remote machine and receives an identification of a shell extension associated with a resource provided by a local machine. The shell extension invoker residing on the local machine and associated with the identified shell extension. The proxy handler, installed by the remote agent, associated with the identified shell extension, receiving a request for access to the shell extension, and redirecting the received request to the shell extension invoker. In one embodiment, the remote agent integrates a display of the result into a desktop environment generated by the remote machine.

In still another aspect, a method for providing, in a networked computing system, by a remote machine, access to functionality associated with a resource executing on a local machine, includes receiving, by a remote agent executing on a remote machine, information associated with a context menu handler associated with a resource provided by a local machine. The method includes installing, by the remote agent, a proxy handler associated with the context menu handler, responsive to the received information. The method includes modifying, by the remote agent, at least one registry entry on the remote machine, responsive to the received information. The method includes receiving, by a shell, a request for a display of a context menu, the request generated on the local machine. The method includes generating, by the shell on the remote machine, graphical data representing the requested context menu, responsive to at least one modified registry entry. The method includes transmitting, by the remote agent, to a local agent on the local machine, the generated graphical data. The method includes integrating, by the local agent, the generated graphical data into a local display of a desktop environment providing integrated access both to resources provided by the remote machine and to resources provided by the local machine.

In one embodiment, the method includes receiving, by the proxy handler, from the shell, a request for execution of a command associated with the context menu associated with the resource provided by the local machine. In another embodiment, the method includes redirecting, by the proxy handler, the request to a verb invoker executing on the local machine. In still another embodiment, the method includes executing, by the verb invoker, the command. In yet another embodiment, the method includes integrating, into a desktop environment of the remote machine, a result of executing the command on the local machine.

In yet another aspect, a method for providing, in a networked computing system, by a remote machine, access to functionality associated with a resource executing on a local machine, includes receiving, by a remote agent executing on a remote machine, information associated with a context menu handler associated with a resource provided by the local machine. The method includes installing, by the remote agent, a proxy handler associated with the context menu handler, responsive to the received information. The method includes receiving, by a shell on the remote machine, from the remote agent, a request for a display of a context menu. The method includes receiving, by the shell on the remote machine, from the proxy handler, data associated with the context menu. The method includes generating, by the shell on the remote machine, graphical data representing the requested context menu, responsive to the data associated with the context menu. The method includes transmitting, by the remote agent, to a local agent on the local machine, the generated graphical data. The method includes integrating, by the local agent, the generated graphical data into a local display of a desktop environment providing integrated access both to resources provided by the remote machine and to resources provided by the local machine.

In one embodiment, the method includes receiving, by the proxy handler, from the shell, a request for execution of a command associated with a context menu item in the context menu associated with the resource provided by the local machine. In another embodiment, the method includes redirecting, by the proxy handler, the request to a verb invoker executing on the local machine. In still another embodiment, the method includes executing, by the verb invoker, the command. In yet another embodiment, the method includes integrating, into a desktop environment of the remote machine, a result of executing the command on the local machine.

In one aspect, a networked computing system for providing, by a remote machine, access to functionality associated with a resource executing on a local machine includes a remote agent, a proxy handler, a shell on the remote machine, and a local agent on the local machine. The remote agent executes on the remote machine, receives information associated with a context menu handler associated with a resource provided by a local machine, and modifies at least one registry entry on the remote machine responsive to the received information. The proxy handler is associated with the context menu handler and is installed by the remote agent. The shell on the remote machine i) receives from the remote agent, a request for a display of a context menu, the request generated on the local machine, ii) generates graphical data representing the requested context menu, responsive to the modified at least one registry entry. The local agent on the local machine receiving, from the remote agent, the generated graphical data and integrating the generated graphical data into a local display of a desktop environment providing integrated access both to resources provided by the remote machine and resources provided by the local machine.

In one embodiment, the proxy handler is a static verb proxy handler. In another embodiment, the system includes a verb invoker executing on the local machine. In still another embodiment, the proxy handler receives a request for execution of a command associated with the context menu handler and redirects the request to the verb invoker for execution on the local machine.

In another aspect, a networked computing system for providing, by a remote machine, access to functionality associated with a resource executing on a local machine includes a remote agent, a proxy handler, a shell on the remote machine, and a local agent on the local machine. The remote agent executes on the remote machine and receives information associated with a context menu handler associated with a resource provided by a local machine. The proxy handler is associated with context menu handler and is installed by the remote agent. The shell on the remote machine i) receives from the remote agent, a request for a display of a context menu, ii) receives, from the proxy handler, data associated with the context menu, and iii) generates graphical data representing the requested context menu, responsive to the received data associated with the context menu. The local agent on the local machine receives, from the remote agent, the generated graphical data and integrates the generated graphical data into a local display of a desktop environment providing integrated access both to resources provided by the remote machine and resources provided by the local machine. In one embodiment, the proxy handler is a dynamic verb proxy handler associated with the context menu handler and installed by the remote agent. In another embodiment, the system includes a verb invoker executing on the local machine. In still another embodiment, the proxy handler receives a request for execution of a command associated with a context menu item in the context menu and redirects the request to the verb invoker for execution on the local machine.

In still another aspect, a method for providing, in a networked computing system, by a local machine, access to functionality associated with a resource executing on a remote machine, includes receiving, by a local agent executing on a local machine, information associated with a context menu handler associated with a resource provided by the remote machine. The method includes installing, by the local agent, a proxy handler associated with the context menu handler, responsive to the received information. The method includes receiving, by a shell, a request for a display of a context menu, the request generated on the local machine. The method includes receiving, by the shell, from the proxy handler, data associated with the context menu. The method includes generating, by the shell, graphical data representing the requested context menu, responsive to the data associated with the context menu. The method includes integrating, by a local agent on the local machine, the generated graphical data into a local display of a desktop environment providing integrated access both to resources provided by the remote machine and to resources provided by the local machine. The method includes receiving, by the proxy handler, from the shell, a request for execution of a command associated with the context menu associated with the resource provided by the remote machine. The method includes redirecting, by the proxy handler, the request to a verb invoker executing on the remote machine. The method includes executing, by the shell, in communication with the verb invoker, the command.

BRIEF DESCRIPTION OF THE DRAWINGS

The foregoing and other objects, aspects, features, and advantages of the disclosed embodiments will become more apparent and better understood by referring to the following description taken in conjunction with the accompanying drawings, in which:

FIG. 14 is a flow diagram depicting an embodiment of a method for providing, by a local machine, access to graphical data associated with a resource provided by a remote machine.

FIG. 16 is a flow diagram depicting an embodiment of a method for providing, by a remote machine, access to a desk band associated with a resource executing on a local machine;

FIG. 18 is a flow diagram depicting an embodiment of a method for providing, by a remote machine, access to a desk band associated with a resource executing on a local machine;

DETAILED DESCRIPTION

Figure 1A:
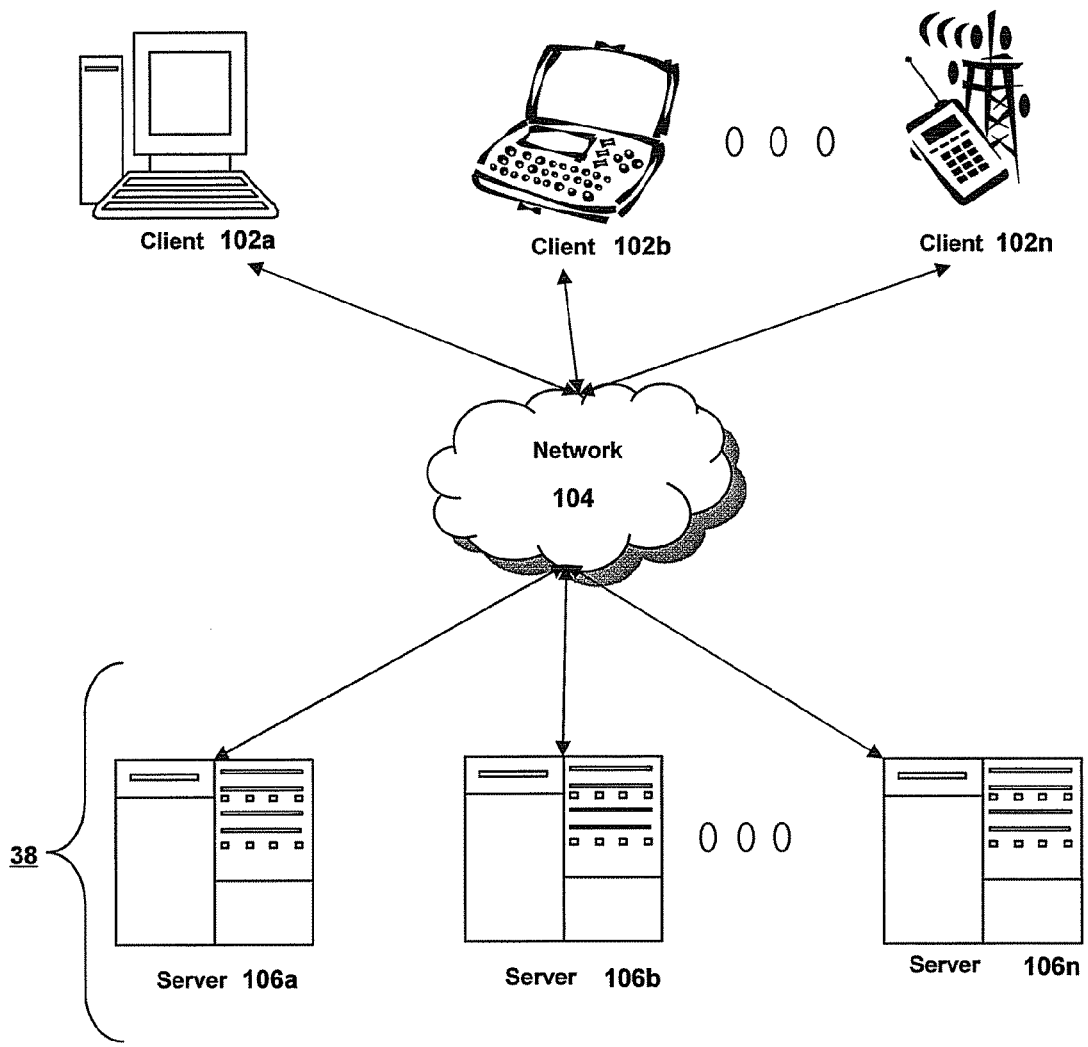
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the server 106 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

A server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates with one of the servers 106 in a farm 38. Over the network 104, the client 102 can, for example, request execution of various applications hosted by the servers 106a-106n in the farm 38 and receive output data of the results of the application execution for display. In one embodiment, the client 102 executes a program neighborhood application to communicate with a server 106 in a farm 38.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment, the server 106 may display output data to the client 102 using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
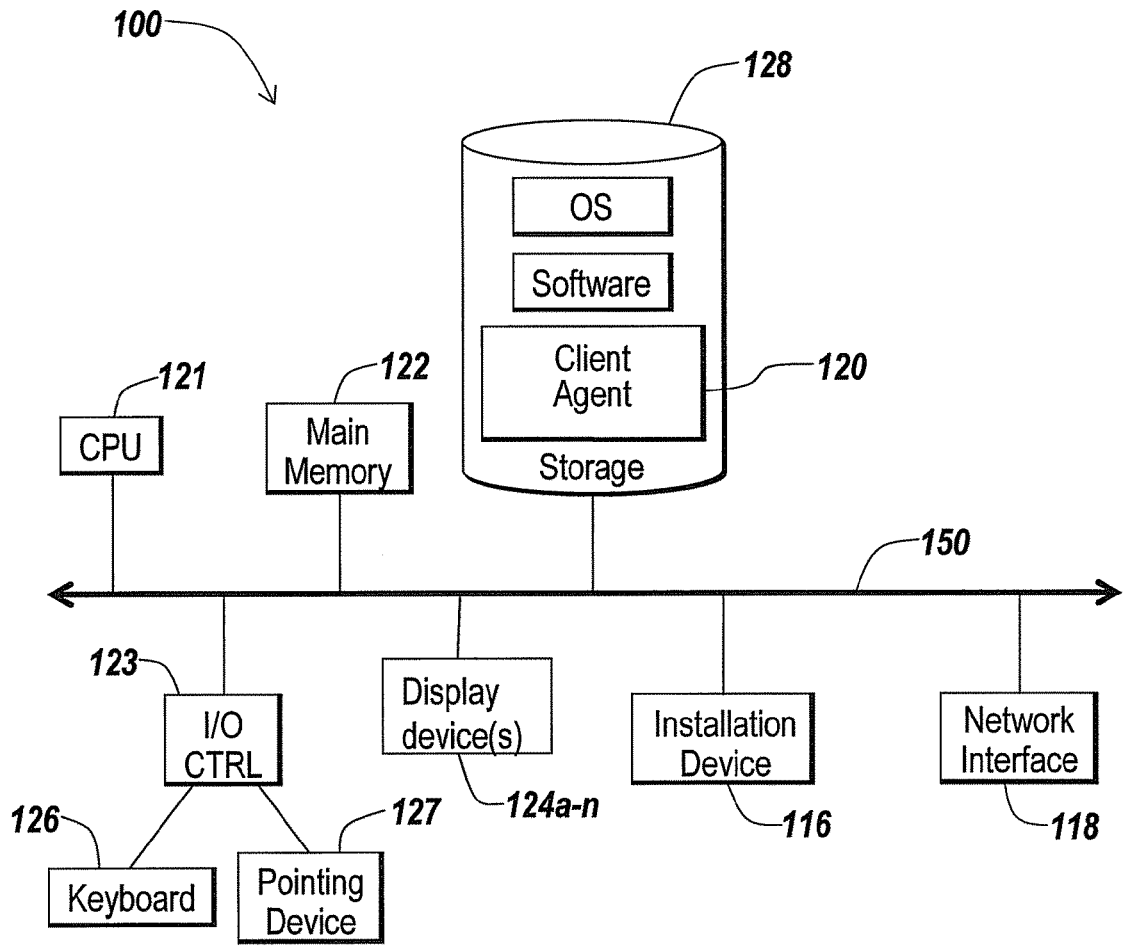
FIGS. 1B and 1C are block diagrams depicting embodiments of computers useful in connection with the methods and systems described herein.
Figure 1C:
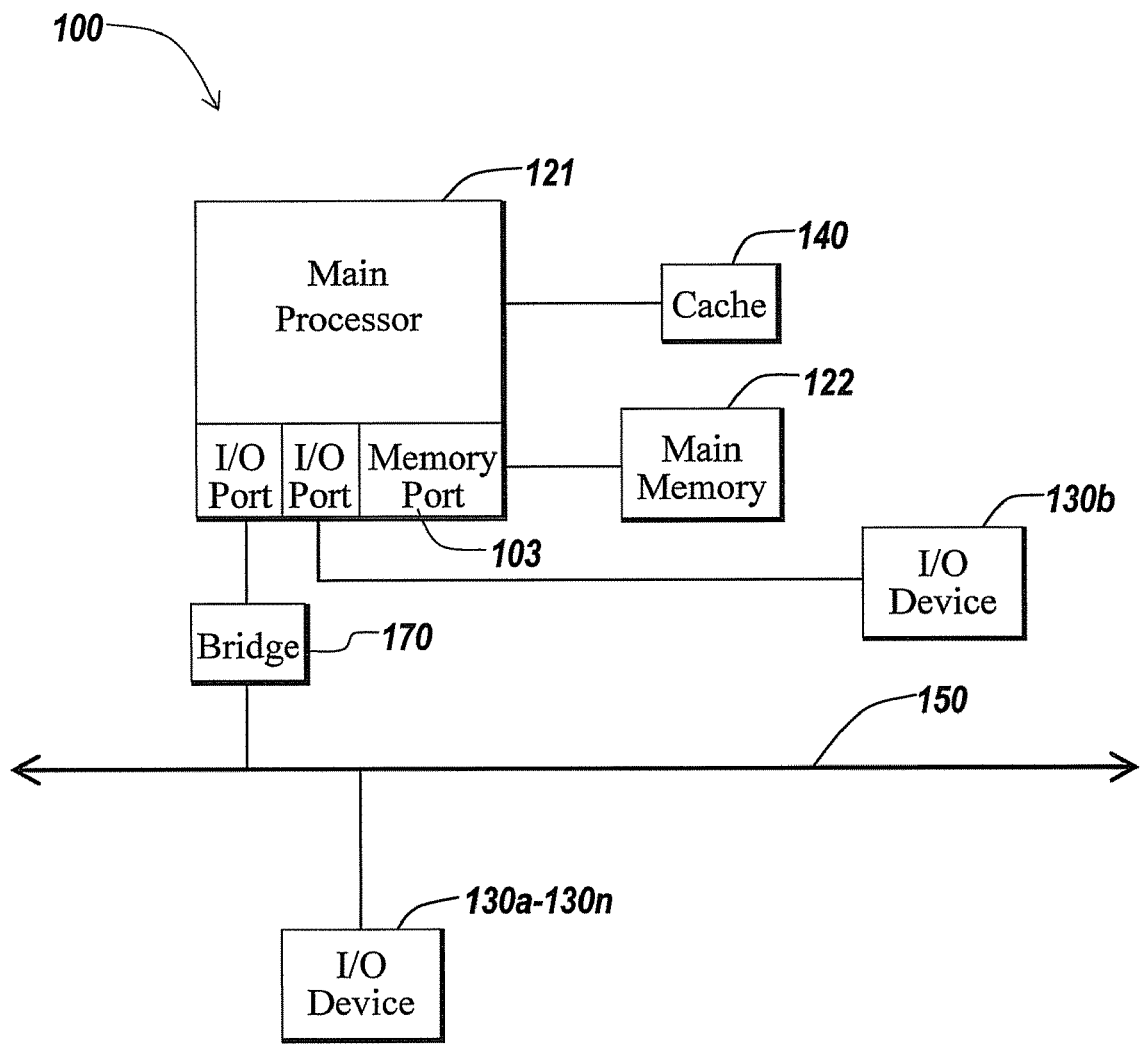

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, Flash memory, or EEPROMs, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11 g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PALM operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry PEARL 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming, or delivering the application locally to the client 102 for local execution.

Figure 2A:
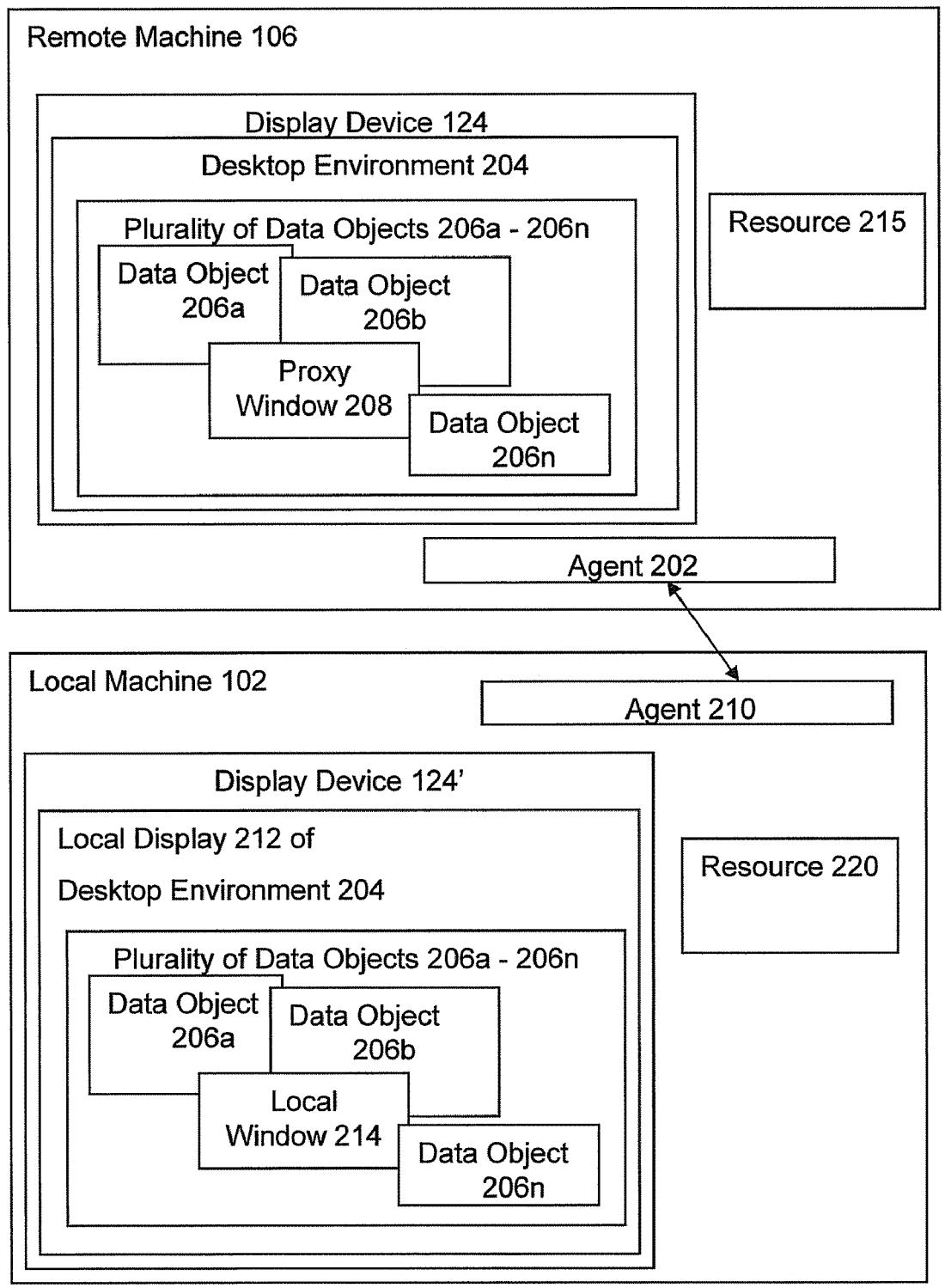
FIG. 2A is a block diagram depicting an embodiment of a system for maintaining an integrated desktop environment on a remote machine for display on a local machine.

Referring now to FIG. 2A, a block diagram depicts one embodiment of a system for maintaining a full-screen, integrated desktop environment on a remote machine for display on a local machine. In brief overview, the system includes a remote machine 106, a first agent 202, a local machine 102, and a second agent 210. The first agent 202, executing on the remote machine 106, monitors a desktop environment 204, which includes a plurality of data objects 206a-206n and provides access to i) a first resource 215 available to a user of the local machine 102 and provided by the remote machine 106, and ii) a second resource 220 provided by the local machine 102 that is available to the user of the local machine 102. The first agent 202 generates a proxy window 208 in the desktop environment 204. The proxy window 208 represents a local window 214 on the local machine 102 that displays output data generated by the second resource 220 provided by the local machine 102. The first agent 202 executing on the remote machine 106 receives an identification of a change to window attribute data associated with the local window 214 on the local machine 102 that displays output data generated by the second resource 220. The first agent 202 modifies at least one of the plurality of data objects 206a-206n, responsive to the identification of the change. The second agent 210 executing on the local machine 102 receives, from the first agent 202, an identification of the modification to the at least one of the plurality of data objects 206a-206n. The second agent 202 modifies attribute data associated with a data object

206a in the desktop environment displayed by the local machine 102, responsive to the received identification of the modification.

Referring now to FIG. 2A, and in greater detail, the first agent 202, executing on the remote machine 106, monitors the desktop environment 204, which includes a plurality of data objects 206a-206n and provides integrated access to i) a resource 215 available to a user of the local machine 102 and provided by the remote machine 106, and ii) a resource 220 provided by the local machine 102 that is available to the user of the local machine 102. In one embodiment, the remote machine 106 is a server 106. In another embodiment, the local machine 102 is a client device 102, connecting to the server 106 to access one or more resources available to a user of the local machine 102.

In one embodiment, a resource 215, 220 comprises a program, an application, a document, a file, a plurality of applications, a plurality of files, an executable program file, a desktop environment, a computing environment, or other resource made available to a user of the local machine 102. The resource 220 may be delivered to the local machine 102 via a plurality of access methods including, but not limited to, conventional installation directly on the local machine 102, delivery to the local machine 102 via a method for application streaming, delivery to the local machine 102 of output data generated by an execution of the resource 220' on a third machine 106' and communicated to the local machine 102 via a presentation layer protocol, delivery to the local machine 102 of output data generated by an execution of the resource 220 via a virtual machine executing on a remote machine 106, or execution from a removable storage device connected to the local machine 102, such as a USB device, or via a virtual machine executing on the local machine 102 and generating output data. In some embodiments, the local machine 102 transmits output data generated by the execution of the resource 220 to another client machine 102'.

In some embodiments, a user of a local machine 102 connects to a remote machine 106 and views a display on the local machine 102 of a local version 212 of a remote desktop environment 204, comprising a plurality of data objects 206a-n, generated on the remote machine 106. In one of these embodiments, at least one resource is provided to the user by the remote machine 106 (or by a second remote machine 106b, not shown) and displayed in the remote desktop environment 204. However, there may be resources that the user executes on the local machine 102, either by choice, or due to a policy or technological requirement. In another of these embodiments, a user may invoke a local application from the remote desktop interface generated by the remote machine 106 and have the local application appear in the same desktop environment as the remote applications provided by the remote machine 106. In still another of these embodiments, the user of the local machine 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment 204—both those resources generated on the local machine 102 and those generated on the remote machine 106—is shown on the remote desktop environment 204 as if it were executing on, or executable from, the remote desktop environment. For example, a resource may also appear in a listing of available resources provided in a Start Menu, a shortcut may be provided on the desktop or the Quick Launch menu, and the resources can be launched, selected and interacted with in the same way as an application provided by the remote machine 106.

In one embodiment, data objects from a remote machine 106 are integrated into a full-screen desktop environment generated by the local machine 102. In another embodiment, the remote machine 106 maintains the integrated desktop. In still another embodiment, the local machine 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124. In yet another of the embodiments, a resource provided by the second machine 102 may be integrated with one of the plurality of remote desktop environments 204.

In some embodiments, the first agent 202 monitors a desktop environment 204 including a plurality of data objects 206a-206n. In some embodiments, a data object is a window. In one of these embodiments, the data object is a window displayed in the desktop environment 204. In another one of these embodiments, the data object is a data structure storing attribute data and which may or may not have an associated visible representation in the desktop environment 204. In still another of these embodiments, a data object is the data structure storing data associated with a user interface element—visual state, identification of associated functionality, location of graphical data, etc.—and a window is a graphical representation of the user interface element. In still another of these embodiments, a shell executing on a machine 100 provides a display of user interface elements in a desktop environment. In still even another of these embodiments, the shell displays graphical data associated with a data object in accordance with attribute data associated with the data object.

In one embodiment, a window 206a in the plurality of data objects 206a-206n displays the output data generated by an execution of a resource 215 provided by the remote machine 106. In another embodiment, a window 206b in the plurality of data objects 206a-206n displays the output data generated by an execution of a resource provided by a third machine 106', as discussed in further detail below, in connection with FIG. 4. In still another embodiment, a window 206c in the plurality of data objects 206a-206n depicts a taskbar from a desktop environment. In still even another embodiment, a window 206d represents a menu, such as a Start menu or a context-specific menu associated with an application. In yet another embodiment, a window 206e in the plurality of data objects 206a-n has a z-order entry such that it is displayed beneath the other windows in the plurality of data objects 206a-n and depicts a desktop. In other embodiments, the first agent 202 transmits, to the second agent 210, attribute data associated with each of the plurality of data objects 206a-n. In one of these embodiments, the second agent 210 displays a local version of the plurality of data objects 206a-n having attribute data corresponding to the window attribute data received from the first agent 202.

In one of these embodiments, the graphical display and the window attribute data for the plurality of data objects 206a-n and for all data objects in the integrated desktop environment 204 are transmitted to the second agent 210 for generation of a local display 212 of the integrated desktop environment 204. In another of these embodiments, the second agent 210 displays, to a user of the local machine 102, the local display 212 of the plurality of data objects 206 and the remote desktop environment 204.

Figure 2B:
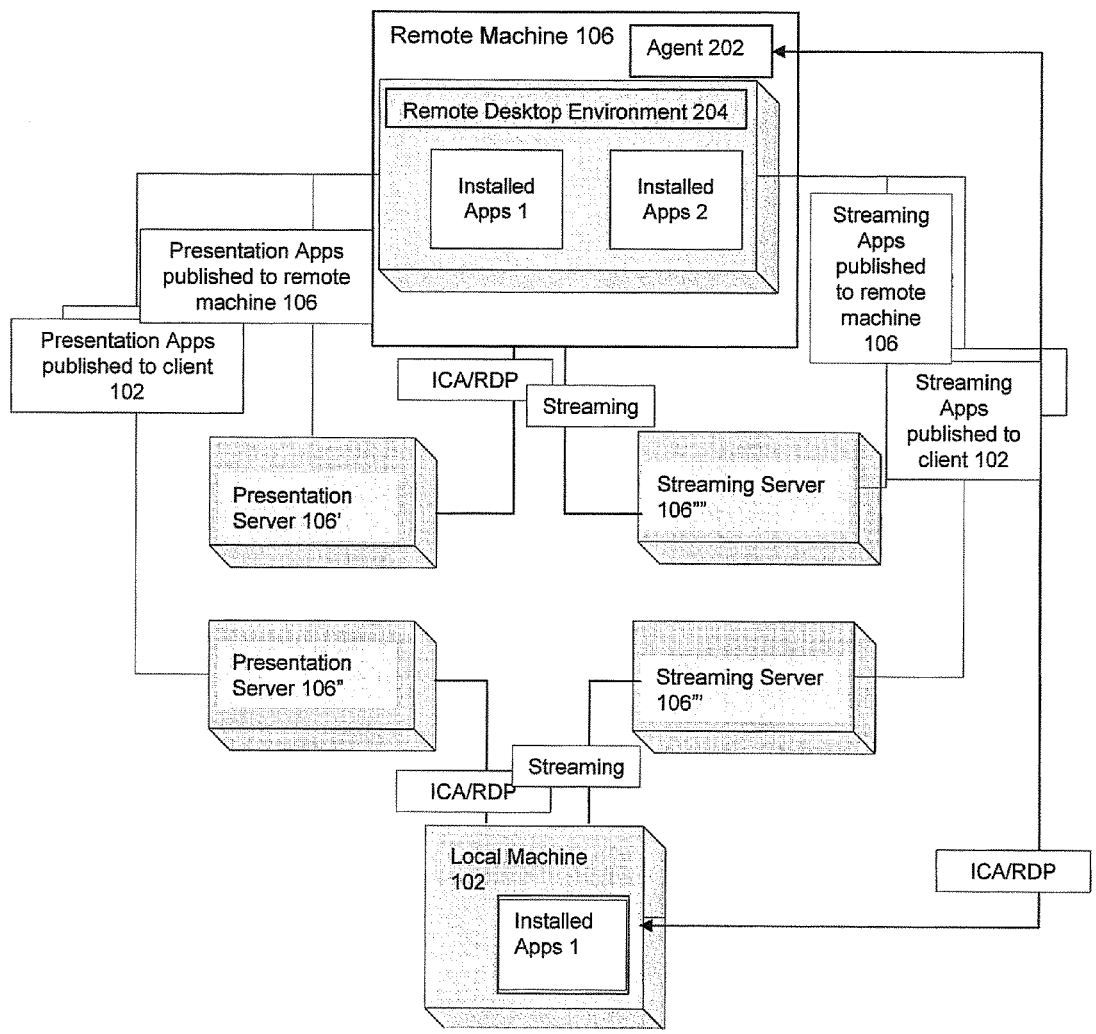
FIG. 2B is a block diagram depicting one embodiment of a system in which an agent integrates applications from various sources into a desktop environment.

Referring ahead to FIG. 2B, a block diagram depicts one embodiment of a system in which the first agent 202 integrates resources from various sources into a remote desktop environment 204. In some embodiments, and as shown in FIG. 2B, the first agent 202 may receive the identification of the resources available to a user of the local machine 102 from a plurality of servers 106. In one of these embodiments, the first agent 202 receives an identification of the available resources from machines 106', 106'', 106''', and 106''''.

In one of these embodiments, the remote machine 106 receives an identification of the available resources from server 106', receives the output data generated by an execution of the resource on server 106' and transmits the output data so generated to local machine 102. In another of these embodiments, the first agent 202 receives only the identification of the available resources from the machine 106'', and the machine 106'' transmits the output data generated by an execution of the resource to the local machine 102.

In one of these embodiments, the first agent 202 receives, from a machine 106''', an identification of resources available to the local machine 102. In another of these embodiments, the first agent 202 receives, from the second agent 210, an identification of available resources from the machines 106''' and 106''. In still another of these embodiments, the local machine 102 receives, via a method for resource streaming, the available resource from the server 106'''. In this embodiment, the local machine 102 executes the resource locally and the graphical output data is integrated with the remote desktop environment 204. In still even another of these embodiments, the remote machine 106 receives an identification of the available resources from server 106'''', and receives via a method for resource streaming, the available resource from machine 106'''' and transmits the output data generated by an execution of the resource to the local machine 102. In other embodiments, the first agent 202 receives, from the second agent 210, an identification of a resource 220 available to the user of the local machine 102 for integration into the remote desktop environment 204.

In one embodiment, executing a resource provided by the local machine 102 may allow a user to leverage a characteristic of the local machine 102 that is not provided by the remote machine 106; for example, the local machine 102 may have more appropriate processing ability, graphics functionality, bandwidth, or license rights for accessing the resource than the remote machine 106. In another embodiment, the remote machine 106 may lack the ability to execute the resource, because, for example, only the user of the local machine 102 owns an application or owns a resource, such as an operating system, required to execute the application. In still another embodiment, the resource 220 is a resource such as an application or desktop environment installed on the local machine 102 via a method for streaming the application to the local machine 102 from a third machine 106'. In still even another embodiment, the resource 220 is a resource such as an application or desktop environment whose output data the local machine 102 receives via a presentation layer protocol communication with a third machine 106'. In yet another embodiment, the first agent 202 receives an identification of a conferencing or Internet-communication application; a user peripheral, such as a media player, a digital camera or a web camera; or a processor-intense, data-intense, or graphics-intense application, such as a media-editing application or a computer-aided design application.

Referring back to FIG. 2A, the first agent 202 incorporates the identification of the resource 220 into the remote desktop environment 204. In one of these embodiments, the first agent 202 adds a program execution shortcut to a menu for requesting execution of resources, the program execution shortcut corresponding to the identified resource 220. In another of these embodiments, the first agent 202 generates a graphical representation, such as an icon, associated with the resource 220 for display in the remote desktop environment 204. In still another of these embodiments, the first agent 202 may alternatively receive the graphical representation from the second agent 210 for display in the remote desktop environment 204. In still even another of these embodiments, the first agent 202 generates a proxy for an icon displayed on the local machine 102. In yet another of these embodiments, a user requests execution of a resource 220 by interacting with a program execution shortcut or a graphical representation displayed in the local version of the remote desktop environment 204.

In one embodiment, the first agent 202 receives the request for execution of a resource 220, responsive to the user interaction with a program execution shortcut or a graphical representation, and sends the request for execution to the second agent 210. In another embodiment, a user requests execution of a resource by interacting with the local display 212 of the remote desktop environment 204; for example, by selecting a graphical representation of a file, document, uniform resource locator, or other resource, displayed by the desktop environment.

The first agent 202 generates a proxy window 208 for integration into the remote desktop environment 204. In one embodiment, the first agent 202 is referred to as a proxy window management component 202. In another embodiment, the proxy window management component 202 is responsible for making the proxy window 208 conform to client-initiated changes to window attribute data. In still another embodiment, the proxy window management component 202 is responsible for monitoring any desktop-initiated changes to window attribute data and communicating them to the second agent 210, which applies them to the corresponding local application window 214.

In some embodiments (not shown in FIG. 2A), the proxy window management component 202 provides additional functionality. In one of these embodiments, such functionality may include a MICROSOFT Active Accessibility (MSAA) hook and other monitoring mechanisms to detect new application windows and window attribute data changes initiated on the desktop. In another of these embodiments, the proxy window management component 202 may further include support for launching published applications. In still another of these embodiments, the proxy window management component 202 may send updates initiated from the remote machine 106 regarding changes to window attribute data to the second agent 210 where the updates will be applied to the local window 214, and to the local displays of the plurality of data objects 206a-n. In still even another of these embodiments, the proxy management component 202 may be enabled to apply client-initiated updates to window attribute data associated with proxy window 208 and to the plurality of data objects 206a-n. In yet another of these embodiments, the proxy management component 202 may remove proxy windows when the client connection disappears.

In one embodiment, the first agent 202 and the second agent 210 include a hooking component for intercepting window-related messages. For example, and in some embodiments, an agent executing on a machine 102 or 106 on which the MICROSOFT WINDOWS operating system executes may use a version of the MICROSOFT Active Accessibility hook to monitor relevant window events. For example, and in other embodiments, an agent may include a MICROSOFT Computer-based Training (CBT) window hook, or other hooking mechanisms, to intercept and monitor window events.

The proxy window 208 represents a window 214 on the local machine 102 that displays output data generated by the resource 220 provided by the local machine. In one embodiment, the first agent 202 receives an identification of a change to window attribute data associated with this local window 214. In another embodiment, in response to a received identification of a change, the first agent 202 modifies at least one of the plurality of data objects 206a-206n. In another embodiment, the proxy window 208 has a z-order entry in a z-order list associated with the plurality of data objects 206a-206n in the remote desktop environment 204. In still another embodiment, the proxy window 208 has window attribute data—including data identifying position, size, z-order, focus state, minimized/normal/maximized state, and other information associated with visual state—and a taskbar button, and appears in a desktop Alt-TAB selection dialog. In yet another embodiment, window visual state and attribute data may be stored by a data object associated with or comprising the proxy window 208.

In one embodiment, the proxy window 208 does not need to be painted on the remote desktop environment 204, or can be painted very efficiently e.g. in a uniform color. In another embodiment, the first agent 202 is aware of the clipping regions associated with the proxy window 208 and does not send window attribute data for those regions.

In one embodiment, the second agent 210 on the local machine 102 modifies a z-order entry for the local window 214 that displays output data generated by the second resource 220, responsive to the identification of the modification. In another embodiment, the second agent 210 includes a transmitter transmitting, to the first agent 202, an identification of a change to window attribute data associated with the local window 214 that displays output data generated by the second resource 220 for modification, by the first agent 202, of at least one data object in the plurality of data objects 206a-206n. In still another embodiment, the second agent 210 includes a receiver that receives at least one entry in a z-order list including a z-order entry for the proxy window 208. In still even another embodiment, the second agent 210 includes a receiver that receives, according to a presentation layer protocol, application output data generated by the remote resource 215. In another embodiment, the second agent 210 includes a transceiver, in communication with a window management component on the local machine 102 that synchronizes a visual state of the window 214 on the local machine 102 with a visual state of the corresponding proxy window 208.

In still another embodiment, the second agent 210 is an integrated window management component 210 executing on the local machine 102 that enumerates, monitors, and manages local windows 214 that are included in the integrated desktop 204. In still even another embodiment, the integrated window management component 210 manages all local windows 214 that are integrated into the local display 212 of the desktop 204. In yet another embodiment, the integrated window management component 210 communicates window existence and client-initiated visual state changes over a virtual channel to the first agent on the remote machine 106.

In one embodiment, the integrated window management component 210 provides additional functionality. In another embodiment, such functionality may include an MSAA hook and other monitoring mechanisms to detect new application windows and window attribute data changes initiated on the client. In still another embodiment, the integrated window management component 210 may send client-initiated updates regarding changes to window attribute data to the first agent 202 where the updates will be applied to the proxy window 208, and communicated to the local machine 102 for application to the local displays of the plurality of data objects 206a-206n. In yet another embodiment, integrated window management component 210 may be enabled to apply updates initiated by the remote machine 106 to window attribute data associated with local window 214 and then to the local displays of the plurality of data objects 206a-206n. In some embodiments, the integrated window management component 210 displays the desktop environment 204 comprising the plurality of data objects 206a-206n.

In some embodiments, a remote machine 106 and a local machine 102 communicate using a presentation layer protocol, for example, by communicating via the ICA protocol, or the RDP protocol, or any of the protocols discussed above in connection with FIGS. 1A-1C. In one of these embodiments, the first agent 202 and the second agent 210 exchange graphical data, i.e., the data actually displayed in each window on the desktop environment, via a first virtual channel. In another of these embodiments, the first virtual channel is, for example, an ICA virtual channel. In still another of these embodiments, window attribute data including, but not limited to, information about window positioning, window size, z-ordering of window and other such information is communicated between the remote machine 106 and the local machine 102 via a second virtual channel. In yet another of these embodiments, the second virtual channel is, for example, an ICA virtual channel. In some embodiments, a single virtual channel is used to exchange all data. In other embodiments, the first agent 202 and the second agent 210 exchange window attribute data. In another of these embodiments, a third agent executing on the remote machine 106 and the second agent 210 exchange graphical data. In still another of these embodiments, a third agent executing on the remote machine 106 and a fourth agent executing on the local machine 102 exchange graphical data.

Figure 3A:
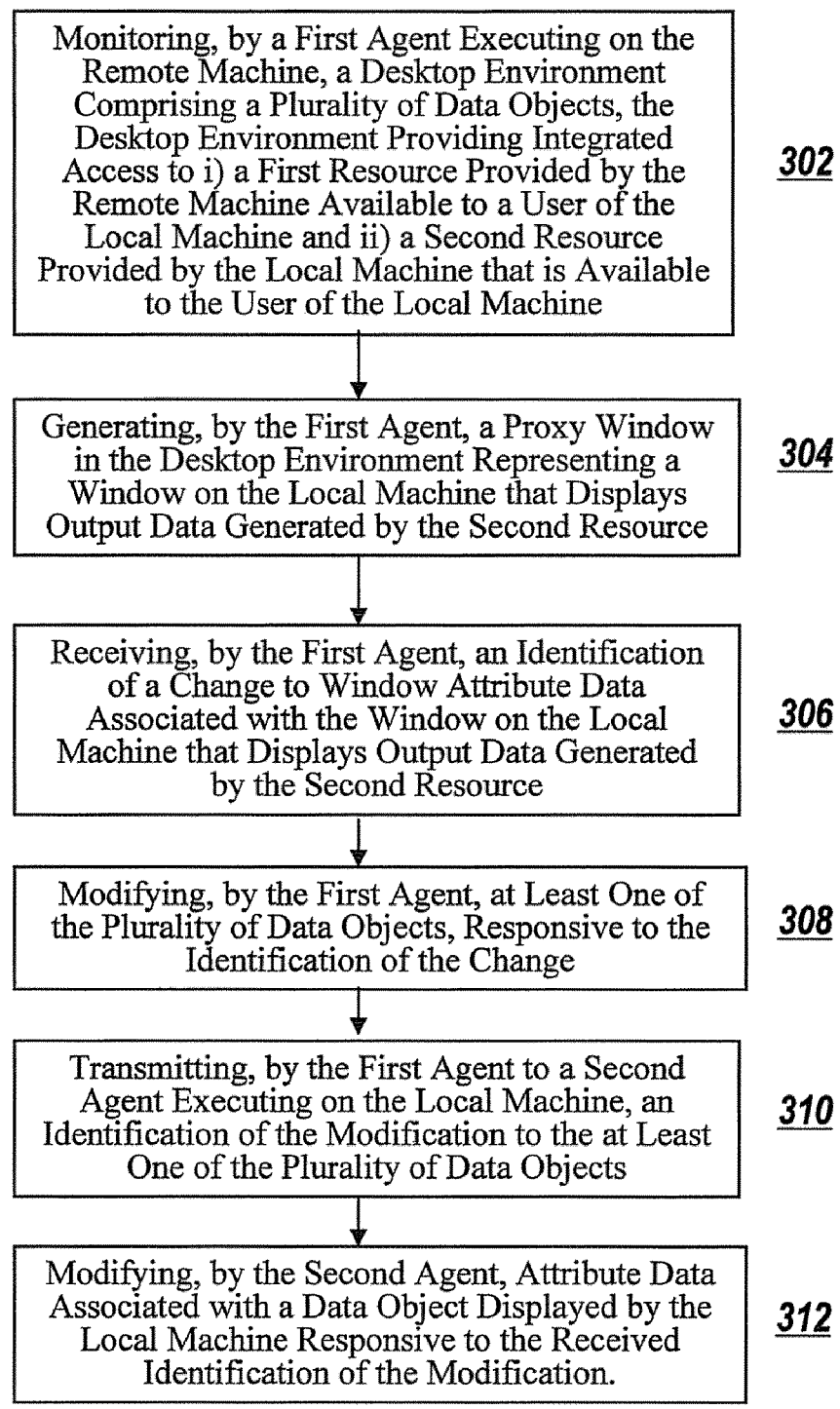
FIG. 3A is a flow diagram depicting one embodiment of a method for maintaining an integrated desktop environment on a remote machine for display on a local machine.

Referring now to FIG. 3A, a flow diagram depicts one embodiment of a method for maintaining a full-screen, integrated desktop environment on a remote machine for display to a user by a local machine, the desktop environment providing integrated access both to resources provided by the local machine and resources provided by the remote machine. In brief overview, the method includes monitoring, by a first agent 202 executing on the remote machine 106, a desktop environment 204 comprising a plurality of data objects 206a-206n, the desktop environment 204 providing integrated access to i) a first resource 215 provided by the remote machine 106 available to a user of the local machine 102 and ii) a second resource 220 provided by the local machine 102 that is available to the user of the local machine 102 (block 302). The first agent 202 generates a proxy window 208 in the desktop environment 204, the proxy window 208 representing a window 214 on the local machine 102 that displays output data generated by the second resource 220 (block 304). The first agent 202 receives an identification of a change to window attribute data associated with the window 214 on the local machine 102 that displays output data generated by the second resource 220 (block 306). The first agent 202 modifies at least one of the plurality of data objects 206a-206n responsive to the identification of the change (block 308). The first agent 202 transmits, to a second agent 210 executing on the local machine, an identification of the modification to the at least one of the plurality of data objects 206a-206n (block 310). The second agent 210 modifies attribute data associated with a data object displayed by the local machine 102 responsive to the received identification of the modification (block 312).

In one embodiment, a remote agent 602 monitors a desktop environment on the remote machine 106, the desktop environment comprising a plurality of data objects. In another embodiment, the remote agent 602 receives an identification of a change to a data object displayed on the local machine 102. In another embodiment, the remote agent 602 modifies a data object in the plurality of data objects responsive to receiving the identification of the change. In still another embodiment, the remote agent 602 transmits, to a local agent 210 executing on the local machine 102, an identification of the change to the data object on the remote machine 106. In some embodiments, the change is a change to graphical output data displayed by the data object. In other embodiments, the change is a change to window attribute data associated with the data object. In still other embodiments, the change is an identification of a request for access to functionality associated with the data object. In one of these embodiments, the functionality may include, without limitation, execution of a resource and display of a user interface element.

In one embodiment, the local agent 210 identifies a data object in a plurality of data objects forming a desktop environment on the local machine 102, responsive to receiving the identification of the change to the data object in the plurality of data objects 206 on the remote machine 106. In another embodiment, the local agent 210 identifies a data object— such as a window—associated with a resource 220. In still another embodiment, the local agent 210 identifies a data object—such as a graphical user interface element—maintained by a shell executing on the local machine 102. In yet another embodiment, the local agent 210 identifies a data object displaying output data generated on the remote machine 106 and received by the local agent 210 from the remote agent 602. In some embodiments, the local agent 210 identifies a data object affected by the change identified by the remote agent 602.

In one embodiment, the local agent 210 processes the change identified by the remote machine 106 by modifying a window attribute of a data object. In another embodiment, the local agent 210 processes the change identified by the remote machine 106 by modifying graphical output data displayed by the data object. In still another embodiment, the local agent 210 processes the change identified by the remote machine 106 by redirecting the identification of the change to a handler, such as a shell extension invoker 618 described in further detail below. In yet another embodiment, the local agent 210 displays a desktop environment providing integrated access to resources, graphical data, and functionality provided by both the local machine and the remote machine.

Referring now to FIG. 3A, and in greater detail, a first agent 202 executing on a the remote machine 106 monitors a desktop environment 204 comprising a plurality of data objects 206a-206n, the desktop environment 204 providing integrated access to i) a first resource 215 provided by the remote machine 106 available to a user of the local machine 102 and ii) a second resource 220 provided by the local machine 102 that is available to the user of the local machine 102 (block 302). In some embodiments, the first agent 202 monitors the generation and modification of the desktop environment 204 and of a plurality of data objects 206a-206n providing access to a plurality of resources 215 executing on remote servers, such as the remote machine 106, and to at least one resource 220 provided by the local machine 102. In other embodiments, the local agent 210 displays the desktop environment maintained by the remote machine and providing access to the first resource and the second resource.

The first agent 202 generates a proxy window 208 representing a window 214 on the local machine that displays output data generated by the second resource 220 (block 304). In one embodiment, the proxy window 208 has a z-order entry in a z-order list associated with the plurality of data objects 206a-206n in the remote desktop environment 204. In another embodiment, the local window 214 is reflected into the remote desktop window list using the proxy window 208, which has dimensions, position, z-order value, and focus state in the remote desktop environment 204. In still another embodiment, the first agent 202 synchronizes these window attributes with a data object maintained on the local machine 102. In yet another embodiment, the first agent 202 synchronizes a visual state of the corresponding proxy window 208 with a visual state of the window 214 on the local machine 102.

The first agent 202 receives an identification of a change to window attribute data associated with the window 214 on the local machine that displays output data generated by the second resource (block 306). In one embodiment, the first agent 202 receives the identification of the change via a virtual channel. In another embodiment, the first agent 202 receives a message that a user minimized the local window 214. In still another embodiment, the first agent 202 receives a message that a user restored a minimized local window 214. In still even another embodiment, the first agent 202 receives a message that a user changed a size or position of the local window 214. In still another embodiment, the first agent 202 receives a message that a user maximized a local window 214. In yet another embodiment, the second agent 210 transmits, to the first agent 202, an identification of a change to window attribute data associated with the window 214 on the local machine 102 for modification, by the first agent 202, of at least one of the plurality of data objects 206a-206n.

In one embodiment, when a data object 206a associated with a remote resource 215 is selected by a user and the local window 214 loses focus, the second agent 210 transmits a message to the first agent 202 instructing the first agent 202 to direct a window management component to remove focus from the proxy window 208 and to focus on a data object 206a in the plurality of data objects 206a-206n. In another embodiment, when a data object 206a associated with a remote resource 215 is selected by a user and the local window 214 loses focus, the second agent 210 allows the resource 220 to paint inside its window, resulting in a completely transparent view of local and remote resources.

The first agent modifies at least one of the plurality of data objects 206a-206n, responsive to the identification of the change (block 308). In some embodiments, the first agent 202 directs a window management component of an operating system executing on the remote machine 106 to modify a window displayed in the remote desktop environment 204. In another of these embodiments, the first agent 202 sends a message to a window management component of an operating system executing on the remote machine 106 to restore the proxy window 208. In other embodiments, the first agent 202 modifies attribute data associated with the proxy window 208 responsive to the identification of the change. In still other embodiments, the first agent 202 modifies a z-order entry for the proxy window 208 responsive to the identification of the change. In further embodiments, the first agent 202 communicates with a shell on the remote machine 106 to modify a data object in the plurality of data objects 206, responsive to the identification of the change.

The first agent 202 transmits, to a second agent 210 executing on the local machine 102, an identification of the modification to the at least one of the plurality of data objects 206a-206n (block 310). In some embodiments, the first agent 202 transmits to the second agent 210 the entire z-order list, including any modified entries. In other embodiments, the first agent 202 transmits to the second agent 210 a partial z-order list. In still other embodiments, the second agent 210 on the local machine 102 receives, from the first agent 202, at least one entry in the z-order list associated with the remote desktop environment 204. In further embodiments, the transmission includes an identification of a modification to at least one entry in a z-order list associated with the plurality of data objects 206a-206n.

In one embodiment, the first agent 202 transmits the identification of the modification to the at least one of the plurality of data objects 206a-206n to the second agent 210 via a virtual channel coupled to the remote desktop environment 204. In another embodiment, the first agent 202 transmits, to the second agent 210, via a virtual channel conveying window attribute data associated with the proxy window 208, messages directing the modification of a corresponding local window 214, which displays, in accordance with the window attribute data conveyed by the virtual channel, graphical output data generated by a resource 220 executing on the second machine 102.

In one embodiment, the proxy window 208 responds to requests, initiated on the remote machine, to change visual state or to invoke its taskbar menu. In another embodiment, the visual state of the local application window 214 is synchronized with the visual state of the corresponding proxy window 208. In still another embodiment, the proxy window 208 can pass visual state change requests to the second agent 210, via the first agent 202, without needing to apply them to itself. In some embodiments, the first agent 202 may modify a z-order entry for the proxy window 208, responsive to the identification of the window attribute change. In other embodiments, the first agent 202 may transmit, to the second agent 210, an identification of the modification made to the z-order entry. In still other embodiments, in response to the identification of the modification, the second agent 210 may modify the window attribute data (e.g., a z-order entry) associated with local window 214. In further embodiments, the first agent 202 does not transmit the proxy window 208 to the second agent 210, only window attribute data associated with the proxy window 208.

In some embodiments, the first agent 202 sends a message to the second agent 210 to restore the local window 214. In one of these embodiments, the second agent 210 sends a message to the resource 220 to restore the minimized local window 214. In still other embodiments, the first agent 202 sends a message to the second agent 210 to terminate the execution of a local resource 220 when the first agent 202 terminates the generation and display of the remote desktop environment 204. In some embodiments, the first agent 202 sends a message to the second agent 210 to terminate an operating system executing on the local machine 102. In one of these embodiments, the first agent 202 sends a message to the second agent 210 to shut down the local machine 102.

In one embodiment, the second agent 210 receives attribute data associated with at least one data object in the plurality of data objects. In another embodiment, the second agent receives an identification of the modification to the at least one of the plurality of data objects.

The second agent 210 modifies attribute data associated with a data object 206a-206n displayed by the local machine 102, responsive to the received identification of the modification (block 312). In some embodiments, the second agent 210 modifies attribute data associated with the local window 214 that displays output data generated by the second resource 220. In other embodiments, the second agent 210 modifies a z-order entry for the local window 214.

In one embodiment, the local machine 102 displays a local version of each of the plurality of data objects 206a-206n. In some embodiments, a data object 206a-206n is a window. In one embodiment, the second agent 210 directs a window management component on the local machine 102 to assign each of the locally-displayed data objects 206a-206n a z-order entry in a z-order list of windows displayed on the local machine 102. In another embodiment, each of the assigned z-order entries for each of the locally-displayed objects 206a-206n result in the display of the locally-displayed windows 206a-206n above a local window associated with a local application on the local machine 102 other than the local display of a local application displayed in local window 214. In this embodiment, the local window is kept below the local display 212 of the remote desktop environment 204 in the client-side z-order. That is, it is kept below each of the windows in the plurality of windows 206a-206n and below the local window 214, which is integrated with the plurality of windows 206a-206n. In still another embodiment, the plurality of windows 206a-206n and the local window 214 are displayed on the local machine 102 according to the z-order list maintained on the remote machine 106.

In some embodiments, the second agent 210 receives an identification of a region in the remote desktop environment corresponding to a region on the local display 212 associated with a local resource 220. In one of these embodiments, the second agent 210 receives the identification from the first agent 202. In another of these embodiments, as described in additional detail below, the second agent 210 identifies the region responsive to information received from the first agent 202. In still another of these embodiments, as described in additional detail below, the second agent 210 identifies the region responsive to identifying a color key in a communication from the first agent 202.

In some embodiments, the local display 212 is a single window that displays the graphical output data of the remote desktop environment 204, including the window output for the plurality of data objects 206a-206n. In one of these embodiments, an individual window 206a does not need to have a corresponding local window on the local machine 102. In another of these embodiments, the local display 212 is maintained as the topmost window, thus keeping local applications underneath the local display 212 in the client-side z-order. In still another of these embodiments, a region of local display 212 is shown as transparent to allow the correct parts of a local window 214 to show through the local display 212, as if the local window 214 were on the remote desktop environment 204. In still even another of these embodiments, the proxy window 208 is displayed on a region of the remote desktop environment 204 corresponding to the region of local display 212 which is to be transparently displayed. In yet another of these embodiments, the transparent region is referred to as a clipping region.

In some embodiments, to identify the areas to be made transparent, the first agent 202 uses the proxy window 208 to identify a clipping region. In one of these embodiments, the first agent 202 intercepts a paint request on the remote desktop environment 204. In another of these embodiments, the first agent 202 transmits, to the second agent 210, an identification of a clipping region.

In other embodiments, the second agent 210 identifies the areas of local display 212 to be displayed by the local resource 220. In one of these embodiments, the second agent 210 identifies the areas responsive to information received from the first agent 202. In another of these embodiments, the second agent 210 identifies a key received from the first agent 202, such as a color key or an identifiable pattern or tag identifying a clipping region.

In still other embodiments, the second agent 210 ensures that the resource 220 paints output data to the appropriate local window 214, which is located in a region corresponding to the clipping region on the remote desktop environment 204. In one of these embodiments, the second agent 210, in communication with a window management component, ensures that the local display 212 is kept topmost and displays the graphical output data associated with the remote desktop environment 204, other than the output data that would be displayed in a clipping region. In another of these embodiments, the second agent 210 instructs a window management component to regard an instruction to paint a particular color or pattern to a region (for example, to a region of the local display 212) as an instruction to keep the region transparent. This color key may include an alpha value (e.g., a 32-bit {R,G,B,alpha} rather than a 24-bit {R,G,B} value) which can be used to distinguish it from all non-transparent colors (for resources that don't use partial transparency).

In yet other embodiments, the agent 202 paints a clipping region for a proxy window 208 by responding to a paint request from a window management component to the proxy window by painting the window in a color key. In one of these embodiments, the agent 210 associates a paint request in a color key with the appropriate local application window. In another of these embodiments, the agent 210 also needs to use paint requests in a different color for an (or a part of an) existing clipping region to remove the painted region from the associated clipping region.

In some embodiments, the first agent 202 may paint a clipping region in the color key rather than send a z-order entry to the second agent 210. In other embodiments, the first agent 202 sends at least one z-order entry for a proxy window 208 associated with a local window 214. In one of these embodiments, the second agent 210 ensures that a local window 214 has the same relative z-order relationship on the client as the corresponding proxy window 208 does on the remote machine 106, e.g., if proxy window 208 is below proxy window 208' on the remote machine 106 (regardless of how many server windows there are, and whether they are above or below either A or B), then the second agent 210 ensures that a local window 214 is below a local window 214'.

In other embodiments, the windows underneath the local display 212 show through wherever the local display 212 is painted in the color key. In one of these embodiments, the second agent 210 maintains the local windows in the appropriate relative Z-order so that they will paint correctly and a window that is above another will correctly occlude the other even though both occupy the entire clipping region. In another of these embodiments, the second agent 210 also ensures that user input will be directed to the correct window. For example, a mouse click on a transparent region will be sent to the underlying window—not to the local display 212.

In some embodiments, the first agent 202 transmits to the second agent 210 an identification of a clipping region for each proxy window 208 in a remote desktop environment 204. In one of these embodiments, the second agent 210 directs the local resource 220 to paint output data to the region of local display 212 corresponding to the clipping region. In another of these embodiments, directing the local resource 220 to paint output data to a region of the local display 212 avoids the need for transparency. In still another of these embodiments, the first agent 202 identifies a clipping region on the remote desktop environment 204 that corresponds to a region displaying local window 214. In still even another of these embodiments, the first agent 202 uses a color key or identifiable pattern or tag as described above to tag a clipping region. In one of these embodiments, the agent 202 or the agent 210 associates a paint request in a color key with the appropriate local application window. In another of these embodiments, the agent 202 or the agent 210 responds to paint requests in a different color for an (or a part of an) existing clipping region for an application window by removing the newly painted region from the associated clipping region. In still another of these embodiments, the agent 202 or agent 210 associates a different color key for each local window. In yet another of these embodiments, the second agent 210 identifies a clipping region responsive to information received from the first agent 202.

In some embodiments, the first agent 202 may paint a clipping region in a color key rather than send a z-order entry to the second agent 210. In other embodiments, the first agent 202 may send an identification of a clipping region to the second agent 210 rather than send a z-order entry to the second agent 210. In still other embodiments, the first agent 202 may send information other than a z-order entry to agent 210 that allows agent 210 to identify a clipping region rather than send a z-order entry to the second agent 210. In yet other embodiments, the first agent 202 does not send a z-order entry to the second agent 210 at all.

In other embodiments, the second agent 210 ensures that the local display 212 is maintained topmost in the local desktop environment. In one of these embodiments, the local display 212 is used to show all of the remote desktop graphics output including areas belonging to local window 214. In another of these embodiments, local windows never show through. In still another of these embodiments, when the second agent 210 receives output data not containing the color key for a portion of a clipping region associated with a local window, the second agent 210 removes the output region from the clipping region for that window.

In still other embodiments, the second agent 210 directs the local resource 220 to paint the output data it generates to a region in the local display 212 corresponding to the region identified by the first agent 202 as a clipping region. In one of these embodiments, the second agent 210, in communication with a window management component, sends the local resource 220 a WM_PAINT message for a display context that references a clipping region on the local display 212. In another of these embodiments, the second agent 210 sends the messages for any updated portions of a local window's associated clipping region whenever portions of the clipping region change. In still another of these embodiments, the second agent 210 sends the paint messages in a periodic refresh loop as local windows are always covered by the local display 212 and can no longer asynchronously update their regions that are visible on the client display. In still even another of these embodiments, the second agent 210 ensures that user input in clipping regions (including mouse clicks and, where appropriate, keyboard events) are redirected by the local display 212 to the corresponding local application window. This means detecting mouse events in clipping regions, determining which local window is associated with the mouse event coordinates and sending the event to that window at those coordinates.

As described above, in some embodiments, a clipping region is identified. In one of these embodiments, an agent 202 or 210 calculates a clipping region responsive to information associated with the remote desktop environment, including a list of windows, their z-order, size & position (and, for non-rectangular windows, their shape). In another of these embodiments, the agent 202 or 210 acquires the information from one or more sources including, but not limited to, the seamless virtual channel, data used by the Headless Client, subclassing windows, Microsoft Active Accessibility (e.g. using WinEvents and MSAA hooking) and by hooking various Windows APIs. In still another embodiment, the agent 202 or 210 identifies a clipping region, or portion of a clipping region, by hooking or responding to window messages (including WM_PAINT, WM_NCPAINT, WM_ERASEBKGND) which allow the agent 202 or 210 to see requests by Windows for a window to perform a paint operation within a region. Each time the agent 202 or 210 identifies one of these messages, the corresponding region is added to the clipping region for the associated window. The agent 202 or 210 uses knowledge of which windows receive which paint requests to maintain a record of which regions of the screen "belong" to each application window. Each time the agent 202 or 210 intercepts a paint request for a different window covering (all or part of) an existing clipping region for another window, that part is removed from that window's clipping region. The agent 202 or 210 can also directly retrieve the clipping region using Windows API functions such as GetRandomRgn( ) which allows the agent 202 or 210 to directly interrogate a window for clipping regions. In some embodiments, the agents 202 and 210 communicate as described above to exchange information required by the second agent 210 to modify the local display 212 or local windows 214 or local windows corresponding to the plurality of windows 206a-206n, as described below in connection with FIG. 3B.

Figure 3B:
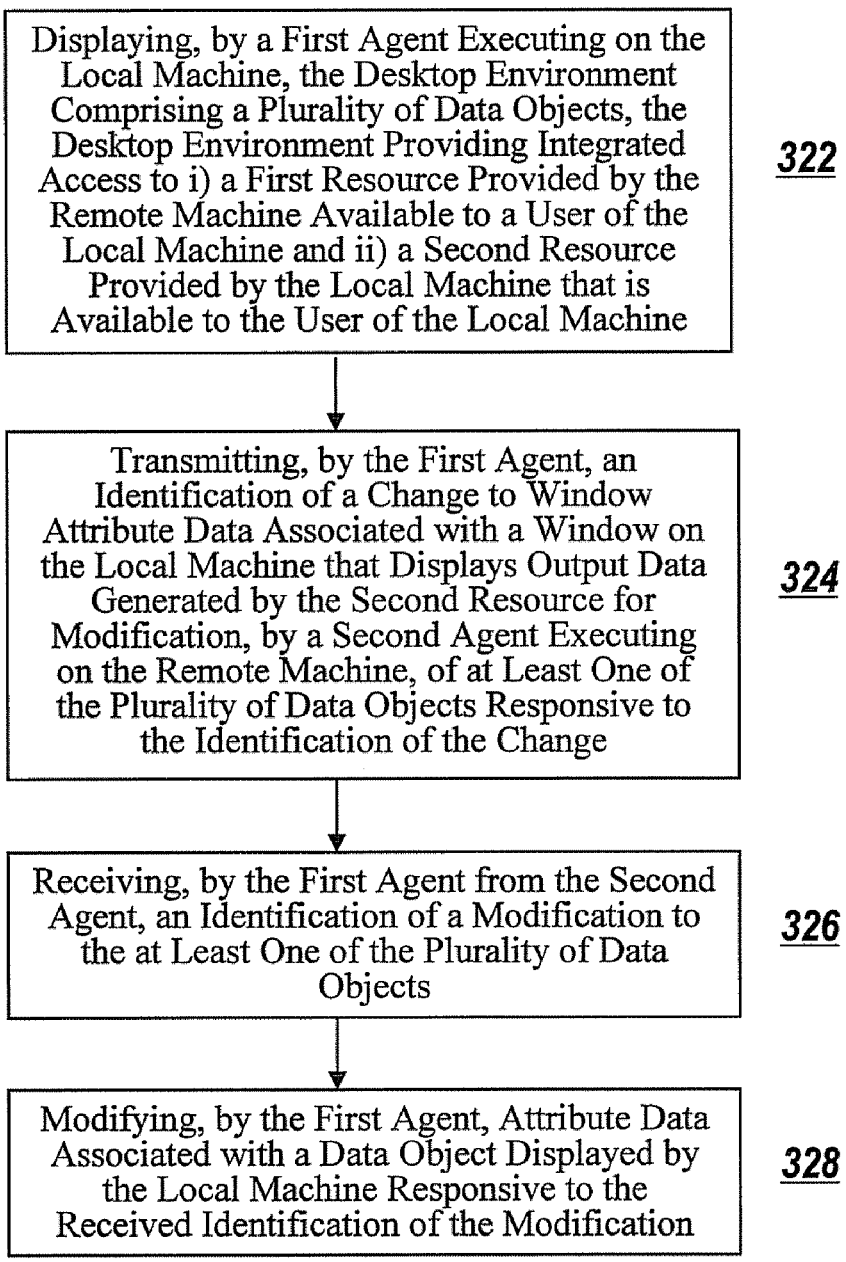
FIG. 3B is a flow diagram depicting one embodiment of a method for displaying, on the local machine, a desktop environment that is maintained by the remote machine.

Referring now to FIG. 3B, a flow diagram depicts one embodiment of a method for maintaining a full-screen, integrated desktop environment on the remote machine for display to a user by a local machine, the desktop environment providing integrated access both to resources provided by the local machine and resources provided by the remote machine. In brief overview, the method includes displaying, by a first agent 210 executing on the local machine 102, a desktop environment 204 comprising a plurality of data objects 206a-206n, the desktop environment 204 providing integrated access to i) a first resource 215 provided by the remote machine 106 available to a user of the local machine 102 and ii) a second resource 220 provided by the local machine 102 that is available to the user of the local machine 102 (block 322). The first agent 210 transmits an identification of a change to window attribute data associated with the window 214 on the local machine 102 that displays output data generated by the second resource 220 for modification, by a second agent 202 executing on the remote machine 106, of at least one of the plurality of data objects 206a-206n responsive to the identification of the change (block 324). The first agent 210 receives, from the second agent 202, an identification of a modification to the at least one of the plurality of data objects 206a-206n (block 326). The first agent 210 modifies attribute data associated with a data object displayed by the local machine 102 responsive to the received identification of the modification (block 328).

A first agent 210 executing on the local machine 102, displays a desktop environment 204 comprising a plurality of data objects 206a-206n, the desktop environment 204 providing integrated access to i) a first resource 215 provided by the remote machine 106 available to a user of the local machine 102 and ii) a second resource 220 provided by the local machine 102 that is available to the user of the local machine 102 (block 322). In some embodiments, the first agent 210 receives attribute data associated with the at least one data object in the plurality of data objects. In one of these embodiments, the first agent 210 receives graphical data and window attribute data from the second agent 202 and displays the graphical data in a window formed according to the window attribute data. In another embodiment, the first agent 210 receives graphical data and corresponding window attribute data for a plurality of windows forming a remote desktop environment and displays the graphical data in a plurality of windows formed according to the window attribute data. In other embodiments, the first agent 210 and the second agent 202 exchange window attribute data. In one of these embodiments, the first agent 210 and the second agent 202 also exchange graphical data. In another of these embodiments, a third agent executing on the remote machine 106 and the first agent 210 exchange graphical data. In still another of these embodiments, a third agent executing on the remote machine 106 and a fourth agent executing on the local machine 102 exchange graphical data. In yet another of these embodiments, the second agent 202 on the remote machine 106 and a fourth agent executing on the local machine 102 exchange graphical data.

The first agent 210 transmits an identification of a change to window attribute data associated with the window 214 on the local machine 102 that displays output data generated by the second resource 220 for modification, by a second agent 202 executing on the remote machine 106, of at least one of the plurality of data objects 206a-206n responsive to the identification of the change (block 324). In some embodiments, the first agent 210 transmits, to the second agent 202, an identification of a change to a z-order entry of a local window 214 on the local machine 102 displaying output data generated by the second resource 220. In one embodiment, when a user of the local machine 102 makes a change to a local window 214, for example, by minimizing, maximizing, or resizing the window, the first agent 210 transmits a message to the second agent 202 to make a corresponding change to a proxy window 208 and to its z-order entry in the z-order list ordering the plurality of windows 206a-206n and the proxy window 208.

The first agent 210 receives, from the second agent 202, an identification of a modification to the at least one of the plurality of data objects 206a-206n (block 326). In some embodiments, the first agent 210 receives at least one entry in a z-order list including a z-order entry of at least one window in the remote desktop environment 204 and including the z-order entry of a proxy window 208 corresponding to a local window on the local machine 102 displaying output data generated by the local resource 220. In one embodiment, the first agent 210 displays a local window 214 displaying output data, generated by an execution of the second resource 220, and a plurality of windows 206a-206n formed in accordance with received window attribute data, in accordance with the at least one entry in the z-order. In another embodiment, the first agent 210 monitors the local display of the plurality of data objects 206a-206n and of the local window 214. In another embodiment, the first agent 210, in communication with a window management component of an operating system executing on the local machine 102, manages the local display of the plurality of data objects 206a-206n and of the local window.

The first agent 210 modifies attribute data associated with a data object displayed by the local machine 102 responsive to the received identification of the modification (block 328). In some embodiments, the first agent 210 modifies attribute data associated with the local window 214 that displays output data generated by the second resource 220 responsive to the identification of the modification. In one of these embodiments, the first agent 210 may modify a z-order entry for the local window 214. In other embodiments, the first agent 210 modifies window attribute data for the displayed remote desktop environment 212, responsive to a received z-order entry. In some embodiments, the first agent 210 modifies a z-order entry for a local version of a window 206a in the plurality of windows 206a-206n. In other embodiments, the first agent 210 modifies window attribute data for a local version of a window 206a in the plurality of windows 206a-206n. In one of these embodiments, the first agent 210 resizes the local version of the window 206a in the plurality of windows 206a-206n. In one of these embodiments, the first agent 210 repositions the local version of the window 206a in the plurality of windows 206a-206n. For example, the first agent 210 may modify window attribute data of the local window 214 responsive to a received z-order entry sent as a result of a window management component implementing a window cascade on the server.

In other embodiments, as described above in connection with FIG. 3A (block 312), rather than receiving a z-order entry, the first agent 210 receives an identification of a clipping region in the remote desktop environment corresponding to a region on the local display 212 associated with a local resource 220. In one of these embodiments, the first agent 210 receives the identification from the second agent 202. In another of these embodiments, described in additional detail above, the first agent 210 identifies the region responsive to information received from the second agent 202. In still another of these embodiments, as described in additional detail above, the first agent 210 identifies the region responsive to identifying a color key in a communication from the second agent 202.

In yet other embodiments, the first agent 210 modifies a z-order entry for a proxy window 208 representing the local window 214 in a z-order list on the remote machine, responsive to the identification of the change, the proxy window 208 having a z-order entry in a z-order list associated with the plurality of windows 206a-206n in the remote desktop environment 204. In one embodiment, the first agent 210 assigns the local window 214 a z-order entry synchronized with the z-order entry of the proxy window 208, which has a z-order entry in a z-order list including z-order entries for a plurality of windows 206a-206n. In another embodiment, generating a z-order list including entries both for windows generated by a resource 215 executing on a server 106 and for windows generated by a resource 220 executing on a client 102 allows for integrated and overlapping displays of local and remote windows.

Figure 3C:
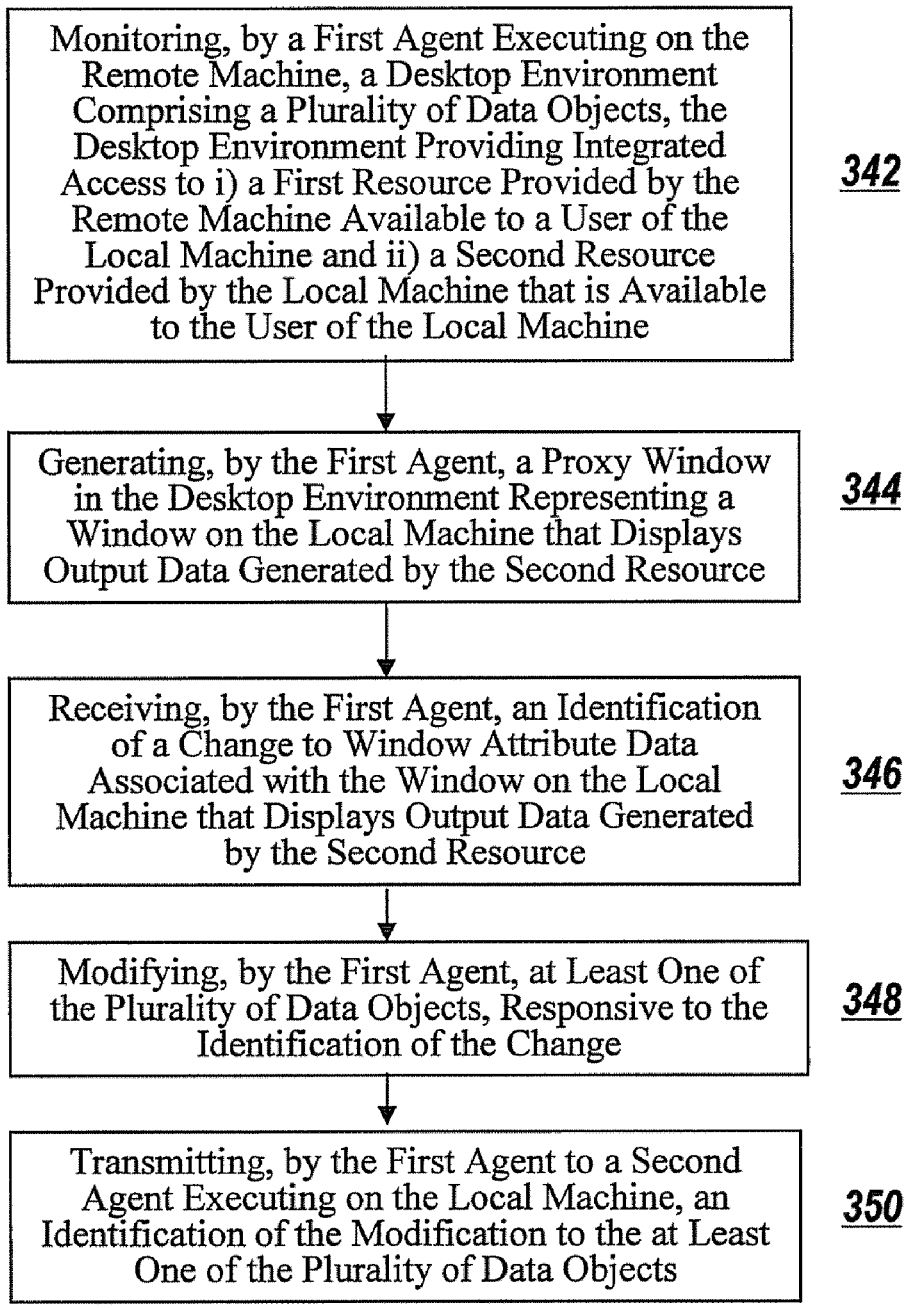
FIG. 3C is a flow diagram depicting an embodiment of a method for maintaining, by a remote agent, an integrated desktop environment on a remote machine for display on a local machine.

Referring now to FIG. 3C, a flow diagram depicts one embodiment of a method for maintaining a full-screen, integrated desktop environment on a remote machine for display to a user by a local machine, the desktop environment providing integrated access both to resources provided by the local machine and resources provided by the remote machine. The method includes monitoring, by a first agent 202 executing on the remote machine 106, a desktop environment 204 comprising a plurality of data objects 206a-206n, the desktop environment 204 providing integrated access to i) a first resource 215 provided by the remote machine 106 available to a user of the local machine 102 and ii) a second resource 220 provided by the local machine 102 that is available to the user of the local machine 102 (block 342). The first agent 202 generates a proxy window 208 in the desktop environment 204, wherein the proxy window 208 represents a window 214 on the local machine 102 that displays output data generated by the second resource 220 (block 344). The first agent 202 receives an identification of a change to window attribute data associated with the window 214 on the local machine 102 that displays output data generated by the second resource 220 (block 346). The first agent 202 modifies at least one of the plurality of data objects 206a-206n responsive to the identification of the change (block 348). The first agent 202 transmits, to a second agent 210 executing on the local machine, an identification of the modification to the at least one of the plurality of data objects 206a-206n (block 350).

In one embodiment, monitoring a desktop environment 204 is performed as discussed above in connection with FIG. 3A. In another embodiment, generating a proxy window 208 in the desktop environment 204 is performed as discussed above in connection with FIG. 3A. In another embodiment, receiving, by the first agent 202, an identification of a change to window attribute data associated with the window 214 on the local machine is performed as discussed above in connection with FIG. 3A. In still another embodiment, modifying, by the first agent 202, at least one of the plurality of data objects 206a-206n is performed as discussed above in connection with FIG. 3A. In yet another embodiment, transmitting, by the first agent 202 to a second agent 210 executing on the local machine 102, an identification of the modification to the at least one of the plurality of data objects 206a-206n (block 350) is performed as discussed above in connection with FIG. 3A.

Figure 4A:
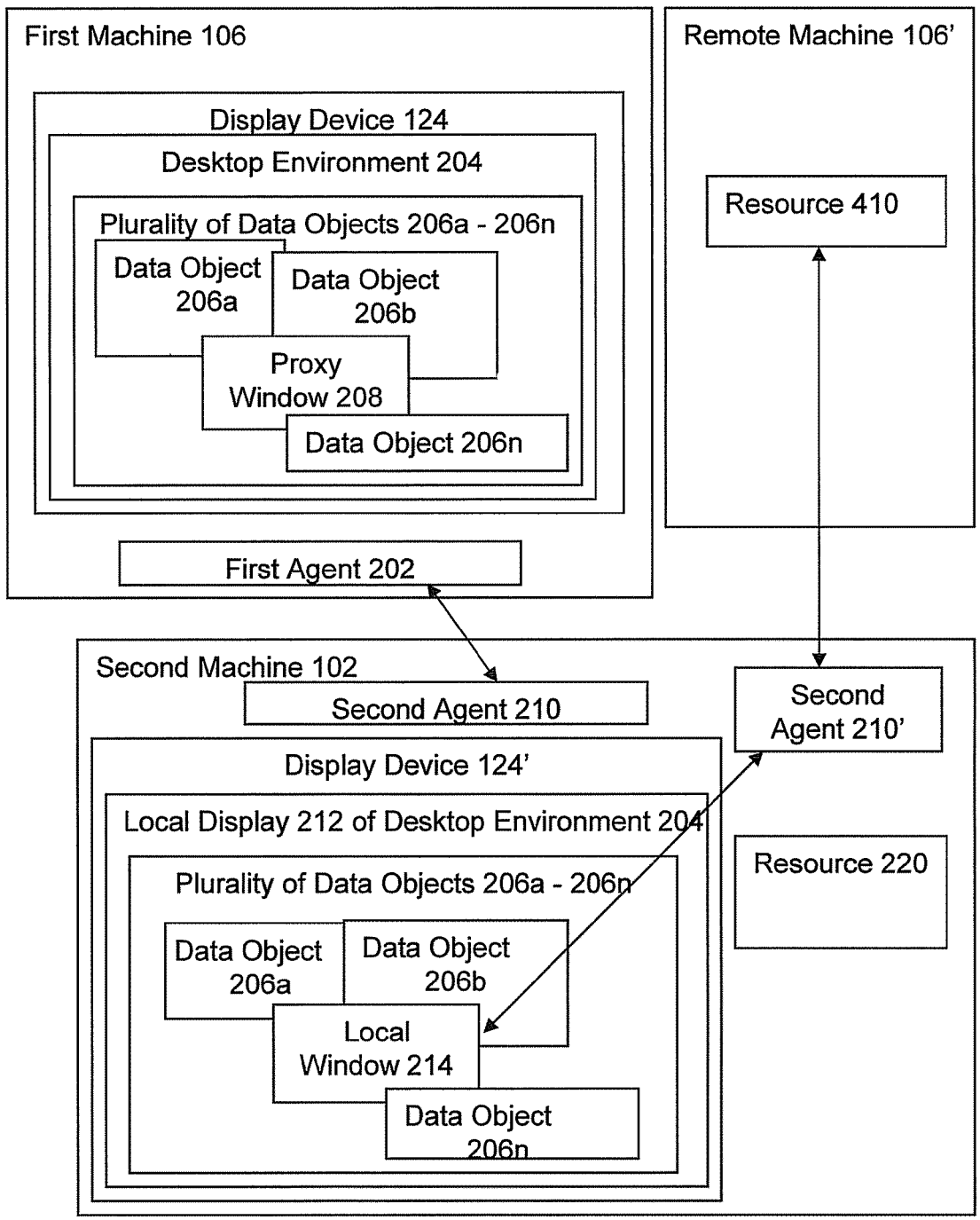
FIG. 4A is a block diagram depicting an embodiment of a system for maintaining an integrated desktop environment incorporating output data from multiple remote machines for display on a local machine.

Referring now to FIG. 4A, a block diagram depicts one embodiment of a system for maintaining a full-screen, integrated desktop environment for display on a local machine, the desktop environment providing integrated access to both resources provided by the local machine and to resources provided by a second remote machine. In brief overview, the system includes a first machine 106, a first agent 202, a second machine 102, a second agent 210, and a remote machine 106'. The first agent 202 receives an identification of a remote resource 410 available to a user of the second machine 102 and provided by the remote machine 106'. The first agent 202, executing on the first machine 106, monitors a desktop environment 204, which includes a plurality of data objects 206a-206n and provides access to i) the remote resource 410 provided by the remote machine 106', and ii) a resource 220 provided by the second machine 102 that is available to the user of the second machine 102. The first agent 202 receives a request for execution of the remote resource 410 provided by the remote machine 106'. The first agent 202 directs a second agent 210 on the second machine 102 to request execution of the remote resource 410 provided by the remote machine 106'. The first agent 202 receives, from the second machine 102, an identification of a change to attribute data of a local window 214 on the second machine 102, the local window 214 displaying output data generated by the remote resource 410 provided by the remote machine 106'. The first agent 202 modifies attribute data for a proxy window 208 representing the local window 214 on the first machine 106, responsive to the identification of the change. The first agent 202 transmits, to the second machine 102, an identification of the modification to the proxy window 208. The second agent 210, executing on the second machine 102, modifies attribute data associated with a data object displayed in the second machine 102, responsive to the received identification of the modification.

In some embodiments, attribute data of local window 214 is a z-order entry of local window 214. In other embodiments, attribute data of proxy window 208 is a z-order entry for a proxy window in a z-order list on the first machine 106, the proxy window 208 having a z-order entry in a z-order list associated with a plurality of windows in the remote desktop environment 204.

The second agent 210 provides access to the remote desktop environment 204. In some embodiments, establishment of a seamless pass-through presentation layer protocol connection between the remote desktop environment 204 to the remote machine 106' is requested. In one of these embodiments, a second client agent 210' is executed on the second machine 102 to establish the connection between the second machine 102 and the remote machine 106'. In one embodiment, the second client agent 210' is an RDP client. In another embodiment, the second client agent 210' is an ICA client. In another embodiment, the second client agent 210' is a client utilizing any of the protocols discussed previously in connection with FIGS. 1A-1C.

Figure 4B:
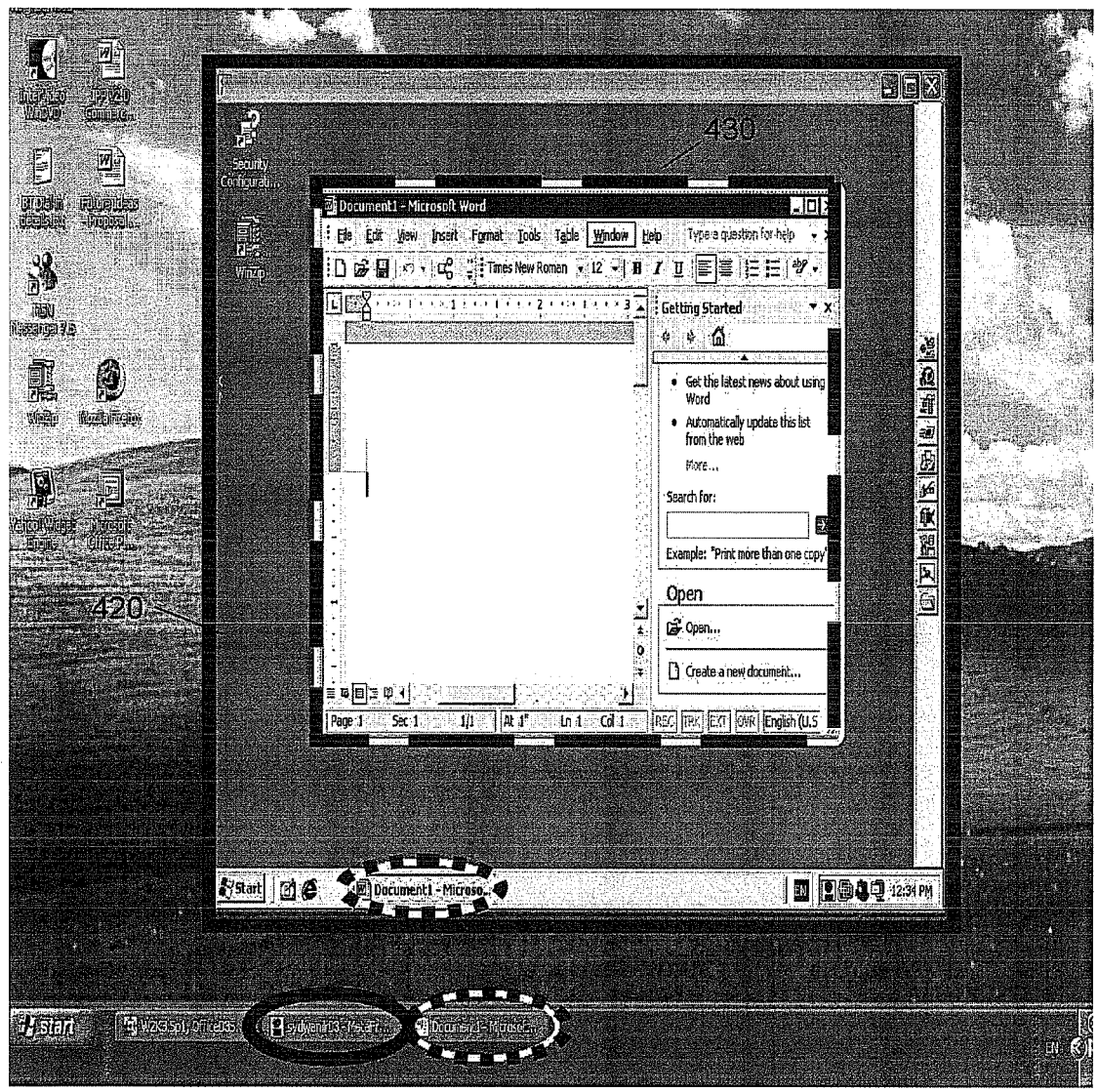
FIG. 4B is a screen shot depicting one embodiment of an integrated desktop environment incorporating output data from multiple remote machines for display on a local machine.

Referring now to FIG. 4B, a screen shot depicts one embodiment of a system for maintaining a full-screen, integrated desktop environment for display on the local machine, the desktop environment providing integrated access to both resources provided by the local machine and to resources provided by a second remote machine. As depicted in FIG. 4B, two presentation layer protocol sessions are executed on the second machine 102. Session 420, with the bold boundary, is a presentation layer protocol session providing access to a desktop environment 204. Session 430, with the dashed boundary, is a presentation layer protocol session providing access to a resource 410 (as depicted in FIG. 4B, the resource 410 is a word processing program, MICROSOFT WORD). The WORD application window, which is local window 214, has been merged with the presentation of the desktop session, which is represented by the remote desktop environment 204. If the first machine 106 had established the session, the first machine 106 would have received the output data and would have then forwarded the output data to the second machine 102 for display. Instead, in this embodiment, the second machine 102 established the presentation layer protocol session required to access WORD, instead of the first machine 106 establishing a presentation layer protocol session, and the second machine 102 receives the output data directly from the remote machine 106. However, the display of output data generated by resource 410 is integrated into the local display 210 of desktop environment 204.

Figure 5:
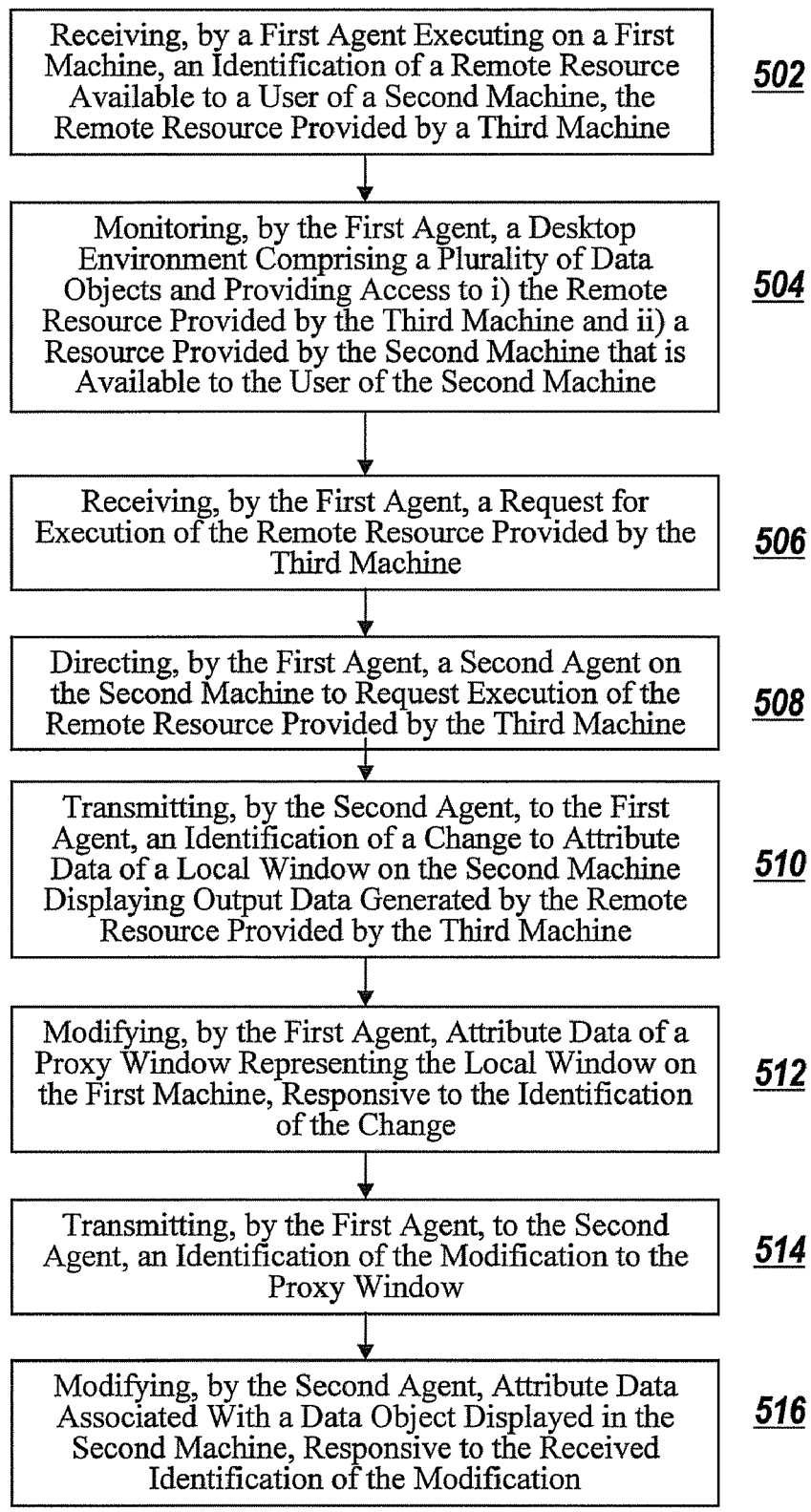
FIG. 5 is a flow diagram depicting one embodiment of a method for maintaining an integrated desktop environment incorporating output data from multiple remote machines for display on a local machine.

Referring now to FIG. 5, a flow diagram depicts one embodiment of a method for maintaining a full-screen, integrated desktop environment on a remote machine for display on a local machine, the desktop environment providing integrated access to both resources provided by the local machine and to resources provided by a second remote machine, the method including receiving, by a first agent 202 executing on a first machine 106, an identification of a remote resource 410 available to a user of a second machine 102, the remote resource 410 provided by a third machine 106' (block 502). The first agent 202 monitors a desktop environment 204 comprising a plurality of data objects 206a-206n and providing access to i) the remote resource 410 provided by the third machine 106' and ii) a resource 220 provided by the second machine 102 that is available to the user of the second machine 102 (block 504). The first agent 202 receives a request for execution of the remote resource 410 provided by the third machine 106' (block 506). The first agent 202 directs a second agent 210 executing on the second machine 102 to request execution of the remote resource 410 provided by the third machine 106' (block 508). The second agent 210 transmits, to the first agent 202, an identification of a change to attribute data of a local window 214 on the second machine 102, the local window 214 displaying output data generated by the remote resource 410 provided by the third machine 106' (block 510). The first agent 202 modifies attribute data of a proxy window 208 representing the local window 214 on the first machine 106, responsive to the identification of the change (block 512). The first agent 202 transmits, to the second agent 210, an identification of the modification to the proxy window 208 (block 514). The second agent 210 modifies attribute data associated with a data object displayed in the second machine 102, responsive to the received identification of the modification (block 516).

Referring now to FIG. 5, and in greater detail, a first agent 202 executing on a first machine 106 receives an identification of a remote resource 410 available to a user of a second machine 102, the remote resource 410 provided by a third machine 106' (block 502). In one embodiment, the first agent 202 receives the identification from the remote machine 106'. In another embodiment, the first agent 202 receives the identification from the second machine 102. In still another embodiment, the first agent 202 receives the identification from an agent on one of the remote machine 106' and the second machine 102. In yet another embodiment, the first agent 202 receives the identification from a fourth machine 106".

In one embodiment, a resource 410 comprises a program, an application, a document, a file, a plurality of applications, a plurality of files, an executable program file, a desktop environment, a computing environment, or other resource made available to a user of the second machine 102. The resource 410 may be delivered to the remote machine 106 via a plurality of access methods including, but not limited to, conventional installation directly on the remote machine 106, delivery to the remote machine 106 via a method for application streaming, or execution from a removable storage device connected to the remote machine 106, such as a USB device.

The first agent 202 monitors a desktop environment 204 comprising a plurality of data objects 206a-206n and providing access to i) the remote resource 410 provided by the third machine 106' and ii) a resource 220 provided by the second machine 102 that is available to the user of the second machine 102 (block 504). In some embodiments, the first agent 202 monitors the remote desktop environment 204 as described above in connection with FIGS. 2A, 2B, 3A, 3B, and 3C.

The first agent 202 receives a request for execution of the remote resource 410 provided by the third machine 106' (block 506). In one embodiment, the first agent 202 receives the request via a communications channel, such as an ICA channel, between the first agent 202 and the second agent 210. In another embodiment, the first agent 202 receives the request when a user of the second machine 102 selects a graphical representation of the remote resource 410 depicted in the local display 212 of the remote desktop environment 204. For example, the first agent 202 may generate a graphical representation of the remote resource 410, such as an icon, and incorporate the icon into the remote desktop environment 204 upon receiving the identification of the remote resource 410 from the remote machine 106'. In still another embodiment, the first agent 202 receives a request for execution of the remote resource 410 when a resource executing on one of the first machine 106 and the second machine 102 attempts to access a resource, such as a file, that requires the execution of the remote resource 410.

The first agent 202 directs a second agent 210 executing on the second machine 102 to request execution of the remote resource 410 provided by the third machine 106' (block 508). In one embodiment, the first agent 202 directs the second agent 210 to execute another agent 210' on the second machine 102 and to instruct the second agent 210' to request execution of the remote resource 410 provided by the remote machine 106'. In another embodiment, the second agent 210' is a presentation layer protocol client, such as an ICA client, or an RDP client, or any client utilizing any of the protocols discussed previously in connection with FIGS. 1A-1C. In still another embodiment, the second agent 210' establishes a connection to the remote machine 106' and requests execution of the remote resource 410. In yet another embodiment, the second agent 210' receives output data generated by the execution of the remote resource 410 and displays the output data in the local window 214. In some embodiments, the second agent 210 directs the first agent 202 to request execution of the remote resource 410 on server 106 upon making a determination the requested resource is unavailable or not executable from the second machine 102.

The second agent 210 transmits, to the first agent 202, an identification of a change to attribute data of a local window 214 on the second machine 102, the local window 214 displaying output data generated by the remote resource 410 provided by the third machine 106' (block 510). In some embodiments, attribute data of local window 214 is a z-order entry of the local window 214. In one of these embodiments, the second agent 210 transmits the identification of the change to the z-order entry of the local window 214 to the first agent 202. In another of these embodiments, the second agent 210 transmits the identification of the change to the z-order entry of the local window 214 to the first agent 202 as described above in connection with FIGS. 2A, 2B, 3A, 3B, and 3C.

The first agent 202 modifies attribute data of a proxy window 208 representing the local window 214 on the first machine 106, responsive to the identification of the change (block 512). In some embodiments, attribute data of proxy window 208 is a z-order entry for a proxy window in a z-order list on the first machine 106, the proxy window 208 having a z-order entry in a z-order list associated with a plurality of windows in the remote desktop environment 204. In some of these embodiments, the first agent 202 modifies a z-order entry for a proxy window 208 as described above in connection with FIGS. 2A, 2B, 3A, 3B, and 3C.

The first agent 202 transmits, to the second agent 210, an identification of the modification to the proxy window 208 (block 514). In some embodiments, the first agent 202 transmits, to the second agent 210, an identification of the modification to the proxy window 208 as described above in connection with FIGS. 2A, 2B, 3A, 3B, and 3C.

The second agent 210 modifies attribute data associated with a data object displayed in the second machine 102, responsive to the received identification of the modification (block 516). In some embodiments, the second agent 210 modifies attribute data associated with a data object displayed in the second machine 102, responsive to the received identification of the modification as described above in connection with FIGS. 2A, 2B, 3A, 3B, and 3C.

Figure 6:
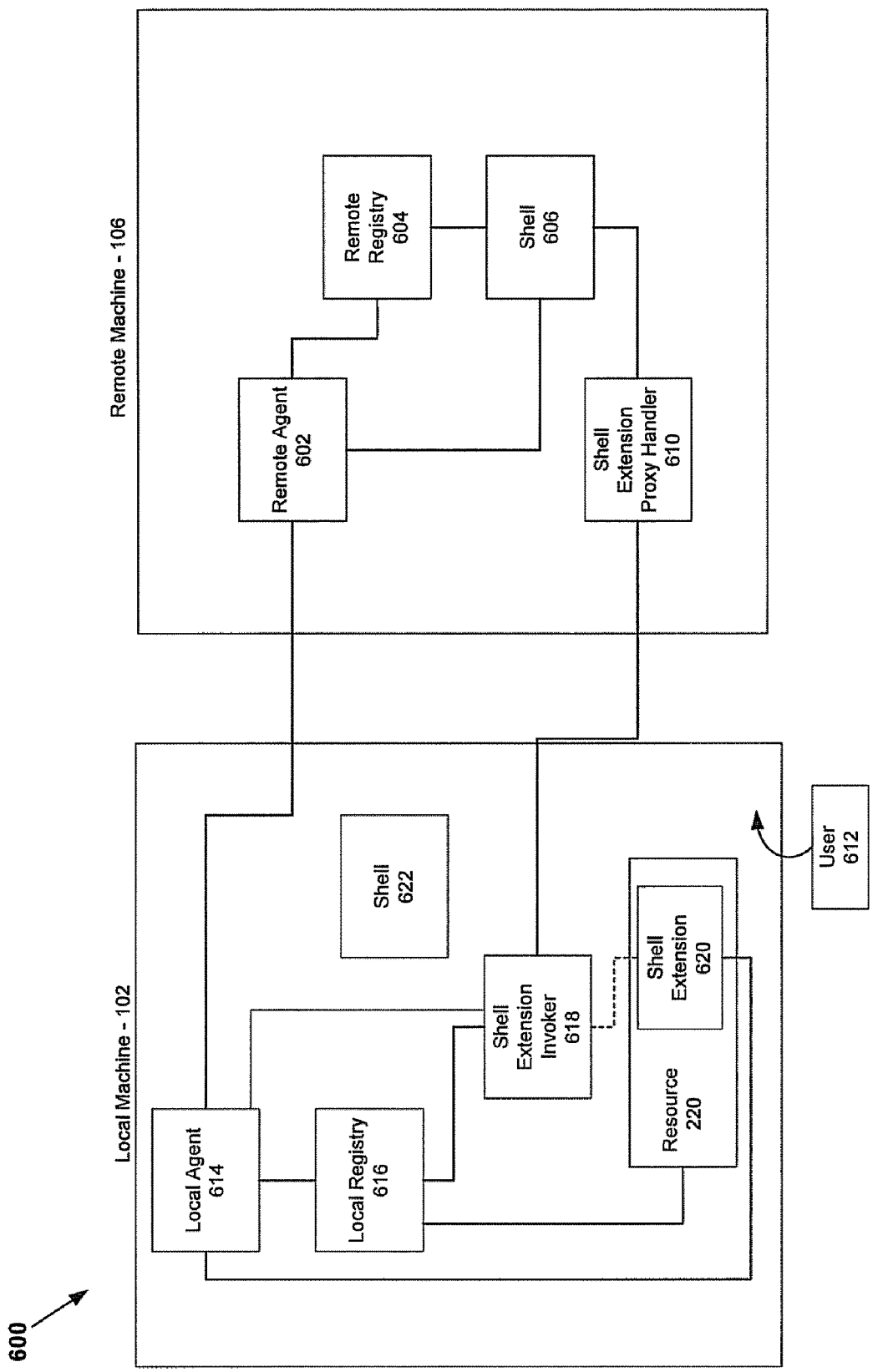
FIG. 6 is a block diagram depicting an embodiment of a system for providing, by a remote machine, access to functionality of a shell extension associated with a resource executing on a local machine.

Referring now to FIG. 6, a block diagram depicts one embodiment of a system for providing, by a remote machine, access to functionality associated with a resource executing on a local machine. In brief overview, the system 600 includes a local machine 102, a resource 220 provided by the local machine 102, a shell extension 620 associated with the resource 220, a remote machine 106, a remote agent 602, a shell extension invoker 618, and a shell extension proxy handler 610.

Referring now to FIG. 6, and in greater detail, a remote agent 602, executing on a remote machine 106, receives an identification of a shell extension 620 associated with a resource 220 provided by a local machine 102. In one embodiment, a shell extension handler adds functionality to an operating system shell executing on a computing device 100. In another embodiment, an operating system shell is software providing an operating system user interface to the user. In still another embodiment, a first operating system shell may be supplemented or replaced with a third-party shell. In still even another embodiment, when a user of a computing device 100 interacts with a data object associated with a shell extension, the interaction triggers the execution of a shell extension handler. In some embodiments, a shell extension 620 includes, for example and without limitation, a context menu handler, a drag-and-drop handler, a data handler, a drop handler, an icon handler, a property sheet handler, a thumbnail image handler, an infotip handler, a metadata handler, a column handler, a copy hook handler, an icon overlay handler, a search handler, a system tray icon handler, or any other shell extension.

In one embodiment, a shell extension handler is an in-process COM object. In another embodiment, the COM object conforms to a particular set of interfaces that can be registered with the shell to provide additional functionality. In still another embodiment, there are interface functions and methods that are specific to a type of extension and allow the invoking of the extended functionality and the registering of the extensions with the shell.

In some embodiments, a shell extension is associated with a file type. In one embodiment, file types (also referred to as "file classes") are defined by a file extension. In another embodiment, a file type association ("FTA") is defined by a registry entry that maps a file extension to a file type association handler. In still another embodiment, a file type association handler provides logic to execute an action on any given file of that type. In still another embodiment, a single file type may have a default handler, but may also define multiple alternate handlers. In yet another embodiment, a single handler may handle more than one file type. In some embodiments, a PerceivedFileType may also be associated with an extension. In one of these embodiments, a PerceivedFileType acts like an alternate (abstract, system-provided) file type through which additional file type association handlers can be defined.

In some embodiments, a handler and a shell extension are associated with a file class or file type. In one of these embodiments, a shell extension provided by a drop handler enables a file to be a drop target; for example, for use in defining a "Send To" menu entry. In another of these embodiments, a shell extension provided by an icon handler enables provisioning of file-specific icons to the shell. In still another of these embodiments, a shell extension provided by a property sheet handler enables addition to or modification of a property page associated with the shell. In still even another of these embodiments, a shell extension provided by a thumbnail image handler provides a thumbnail image for a file. In yet another of these embodiments, a shell extension provided by an info tip handler provides data associated with a display of a pop-up information tip associated with a file.

In other embodiments, a handler and a shell extension are not associated with a file class or file type. In one of these embodiments, a shell extension provided by a column handler adds additional columns to a display of data by the shell; for example, by adding new columns to a "details" section displayed by a shell. In another of these embodiments, a shell extension provided by a copy hook handler approves or denies a request to execute a folder operation; for example the handler may approve or veto a request to move, copy, delete, or rename a folder or printer. In still another of these embodiments, a shell extension provided by a drag-and-drop handler provides functionality for adding items and corresponding handlers to a context menu shown when dragging and dropping with the right mouse button in the shell. In still even another of these embodiments, a shell extension provided by an icon overlay handler specifies an overlay for an icon associated with a type of file. In yet another of these embodiments, a shell extension provided by a search handler enables implementation of a custom search engine and may provide access to the custom search engine from the shell or from within a menu, such as a "Start" menu.

A shell extension invoker 618 resides on the local machine 102 and is associated with the identified shell extension. In one embodiment, a shell extension invoker 618 initiates the execution of a local shell extension handler upon receiving a notification of a user request for access to a shell extension. In another embodiment, the shell extension invoker 618 receives, from a shell extension proxy handler 610 on a remote machine 106, a request for a shell extension 620 installed on the local machine 102. In still another embodiment, the shell extension invoker 618 proxies the received request to the appropriate local shell extension handler on the local machine 102.

In one embodiment, the shell extension invoker 618 hosts a shell extension instance on the local machine 102 to execute the proxied requests originating on the remote machine 106. In another embodiment, the shell extension invoker 618 returns a result of an execution of a shell extension on the local machine 102 to a shell extension proxy handler 610.

In some embodiments, there is one instance of a shell extension invoker 618 per shell extension type (as the target shell extension instance can be made identifiable in the proxied request). In other embodiments, it is possible to combine concrete implementations for multiple shell extension types into one physical component.

A shell extension proxy handler 610 is installed by the remote agent 602 and is associated with the identified shell extension 620. The shell extension proxy handler 610 receives a request for access to the shell extension 620 and redirects the request to the shell extension invoker 618. In one embodiment, the shell extension handler 610 receives a notification of a user interaction with a user interface element displayed on the local machine 102. In another embodiment, the user interaction is an event such as a right mouse click that is translated into a request for access to functionality provided by the shell extension 620.

In some embodiments, such a request may be initiated by a user 612 of a local display of a desktop environment, for example, of a desktop environment 204 as described above in connection with FIGS. 2-5, or by any other source, such as a program or process executing on remote machine 106. In one embodiment, the shell extension proxy handler 610 includes a transceiver receiving a result of executing the shell extension 620 on the local machine 102. In another embodiment, the shell extension proxy handler 610 includes a transceiver, transmitting, to the shell extension invoker 618, data associated with the request.

In one embodiment, the shell extension proxy handler 610 on the remote machine 106 represents a shell extension provided on the local machine 102. In another embodiment, a plurality of shell extension proxy handlers 610 on the remote machine 106 represent a shell extension provided on the local machine 102. In still another embodiment, the shell extension proxy handler 610 proxies shell extension actions—such as requests received by the remote machine 106 for access to a shell extension—to the shell extension invoker 618. In still even another embodiment, the shell extension proxy handler 610 includes functionality for responding to a shell extension action without redirecting the request to the shell extension invoker 618. In some embodiments, the shell extension proxy handler 610 is in communication with a path mapping component to map a path name to a file system object visible from the remote machine 106 to a path name to the same file system object on the local machine 102. In other embodiments, the shell extension proxy handler is in communication with a windows mapping component, to map a remote window—such as a parent window in a user interface display on the remote machine 106—to a window displayed on the local machine 102.

In some embodiments, the shell extension proxy handler 610 includes a transceiver transmitting, to the shell extension invoker 618, data associated with the request. In other embodiments, the shell extension proxy handler 610 transmits the data associated with the request to the remote agent 602, which transmits the data to a local agent 614 on the local machine 102, wherein the local agent 614 transmits the data to the shell extension invoker 618. The shell extension proxy handler 610 may receive, from the shell extension invoker 618, a result of executing the shell extension 620 on the local machine 102.

The remote agent 602, in communication with a window management component, may integrate a display of the result into a desktop environment 204 generated by the remote machine 106. In one embodiment, the remote agent 602 receives an identification of at least one shell extension from the local agent 614. In another embodiment, the remote agent 602 deploys a shell extension proxy handler 610, responsive to receiving the identification of the at least one shell extension. In still another embodiment, the remote agent 602 modifies a remote registry 604 to register the shell extension proxy handler 610. In yet another embodiment, the remote agent 602 transmits a notification to the shell 606 on the remote machine 106 identifying the modification to the remote registry 604.

In one embodiment, the remote agent 602 receives a data set identifying shell extensions on the local machine 102. In another embodiment, the data set includes a graph of associations between nodes consisting of file types, ProgID or PseudoProgID registry keys, shell extension handlers and shell extension handler executables, along with disparate attributes associated with each node.

In some embodiments, the remote agent 602 removes the shell extension proxy handler 610 so that users of the remote machine 106 are not presented with client-originated shell extensions when no client is present. In one of these embodiments, the remote agent 602 removes an identification of the shell extension proxy handler 610 from the shell 606, de-registering the shell extension proxy handler 610. In one of these embodiments, changes made to extension-related data on the remote desktop during the connection lifetime persist once the client connection is closed. In another embodiment, data integration is reversible and is reversed once the client connection disappears.

In other embodiments, a single remote agent 602 executes on the remote machine 106. In still other embodiments, a plurality of remote agents 602 execute on the remote machine 106. In one of these embodiments, each of the plurality of remote agents 602 is associated with a separate shell extension. In another of these embodiments, each of the plurality of remote agents 602 is associated with a separate type of shell extension.

In other embodiments, installation of the shell extension proxy handler 610 by the remote agent 602 may include registering the shell extension proxy handler 610 with a registry 604 on the remote machine 106 and sending a message to a shell 606 on the remote machine 106.

In some embodiments, the shell 606 is a WINDOWS EXPLORER program; for example, in an embodiment in which the remote machine 106 executes the WINDOWS operating system. In one of these embodiments, the WINDOWS EXPLORER on the remote desktop operates without modification. In another of these embodiments, the operation of WINDOWS EXPLORER is modified by hooking, or by the operation of filter drivers. In other embodiments, the shell 606 is a command shell program. In still other embodiments, the shell 606 is a shell provided by the MAC operating system.

The system 600 may include a local agent 614 executing on the local machine 102 and identifying the shell extension 620 associated with the resource 220 that is to be integrated into the remote desktop 204. In one embodiment, the local agent 614 may identify the shell extension 620 by watching or polling a local registry 616, or by hooking registry functions within a resource 220, or by registering for registry change notifications, or by monitoring changes via a registry filter driver. In another embodiment, the local agent 614 may then publish the identified shell extension 620 to the remote agent 602.

In one embodiment, the local agent 614 is a shell extension monitor that monitors at least one shell extension. In another embodiment, the local agent includes a shell extension monitor 614, while also providing other functionality; for example, the local agent may be an agent 202, an agent 210, a presentation layer protocol program, or a local agent as described above in connection with FIGS. 2-5.

In some embodiments, the system 600 includes a component providing additional management capabilities—e.g., it will deal with situations where both client and remote desktop provide clashing shell extensions for the same file class. In one of these embodiments, a management component may use rules or policies or other means to determine whether to use the shell extension provided by the local machine 102 or that provided by the remote machine 106 side, or whether both shell extensions are to be activated; for example, by modifying a graphical representation of the shell extension to identify the computing device providing the shell extension. In another of these embodiments, the remote agent 602 provides this functionality.

In other embodiments, there may be management policies or controls that specify, on a case-by-case basis, what happens when both client and remote desktop define the same entity (file type, PseudoProgID registry key, handler, or any attribute of those entities). In one of these embodiments, the client setting overrides the remote desktop setting for the duration of the connection. In another of these embodiments, the client entity can be given a new name (e.g. a ProgID registry key clash can be resolved by having a new ProgID registry key representing the client version) and both might apply at once. In still another of these embodiments, the remote desktop setting remains unmodified.

In some embodiments, the system 600 includes mitigation mechanisms to improve a level of efficiency of the system. In one of these embodiments, a mitigation mechanism includes a policy controlling which types and instances of extensions are integrated. In one of these embodiments, a mitigation mechanism includes a policy controlling which portions of at least one file system are proxied to extension handlers that may be on a different file system from the at least one file system and may, for example, restrict integration to files residing on the same machine as the handler to prevent file transfer over a presentation layer protocol. In another of these embodiments, a mitigation mechanism includes a caching mechanism.

In some embodiments, the system includes a window mapping component. In one of these embodiments, a shell extension interface call specifies a window for a shell extension proxy handler to use as a parent window in which to display any additional user interface elements generated by the shell extension interface call. In another of these embodiments, the shell extension invoker 618 retrieves, from the window mapping component, an identification of a corresponding parent window displayed by the local machine 102. In still another of these embodiments, the window mapping component executes on the local machine 102. In yet another of these embodiments, the window mapping component includes a component executing on the remote machine 106.

In some embodiments, the system provides shared file system visibility between a remote machine 106 and a local machine 102. In one of these embodiments, some or all of the file system objects visible on one machine are also visible on the other and a mapping between file system paths in both directions is known. For example, and in another of these embodiments, both the remote machine 106 and the local machine 102 may map the same network drive making it visible to both. In another of these embodiments, an expectation of shared file system visibility arises due to characteristics of shell extension APIs; for example, many shell extensions are initialized by the shell using a list of filenames to operate upon (for example, by using an IDataObject containing the list), and thereafter they operate upon the file attributes or file contents via the filenames. In other embodiments, alternatives to sharing file system visibility are provided, including working with limited shared visibility or initializing a handler using an IStreams interface. In still other embodiments, the system 600 includes a file system path mapping component, which may provide functionality for improving shared file system visibility between a remote machine 106 and the local machine 102.

In one embodiment, a file system path mapping component maps file system paths between a file system on the remote machine 106 and the local machine 102. In another embodiment, the file system path mapping component allows shell extension actions on files and directories to work across the remote machine 106 and the local machine 102, where a file system path to an object—such as a text document on the remote machine 106—may not be the same as the path to the corresponding object on the local machine 102; for example, in a case where a drive C: on local machine 102 is mapped to drive M: on remote machine 106 using client drive mapping, the remote machine 106 path M:\Temp\test.txt refers to the same file as the local machine 102 path C:\Temp\test.txt.) In still another embodiment, the file system path mapping component forms a part of a component providing data mapping functionality. In yet another embodiment, the file system path mapping component leverages functionality for client drive mapping, special folder redirection and reverse client drive mapping ("desktop drive mapping" or "server drive mapping").

In one embodiment, the file system path mapping component is aware of a plurality of ways to map file system paths between the remote machine 106 and the local machine 102, including, but not limited to, network shares (whether from the remote machine 106 and the local machine 102, or from both the remote machine 106 and the local machine 102 to a third location) and administrative network shares. In another embodiment, the file system path mapping component includes functionality for correctly handling mappings for shell folders (even those that might be redirected such as "My Documents"). In still another embodiment, the file system path mapping component determines which file system objects on the remote machine 106 are not visible to the local machine 102 and, hence, which do not have shell extension proxy handler functionality made available for them.

In one embodiment, the file system path mapping component executes on the remote machine 106. In another embodiment, the file system path mapping component executes on the local machine 102. In still another embodiment, the file system path mapping component executes on both the remote machine 106 and the local machine 102. In yet another embodiment, the file system path mapping component includes a remote machine 106 element identifying at least one file system objects on the remote machine 106 that are not to be made visible to the local machine 102.

Figure 7:
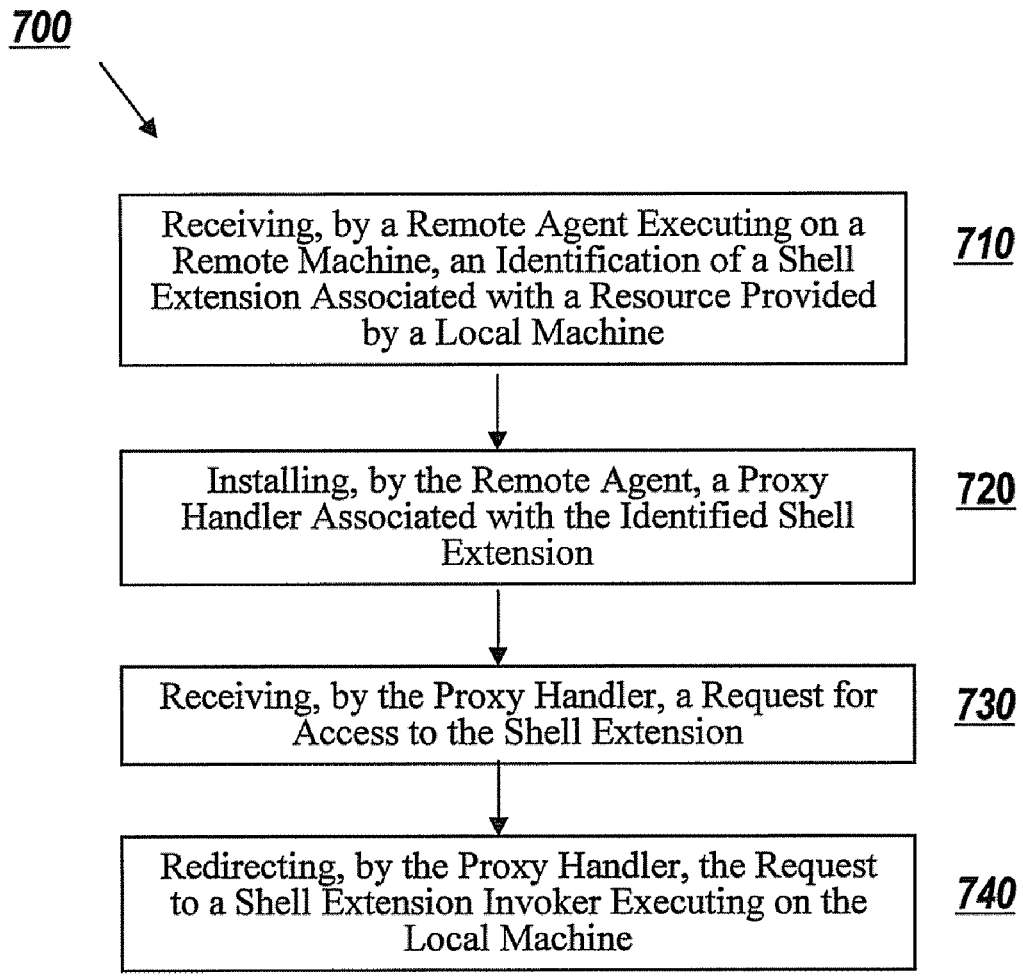
FIG. 7 is a flow diagram depicting an embodiment of a method for providing, by a remote machine, access to functionality of a shell extension associated with a resource executing on a local machine.

Referring now to FIG. 7, a flow diagram depicts an embodiment of a method 700 for providing, by a remote machine 106, access to functionality associated with a resource 220 executing on a local machine 102. In brief overview, the method 700 includes receiving, by a remote agent 602 executing on a remote machine 106, an identification of a shell extension 620 associated with a resource 220 provided by a local machine 102 (block 710). The remote agent 602 installs a proxy handler 610 associated with the identified shell extension 620 (block 720). The proxy handler 610 receives a request for access to the shell extension 620 (block 730) and redirects the request to a shell extension invoker 618 executing on the local machine 102 (block 740).

A remote agent 602 executing on a remote machine 106 receives an identification of a shell extension 620 associated with a resource 220 provided by a local machine 102 (block 710). In some embodiments, a local agent 614 executing on the local machine 102 identifies a shell extension 620 associated with a local resource 220, wherein the shell extension 620 is to be integrated into a desktop environment 204 of the remote machine 106. Such identification by the local agent may, in some embodiments, be achieved by watching or polling a local registry 616, or by hooking registry functions within a resource 220, or by registering for registry change notifications, or by monitoring changes via a registry filter driver. In some of these embodiments, the local agent may publish the identified shell extension 620 to, for example, the remote agent 602.

In one embodiment, the remote agent 602 receives, from the local agent 614, with the identification of the shell extension 620, an identification of a registry key for integration into the desktop environment. In another environment, and as described in greater detail above, the registry key may be a PseudoProgID registry key defining information relevant to a file type association with which the shell extension 620 is associated. In still another embodiment, a local resource 220 that is included in the integrated desktop includes a shell extension handler that implements functionality defined by a PseudoProgID registry key.

In one embodiment, the remote agent 602 receives, from the local agent 614, with the identification of the shell extension 620, an identification of a file type to be included in the integrated desktop. In another embodiment, a shell extension 620 that is included in the integrated desktop is associated with the file type. In still another embodiment, the remote agent 602 registers, with the remote registry 604, a registry key associated with the identified file type.

In one embodiment, the remote agent 602 receives, from the local agent 614, an identification of a shell extension handler providing enhanced drag and drop functionality. In another embodiment, the remote agent 602 receives, from the local agent 614, an identification of a shell extension handler providing customized icons for display. In still another embodiment, the remote agent 602 receives, from the local agent 614, an identification of a shell extension handler providing additional functionality for a data object, such as a file class object, a mounted drive object, or a control panel applet object. In still even another embodiment, the remote agent 602 receives, from the local agent 614, an identification of a shell extension handler providing additional functionality for an image associated with a shell object, such as a thumbnail image. In yet another embodiment, the remote agent 602 receives, from the local agent 614, an identification of a shell extension handler providing additional functionality in a display of dynamic information to a user, such as in an "InfoTip" pop-up window.

In one embodiment, the remote agent 602 receives, from the local agent 614, an identification of a shell extension handler providing additional functionality for customized columns displayed in a desktop environment (for example, in a "Details" view in a MICROSOFT WINDOWS desktop environment). In another embodiment, the remote agent 602 registers the shell extension proxy handlers directly under the registry key HKCR\Folder\shellex\ColumnHandlers, and no file type association or ProgIDs are involved. In still another embodiment, when shell object(s) are dragged between shell folders using the right mouse button, the shell shows a context menu when the user drops the object(s); this menu contains the options to copy, move or create a shortcut to the source file in the target location, or cancel the operation. In yet another embodiment, the remote agent 602 receives, from the local agent 614, an identification of a shell extension handler augmenting a context menu with new options and code to execute them if selected.

In one embodiment, the remote agent 602 receives, from the local agent 614, an identification of a shell extension handler providing additional functionality for customizing images associated with an icon, such as, for example, an icon overlays or other small image overlaid on the bottom-left part of an icon to provide additional information; for example, the shell may use a small arrow overlay to indicate a link, and custom overlays can be provided using an icon overlay handler. In one embodiment, the remote agent 602 receives, from the local agent 614, an identification of a shell extension handler implementing an interface such as IShellIconOverlayIdentifier In one embodiment, the local agent 614 identifies a plurality of shell extensions installed on the local machine 102, which are provided by any resource on the local machine 102, and that are to be integrated into the remote desktop. In another embodiment, the local agent 614 identifies at least one shell extension upon the establishment of a presentation layer protocol connection between the local machine 102 and the remote machine 106. In still another embodiment, the local agent 614 identifies at least one shell extension upon the establishment of a connection between the local machine 102 and the remote machine 106 within which the local machine 102 will display an integrated, full-screen desktop providing integrated access to resources—including shell extensions—provided by both the local machine 102 and the remote machine 106. In yet another embodiment, the local agent 614 identifies at least one shell extension upon the establishment of a connection between the local machine 102 and the remote machine 106 within which the local machine 102 will integrate a display of at least one data object maintained on the remote machine into a local display of a desktop environment.

In some embodiments, to identify a shell extension, the local agent 614 identifies a shell extension handler provided by any resource whose display of output data is to be included in the display of the integrated desktop. In one of these embodiments, the local agent 614 identifies a file class associated with the shell extension handler. In another of these embodiments, a ProgID refers to a name within the WINDOWS operating system for a resource—such as an application or COM server—that acts as a file type association handler. In still another of these embodiments, a default ProgID is defined for each file type association, but file types may also be associated with lists of alternate ProgIDs and lists of registered application executables that can also handle them; a registered application acts as a pseudo-ProgID for the purposes of file type association, but it is defined differently in the registry. In yet another of these embodiments, a pre-defined shell objects may also act as pseudo-ProgIDs representing classes of shell objects; these include, without limitation, drives, folders, directories, file system objects (of any type), any file class, the background (of either a desktop or Explorer folder view window).

In one embodiment, a PseudoProgID is a ProgID—a name/identifier of a resource. In another embodiment, a PseudoProgID is a registered application, which also references a resource. In still another embodiment, a PseudoProgID is a class of pre-defined shell object. In yet another embodiment, a PseudoProgID—provides functionality substantially similar to that of a file type. In still another of these embodiments, a PseudoProgID registry key may define information relevant to the file type association it provides, including, without limitation, a default icon, an info tip, a friendly type name for display to a user, and an identification of an edit flag defining what file type association editing actions can be performed via the shell.

In one embodiment, to identify a shell extension, the local agent 614 identifies a shell extension handler not associated with any file classes but provided by any resource whose display of output data is to be included in the display of the integrated desktop.

In some embodiments, the local agent 602 gathers information to identify a shell extension handler, a relevant file type, a relevant ProgID or PseudoProgID, and the associations amongst them. In one of these embodiments, a shell extension handler is discovered by enumerating all registry keys of the correct form for the type of shell handler in question. For example, and in another of these embodiments, some of the relevant registry keys are of the form HKCR\<ProgID>\shellex\<handler-type key>, where the default value under that key is the string form of the GUID for the handler COM object (which is registered in the usual fashion). In this embodiment, and for registered applications, the data is found under key HKCR\Applications\<app> instead of the <ProgID> key, where <app> is the executable name (generally including the .exe or .dll extension) but omitting path. This embodiment describes the process in terms of HKCR but, in other embodiments, the shell uses additional layers of registry keys to determine appropriate behavior for a particular object. In other embodiments, the keys may define user customization for a file type, system file associations, system file perceived type associations, and wildcard keys for the base class and all file system objects. In this embodiment, this form is used by extensions that are registered for a particular file class; different extension types use different registry key forms. In still another of these embodiments, extensions that are not bound to a file class may use different registry keys such as the following examples:

HKCR\Directory\shellex\DragDropHandlers\<handler-name>

HKLM\Software\Microsoft\Windows\CurrentVersion\Explorer\ShellIcon OverlayIdentifiers\<handler>

In still even another of these embodiments, this enumeration process results in a list of extension handler GUIDs, as well as a list of [Pseudo]ProgIDs for which handlers are registered (and the association between them) or of an association to a file extension rather than a ProgID.) In yet another embodiment, the COM GUIDs can be mapped to executable files using the registry's COM registration database. In some embodiments, the local agent 602 may gather additional information specific to the extension type during a process of enumeration of a shell extension handler.

In one embodiment, the local agent 614 identifies a drop handler implementing IPersistFile and IDropTarget interfaces. In another embodiment, the local agent 614 identifies a shell extension handler associated with a ProgID registry key by enumerating at least one registry key of a particular form. For example, in still another embodiment, the local agent 614 enumerates registry keys of the form: HKCR\<ProgID>\shellex\DropHandler.

In one embodiment, the local agent 614 identifies a shell extension handler providing functionality associated with a menu item. For example, the shell extension handler may enable a new menu in a menu. In another embodiment, the local agent 614 retrieves an enumeration of shortcuts stored in a directory associated with a shell shortcut on the local machine 102. In still another embodiment, the local agent 614 accesses a directory—such as a "Send To" directory—using HGetSpecialFolderLocation(NULL, CSIDL_SENDTO, &pid1), to identify the shell extension handler.

In one embodiment, the local agent 614 identifies a file associated with a shell extension handler on the local machine 102; for example, drop handlers may be associated with small (often zero-byte) files with extensions, which may be found in the shell "Send To" directory. In this embodiment, a registry key associated with the extension (HKCR\<.ext>) typically has a default value of the form "CLSID\{<GUID>}" which defines the drop handler GUID. In this embodiment, the CLSID entry for the drop handler GUID has a default string used by the shell when a user browses a Send To directory, as well as the typical COM server definition data; HKCR\CLSID\{<GUID>} \shellex\DropHandler may also be present, with a default value that is a loopback pointing to the same GUID. In this embodiment, the local agent 614 uses the GUID to identify the shell extension handler.

In one embodiment, the local agent 614 identifies a shell extension handler by enumerating a file in a "Send To" folder maintained by a shell on the local machine 102. In another embodiment, the local agent 614 identifies a shell extension handler by enumerating an application shortcuts identified in a "Send To" folder. In still another embodiment, the local agent 614 identifies a shell extension handler by enumerating a file system location shortcut identified in a "Send To" folder. In yet another embodiment, the local agent 614 identifies a shell extension handler by determining or computing a set of built-in menu items provided on the local machine 102. In some embodiments, the local agent 614 transmits, to the remote agent, an identification of a file system location shortcut associated with a shell extension proxy handler and an identification of a path name associated with the shortcut.

In one embodiment, the local agent 614 identifies a handler implementing IPersistFile and IExtractIcon interfaces. In another embodiment, the local agent 614 identifies a shell extension handler associated with a ProgID registry key by enumerating all registry keys of a particular form. For example, in still another embodiment, the local agent 614 enumerates registry keys of the form: HKCR\<ProgID>\shellex\IconHandler.

In one embodiment, the local agent 614 identifies a shell extension handler providing additional functionality for a "Properties" menu item displayed when a user right-clicks on a data object in a desktop environment displayed on the local machine 102. In another embodiment, when a user requests access to a "Properties" menu item, a property sheet is displayed with a user may view or modify a property of the data object. In still another embodiment, the shell extension handler providing additional functionality allows the customization of this property sheet.

In one embodiment, such a shell extension handler may provide additional functionality—for example, by adding a page—to a Properties sheet for a file class object. In another embodiment, such a shell extension handler may provide additional functionality to a Properties sheet for a mounted drive object. In still another embodiment, such a shell extension handler may provide additional functionality to a control panel applet object. In still even another embodiment, a shell extension handler providing additional functionality for a file class or a mounted drive can add a custom page to the Properties sheet for that class. In yet another embodiment, a shell extension handler providing additional functionality for a control panel applet can replace a page in the property sheet provided by the applet.

In one embodiment, the local agent 614 identifies a shell extension handler implementing IShellExtInit and IShellPropSheetExt interfaces. In another embodiment, the local agent 614 identifies a shell extension handler associated with a ProgID registry key by enumerating all registry keys of a particular form. For example, in still another embodiment, the local agent 614 enumerates registry keys of the form: HKCR\<ProgID>\shellex\PropertySheetHandlers\<handler name>.

In some embodiments, a shell extension handler providing additional functionality for a data object, such as a mounted drive object, is not associated with a ProgID registry key. In one of these embodiments, the local agent 614 identifies the shell extension handler by enumerating registry keys of the forms:
HCKR\Drive\shellex\PropertySheetHandlers\<handler name>. In other embodiments, a shell extension handler providing additional functionality for a data object, such as a control panel applet object, is not associated with a ProgID registry key. In one of these embodiments, the local agent 614 identifies the shell extension handler by enumerating registry keys of the form:
HKCU\Control Panel\<applet>\shellex\PropertySheetHandlers\<my handler>
HKLM\Software\Microsoft\Windows\CurrentVersion\ControlsFolder\<applet>\shellex\PropertySheetHandlers\<my handler>.

In one embodiment, the local agent 614 identifies a shell extension handler implementing an IThumbnailProvider interface and one or more of IInitializeWithFile, IInitializeWithItem and IInitializeWithStream interfaces. In another embodiment, the local agent 614 identifies a shell extension handler associated with a file class. In still another embodiment, the local agent 614 identifies a shell extension handler registered using a subkey named for a specific GUID.

In one embodiment, the local agent 614 identifies the shell extension handler by enumerating registry keys of the form: HKCR\<.ext>\shellex\{E357FCCD-A995-4576-B01F-234630154E96}; the default value of the key is a string form of the GUID of the shell extension COM server. In another embodiment, the local agent 614 identifies the shell extension handler by enumerating values under HKCR\<.ext> that can affect the thumbnail preview handling for a given file class, including, but not limited to: i) ThumbnailCutoff, which defines a minimum size beyond which thumbnails will not be displayed, ii) TypeOverlay, which specifies a specific thumbnail overlay (as a resource), no overlay, or the ProgID's default icon; and iii) Treatment, which specifies a type of adornment that Windows should apply to the thumbnail.

In one embodiment, the local agent 614 identifies a shell extension handler implementing an IQueryInfo and IPersistFile interface. In another embodiment, the local agent 614 identifies a shell extension handler associated with a file class. In still another embodiment, the local agent 614 identifies a shell extension handler registered using a subkey named for a specific GUID. In still even another embodiment, the local agent 614 identifies the shell extension handler by enumerating registry keys of the form: HKCR\<.ext>\shellex\{00021500-0000-0000-0000-000000000046}; the default value of the key is a string form of the GUID of the shell extension COM server.

In one embodiment, the local agent 614 identifies a shell extension handler implementing an IColumnProvider interface. In another embodiment, the local agent 614 identifies a shell extension handler registered under a PseudoProgID "Folder". In still another embodiment, the local agent 614 identifies the shell extension handler by enumerating registry keys of the form: HKCR\Folder\shellex\ColumnHandlers\{<GUID>}, where "{<GUID>}" is the string form of the GUID of the handler. In yet another embodiment, the local agent 614 identifies a shell extension handler implementing an IColumnProvider::Initialize( ) function to initialize the shell extension handler (i.e., a new copy of the DLL can be created for each proxy column handler required, and each proxy handler instance knows which client-side handler (via GUID) to direct proxied requests to, and are registered under its own GUID).

In one embodiment, the local agent 614 identifies a shell extension handler implementing an ICopyHook interface. In another embodiment, the local agent 614 identifies a shell extension handler registered under a PseudoProgID "Directory". In still another embodiment, the local agent 614 identifies the shell extension handler by enumerating registry keys of the form: HKCR\Folder\shellex\CopyHookHandlers\<my handler name>, where the default value of that key is the string form of the GUID of the handler.

In one embodiment, the local agent 614 identifies a shell extension handler implementing an IContextMenu interface. In another embodiment, the local agent 614 identifies a drag-n-drop shell extension handler enumerating all registry keys of the form: HKCR\Directory\shellex\DragDropHandlers\<handler name>, where the default value of this key is the string form of the GUID of the shell extension COM server.

In one embodiment, the local agent 614 identifies a shell extension handler implementing an IShellIconOverlayIdentifier interface. In another embodiment, the local agent 614 identifies a shell extension handler registered with a shell on the local machine 102. In still another embodiment, the local agent 614 identifies the shell extension handler by enumerating registry keys of the form: HKLM\Software\ Microsoft\Windows\CurrentVersion\Explorer\ShellIcon- OverlayIdentifiers\<my handler name>, where the default value of that key is the string form of the GUID of the handler.

In one embodiment, the local agent 614 identifies a shell extension handler by enumerating registry keys of the form: HKLM\Software\Microsoft\Windows\CurrentVersion\ Explorer\FindExtensions\Static\<my handler name>, where the default value of that key is the string form of the CLSID_ ShellSearchExt GUID (currently "{169A0691-8DF9-11d1-A1C4-00C04FD75D13}"). In another embodiment, the local agent 614 identifies the shell extension handler by retrieving a value stored in a subkey including a default value identifying the shell extension handler. In another embodiment, the local agent 614 identifies the shell extension handler by retrieving a value stored in a subkey of a subkey named DefaultIcon whose default value specifies an icon associated with the shell extension handler as a string <file path>,<icon index>. In still another embodiment, the local agent 614 identifies an attribute of the shell extension handler by retrieving a value stored in a SearchGUID subkey of a subkey, where the default value is the GUID of the DHTML document. In still another embodiment, the local agent 614 identifies an attribute of the shell extension handler by retrieving a value stored in a URL subkey of a SearchGUID subkey of a subkey, where the default value is a URL subkey whose default value is a path to an HTML document to be opened in an Explorer bar. In still another embodiment, the local agent 614 identifies an attribute of the shell extension handler by retrieving a value stored in a SearchGUID subkey of a subkey, where the SearchGUID subkey includes a UrlNavNew key whose default value is the path to the HTML doc to be opened to the right of the Explorer bar.

In some embodiments, a local agent 614 identifies a resource associated with a shell extension handler. In one of these embodiments, a local agent 614 identifies the resource after completing a process of enumerating at least one shell extension handler. In another of these embodiments, for each handler identified, the local agent 614 determines whether the identified handler is provided by one of the resources that owns a shortcut that is to be included in the display of the integrated, full-screen desktop.

In one embodiment, the local agent 614 includes functionality for determining whether a first resource is associated with a second resource. In another embodiment, the determination is made responsive to an analysis of at least one discovered short cut. In still another embodiment, an application installer installs a resource in an application-specific directory trees dedicated to that particular binary application. In such an embodiment, the local agent 614 includes functionality for performing circumstances a path-based test to identify the application. In some embodiments, the local agent 614 may include functionality for performing sophisticated determinations to supplement path-based testing, including, but not limited to, inspecting the file properties for indications that may identify the application, parsing installation logs, drawing inferences from file timestamps, searching for human-readable strings within the executable, and consulting databases of executable hashes or digital signatures. In other embodiments, a determination is made as to whether the folder containing the discovered resource is the same as or a descendant of any folder containing an integrated shortcut target. For example, if a static verb handler or context menu handler executable is found in this folder:

"C:\Program Files\Company B\App C\binaries\handler" and if there is a shortcut to be integrated into the remote desktop whose target is found in this folder: "C:\Program Files\Company B\App C\binaries" then the discovered handler may be considered to belong to the same application as the shortcut, and thus should also be integrated into the remote desktop, along with any [Pseudo]ProgIDs that use it.

In one embodiment, the local agent 614 identifies at least one shell extension handler and at least one resource associated with the at least one shell extension handler. In another embodiment, the local agent 614 identifies a ProgID or Pseudo ProgID registry key associated with an identified shell extension handler to be included in the integrated desktop. In still another embodiment, the local agent 614 identifies at least one file type to be included in the integrated desktop, the at least one file type mapping to the identified ProgID or Pseudo ProgID registry key. In yet another embodiment, the identified at least one file type is already identified for inclusion in the integrated desktop as it is directly associated with an extension handler.

In some embodiments, an identified file type is defined by its file extension (e.g. ".doc" or ".ini"). In one of these embodiments, the file type may be identified by enumerating all registry keys of the form: HKCR\<.ext>, where <.ext> is the file extension including the leading period. In another of these embodiments, under each file type registry key the following data may be found, without limitation:

a default REG_SZ value, which is a default ProgID handler for the file type;

an OpenWithProgIDs key containing subkeys whose names are alternate ProgIDs that can also handle the file type;

an OpenWithList key containing subkeys whose names are alternate registered applications that can also handle the file type; and a PerceivedType REG_SZ value, which may be used as a pseudo-file-type for which other handlers may be registered.

In still another of these embodiments, the mapped ProgID registry key and registered applications may be checked against the list of PseudoProgID registry keys that will be integrated. In still even another of these embodiments, a predefined shell object having a PseudoProgID registry key is handled differently, as it may act as a class of object that may include all file types (e.g. PseudoProgID "*" which represents all file types). In yet another embodiment, any file type which maps to a PseudoProgID registry key that is to be integrated may also be integrated (although on the remote machine it may not map to any client PseudoProgID registry key that were not themselves integrated).

In one embodiment, the local agent 614 monitors the at least one shell extension for any change. In another embodiment, the local agent 614 polls at least a portion of the local registry 616. In still another embodiment, the local agent 614 includes a hooking component and hooks registry functions. In some embodiments, the local agent 614 stores an identification of the at least one shell extension on the local machine 102. In another embodiment, the local agent 614 transmits an identification of the at least one shell extension to the remote agent 602 on the remote machine 102.

In one embodiment, the local agent 102 performs on-going monitoring for changes to data. In another embodiment, to perform monitoring, the local agent 102 may use functionality such as that provided by SHChangeNotifyRegister( ), RegNotifyChangeKeyValue( ), or a registry filter driver, or by polling or other mechanism to determine when changes to the registry data occur. In still another embodiment, given the set of registry data changes identified, the local agent 614 computes the changes to the set of integrated shell extension data.

The remote agent 602 installs a proxy handler 610 associated with the identified shell extension 620 (block 720). In some embodiments, the remote agent 602 may register the proxy handler 610 with a registry 604 on the remote machine 106. In some embodiments, installation of the proxy handler by the remote agent 602 may include sending a message to a shell 606 on the remote machine 106. In one embodiment, the remote agent 602 integrates a display of the result into a desktop environment 204 generated by the remote machine 106.

In one embodiment, the remote agent 602 registers, with the remote registry 604, a registry key associated with the shell extension proxy handler 610. In another embodiment, the remote agent 602 registers, with the remote registry 604, a PseudoProgID registry key associated with the shell extension proxy handler 610. In still another embodiment, prior to registering the registry key with the remote registry 604, the remote agent 602 determines whether the remote registry 604 includes a version of the registry key. In yet another embodiment, registering the registry key with the remote registry 604 results in the addition of attributes defined by the registry key to the desktop environment monitored by the remote agent 602. In some embodiments, and as described in greater detail above, the attributes defined by the registry include icons, user-friendly alternate file names, and information to display in a window associated with the resource 220 (such as an InfoTip pop-up window). In other embodiments, the remote agent 602 installs a shell extension proxy handler after adding a PseudoProgID registry key to the remote registry 604.

In one embodiment, the installation of a shell extension proxy handler 610 results in integration of functionality between the resource 220 on the local machine 102 and the desktop environment monitored by the remote agent 602. In another embodiment, the shell extension proxy handler 610 processes a request received from the shell 606 for functionality associated with the resource 220. In still another embodiment, the shell extension proxy handler 610 redirects a request received from the shell 606 for functionality associated with the resource 220 to the local machine 102 for processing by the shell extension invoker 618. In yet another embodiment, a received result of executing the shell extension 620 on the local machine 102 is displayed in a desktop environment 204 generated by the remote machine 106.

In one embodiment, the remote agent 602 installs a single shell extension proxy handler 610. In another embodiment, the remote agent 602 installs a proxy handler COM server—which may be a dynamically linked library or as an executable file—for a particular shell extension type. In still another embodiment, as the remote agent 602 installs each of a plurality of shell extension proxy handlers, a new copy of the proxy handler COM server is installed for each of the shell extension proxy handlers. In still even another embodiment, a new copy of the proxy handler COM server executable file is created each time a new shell extension GUID is identified In some embodiments, when executed, the proxy handler COM server analyzes its own file name to identify a GUID identifying a data object on the local machine 102 with which the shell extension proxy handler 610 and the proxy handler COM server are associated. In one of these embodiments, the GUID identifying the data object on the local machine 102 is transmitted to the local agent 602 with a redirected request for access to shell extension functionality.

In one embodiment, the remote agent 602 associates a file type identified by the local agent 614 with a registry key received from the local agent 614, such as a PseudoProgID registry key. In another embodiment, the remote agent 602 associates a file type association handler with the file type and with the registry key. In some embodiments, the remote agent 602 transmits a notification of the association to the shell 606. In one of these embodiments, the remote agent 602 transmits a message to the shell 606 by calling a function used to notify the shell 606 of changes; for example, the remote agent 602 may call a SHChangeNotify( ) function with the SHCNE_ASSOCCHANGE event parameter.

In some embodiments, the remote agent 602 installs a shell extension proxy handler not associated with a ProgID registry key. In one of these embodiments, the remote agent 602 creates the shell extension proxy handler 610. In another of these embodiments, the remote agent 602 associates the shell extension proxy handler 610 with a GUID identifying a shell extension handler on the local machine 102. In still another of these embodiments, the remote agent 602 associates the shell extension proxy handler 610 with the shell extension invoker 618. In yet another of these embodiments, the remote agent 602 registers the shell extension proxy handler 610 with the shell 606; for example, the remote agent 602 may transmit a message to the shell 606 identifying the shell extension proxy handler 610, or the remote agent 602 may modify a registry entry to identify the shell extension proxy handler 610.

In one embodiment, the remote agent 602 virtually installs a shell extension proxy handler. In some embodiments, the remote agent 602 intercepts a request for an identification of a handler. In one of these embodiments, the remote agent 602 intercepts a request for a file in a file system identifying the handler. In another of these embodiments, the remote agent 602 intercepts a request for a registry key in a registry identifying the handler. In still another of these embodiments, In still another of these embodiments, the remote agent 602 responds to an intercepted request with an identification of the shell extension proxy handler. In still even another of these embodiments, a file system filter driver intercepts the request and responds with the identification of the shell extension proxy handler. In yet another of these embodiments, a registry filter driver intercepts the request and responds with the identification of the shell extension proxy handler. In other embodiments, the remote agent 602 includes a hooking component hooking a request for an identification of a handler and responding with an identification of the shell extension proxy handler. In still other embodiments, the remote agent 602 intercepts a COM function call for an identification of a handler and responds with an identification of the shell extension proxy handler.

The proxy handler 610 receives a request for access to the shell extension 620 (block 730). In some embodiments, the request for access to the shell extension 620 may be transmitted by a shell 606 on the remote machine 106 to the proxy handler 610. In other embodiments, a user of a remote desktop environment 204 may request for access to the shell extension 620. In still other embodiments, a shell 606 requests access to the proxy handler 610 itself.

In some embodiments, the remote agent 602 identifies a user request for access to the shell extension 620. In one of these embodiments, a user interacts with a display of a data object on the local machine 102 and the local agent 614 detects the interaction and forwards an identification of the interaction to the remote agent 602. In another of these embodiments, the remote agent 602 determines that a user interaction with a display of a data object—such as a user interface element displayed in an integrated desktop environment—is a request for access to a shell extension 620. In still another of these embodiments, the remote agent 602 identifies a file type associated with the data object. In still even another of these embodiments, the remote agent 602 forwards the identified user request to the shell 606, which may provide the functionality described above for identifying a user interaction as a request for access to a shell extension 620. In other embodiments, a resource 215 requests access, from the shell 606, to a shell extension.

In one embodiment, the shell 606 receives an identification of a user interaction with a data object associated with a resource 220 provided by the local machine. In another embodiment, the shell 606 determines that the identified user interaction is a request for access to functionality provided by a shell extension. In still another embodiment, the shell 606 receives an identification of a user request for access to functionality provided by a shell extension.

In one embodiment, the shell 606 identifies a file type association of the data object. In another embodiment, the shell 606 identifies a file type association of a shell extension. In still another embodiment, the shell 606 identifies shell extension proxy handler 610 associated with the requested functionality. In still even another embodiment, the shell 606 initializes the shell extension proxy handler 610. In another embodiment, the shell 606 identifies at least one shell object associated with the shell extension proxy handler 610. In yet another embodiment, the shell 606 identifies at least one folder and at least one operation-modifying flag associated with the shell extension proxy handler 610.

In some embodiments, to initialize a shell extension proxy handler 610, the shell 606 uses an interface to retrieve an identification of the shell extension proxy handler 610. In one of these embodiments, for example, the shell 606 uses an IPersistFile interface to call a GetClassID( ) function and retrieve a CLSID for the shell extension proxy handler 610. In another of these embodiments, the shell 606 uses the IPersistFile interface to call a Load( ) function and supply a file name on which the shell extension proxy handler 610 should operate and a file access mode. In still another of these embodiments, the shell extension proxy handler 610 returns its CLSID in response to GetClassID( ) and stores the filename (and access mode) passed to Load( ) for use when handling future calls from the shell—or passes it (mapped to the file system view of the local machine 102) on to a shell extension handler on the local machine 102 via the shell extension invoker 618, if that responsibility is delegated to the client. For some types of shell extension proxy handler 610, for example, where file usage semantics are constrained by the definition of the extension interface, the shell extension proxy handler 610 may stream the file (possibly doing so on-demand) to the shell extension handler on the local machine 102 (or to the shell extension invoker 618) instead of passing the file name or deliver data blocks from the file as requested.

In one of these embodiments, the shell 606 uses the IPersistFile interface to retrieve a CLSID if the shell extension proxy handler 610 supplies its own CLSID. In another of these embodiments, the system maintains a mapping from the CLSID of the shell extension proxy handler 610 to a CLSID of a shell extension handler on the local machine 102. In still another of these embodiments, a standard shell extension proxy handler DLL is copied to a new instance with a unique path for each new shell extension handler 620 GUID and associated with the shell extension handler 620CLSID in a way that the proxy handler itself can determine; for example, the CLSID of the shell extension proxy handler 610 may be embedded in the file path to the shell extension proxy handler 610. In other embodiments, any supplementary mechanism that can associate the proxy handler 610 CLSID to the shell extension handler 620CLSID may be used. In still other embodiments, the CLSID of the shell extension handler on the local machine 102 may be embedded in the path and a mechanism provided to create the association between the CLSID of a shell extension handler on the local machine 102 and the CLSID of the shell extension proxy handler 610. In yet other embodiments, both the CLSID of the shell extension handler on the local machine 102 and the CLSID of the shell extension proxy handler 610 may be embedded in the path name.

In some embodiments, the shell 606 initializes a shell extension proxy handler 610 implementing an interface such as IInitializeWithFile, IInitializeWithStream or IInitializeWithItem. In one of these embodiments, the shell 606 uses an interface such as IInitializeWithFile, IInitializeWithStream or IInitializeWithItem to initialize the shell extension proxy handler 610 by specifying a file—or a pseudo-file—upon which the shell extension proxy handler 610 should operate. In another of these embodiments, using these interfaces does not require the shell extension proxy handler 610 to return a CLSID. In still another of these embodiments, an IInitializeWithFile::Initialize( ) function accepts a file path and an access mode (read only or read/write) and, in response to initialization, the shell extension proxy handler 610 attempts to open the file with the requested mode and keep it open for the life of the handler (or until IPropertyStore::Commit( ) function is called). In still even another of these embodiments, an IInitializeWithStream::Initialize( ) function accepts an IStream pointer and an access mode (read only or read/write) and, in response to initialization, the shell extension proxy handler 610 keeps the stream open for the lifetime of the handler or until IPropertyStore::Commit( ) is called. In this embodiment, an IStreams interface can represent files that are not accessible via file system paths (e.g. files embedded within a ZIP file). In yet another of these embodiments, an IInitializeWithItem::Initialize( ) function accepts an IShellItem pointer and an access mode (read only or read/write).

In some embodiments, a shell extension proxy handler 610 can choose which of these interfaces to expose. In one of these embodiments, the choice may depend on which of these interfaces the corresponding shell extension handler on the local machine 102 exposes. In another of these embodiments, the shell extension proxy handler 610 exposes an IInitializeWithFile interface and can then operate with any or all of the three interfaces on the corresponding shell extension handler on the local machine 102 (although, in some embodiments, the shell extension proxy handler 610 relies upon shared file system visibility to do so). For example, and in still another of these embodiments, the corresponding shell extension handler on the local machine 102 may i) pass the mapped file name directly to the file initialization interface, ii) open the file using the mapped filename and present it as an IStream for the stream initialization interface, and iii) pass the shell item corresponding to the file specified by the mapped filename to the shell item interface. In still even another of these embodiments, a corresponding shell extension handler on the local machine 102 that supports the stream interface is represented by a shell extension proxy handler 610 that supports the stream interface using stream remoting techniques. In yet another of these embodiments, there are other combinations of interfaces used by the shell extension proxy handler 610 and the corresponding shell extension handler on the local machine 102.

The proxy handler 610 redirects the request to a shell extension invoker 618 executing on the local machine 102 (block 740). In some embodiments, the proxy handler 610 transmits, to the shell extension invoker 618, data associated with the request. In other embodiments, the proxy handler 610 receives a result of executing the shell extension 620 on the local machine. In some of these embodiments, a received result of executing the shell extension 620 on the local machine 102 is displayed in a desktop environment 204 generated by the remote machine 106.

In one embodiment, an initialized shell extension proxy handler 610 receives, from the shell 606, an identification of a user request for access to shell extension functionality. In another embodiment, the shell extension proxy handler 610 receives, from the shell 606, data associated with the request. In still another embodiment, the shell extension proxy handler 610 redirects the request and any associated data received from the shell 606 to the shell extension invoker 618 on the local machine 102.

In some embodiments, the shell extension proxy handler 610 transmits the request and any associated data directly to the shell extension invoker 618. In other embodiments, the shell extension proxy handler 610 transmits the request and any associated data to the remote agent 602 for forwarding to the shell extension invoker 618. In still other embodiments, the remote agent 602 forwards the request and any associated data directly to the shell extension invoker 618. In yet other embodiments, the remote agent 602 forwards the request and any associated data to the local agent 614 for forwarding to the shell extension invoker 618.

In one embodiment, the shell extension invoker 618 receives a user request for access to shell extension functionality from at least one of the local agent 614, the remote agent 602, the shell extension proxy handler 610, and the remote machine 106. In another embodiment, the shell extension proxy handler 610 identifies a local shell extension handler associated with the requested functionality. In still another embodiment, the shell extension invoker 618 initializes the identified local shell extension handler. In still even another embodiment, the shell extension invoker 618 re-maps a path name from the remote machine 106 included in the request to a corresponding path name on the local machine 102. In yet another embodiment, the initialized shell extension handler processes the request and provides the requested shell extension functionality. In some embodiments, to process the request, the initialized shell extension handler calls at least one application programming interface associated with the shell extension functionality to provide the functionality. In one of these embodiments, the request from the remote machine 102 includes an identification of the at least one application programming interface.

In other embodiments, the local agent 614 identifies at least one shell extension handler on the local machine 102 and provides the remote agent 602 with a definition of the at least one shell extension handler. In one of these embodiments, the remote agent 602 installs the identified at least one shell extension handler on the remote machine 106. In another of these embodiments, the shell extension handler on the remote machine 106 receives the identification of the user request from the shell 606 and processes the request without redirecting the request to the local machine 102. In still another embodiment, installing the shell extension handler directly on the remote machine 106 provides local execution of shell extension functionality on remote machine 106 without communication with local machine 102, which may reduce bandwidth requirements and latency.

In one embodiment, the shell 606 initializes a shell extension proxy handler 610 that provides functionality for enabling a file to be a drop target. In another embodiment, the shell 606 initializes a shell extension proxy handler 610 that provides functionality for defining an additional menu entry; for example, by adding an additional entry in a "send to" menu that allows a user to move a file, or a copy of the file, to a different location, including, but not limited to, allowing the movement of the file or copy of the file to a different folder in a file system or an attachment of the file or copy of the file to an electronic mail message. In some embodiments, the shell 606 initializes such a shell extension proxy handler 610 when the shell 606 receives an identification that a user has interacted with a data object by dragging a representation of the data object from one location to another and dropped the representation of the data object to another. In one of these embodiments, the shell 606 initializes such a shell extension proxy handler 610 when the shell 606 receives an identification of a use of a particular interface, such as, for example, a call to an IDropTarget interface.

In one embodiment, the shell 606 calls DragEnter( ) when a user first drags a representation of a data object over a file that is a drop target, or when a user selects a "Send To" menu item implemented by a drop handler. In another embodiment, a DragEnter( ) call passes an IDataObject pointer to specify which files and/or directories are being dragged (using CF_HDROP format) and the handler's return value indicates whether it will accept the file(s) being dragged. In still another embodiment, DragLeave( ) is called when a user drags away from the target file without dropping. In still even another embodiment, Drop( ) is called when the user drops onto the target file.

In one embodiment, the DragEnter( ) call passes in (amongst other things) an IDataObject pointer used to enumerate a set of files (and/or directories) being dragged. In another embodiment, the shell extension proxy handler 610 redirects this list to a corresponding shell extension handler on the local machine 102 providing a DragEnter( ) function, mapped from the file system view of the remote machine 106 to the file system view of the local machine 102, and encapsulated in a newly-constructed IDataObject on the local machine 102. In still another embodiment, the corresponding shell extension handler on the local machine 102 determines the return value indicating whether the dragged files will be copied to, linked to, moved to by the handler or not accepted at all; this value is returned to the shell 606. In still even another embodiment, where the shell extension proxy handler 610 determines that the local machine 102 cannot see some of the files being dragged, the shell extension proxy handler 610 returns, to the shell 606, a value indicating that the dragged files will not be accepted. In still another embodiment, the shell extension proxy handler 610 proxies a DragLeave( ) calls to the corresponding shell extension handler on the local machine 102 for processing. In yet another embodiment, the shell extension proxy handler 610 proxies, to the corresponding shell extension handler on the local machine 102, a Drop( ) call with an enumeration of at least one file or folder being dropped and an identification of the file system path on the local machine 102 for processing.

In some embodiments, a shell extension proxy handler 610 is a proxy "Send To" drop handler representing a shortcut on the local machine 102 to a file system location on the local machine 102. In one of these embodiments, when DragEnter( ) is called, the shell extension proxy handler 610 identifies an associated target file system path on the local machine 102 and an enumeration of dragged files. In another of these embodiments, the shell extension proxy handler 610 redirects the identified path and enumeration to the corresponding shell extension handler on the local machine 102. In still another of these embodiments, the corresponding shell extension handler on the local machine 102 identifies a drop action based on the path and the enumeration of dragged files and the value is returned via the shell extension proxy handler 610 to the shell 606. In yet another of these embodiments, when Drop( ) is called, the shell extension proxy handler 610 redirects the path, the drop action and the enumeration of dragged files to the corresponding shell extension handler, which requests each file from the shell extension proxy handler 610 and performs the drop action.

In one embodiment, the shell 606 initializes a shell extension proxy handler 610 that provides icons customized on a file-by-file basis for display in a shell 606. In another embodiment, the shell extension proxy handler 610 executes logic to determine which icon to display. In still another embodiment, the shell extension proxy handler 610 executes logic to generate an icon for display. In yet another embodiment, the shell extension proxy handler 610 directs the shell 606 to call Extract( ) to get icon handles (thereby bypassing the shell's icon cache which is keyed on filename/icon index).

In one embodiment, the shell 606 uses an IExtractIcon interface to retrieve an icon for the object. In another embodiment, the shell 606 calls a function—such as IExtractIcon:: GetIconLocation( )—specifying flags that identify, without limitation, the following: i) whether an icon can be extracted asynchronously, ii) information for a fallback icon to display while waiting for a slow icon extraction to complete, iii) whether an icon is for use with a shell folder or with a shortcut; and iv) whether an icon represents a file in the opened or closed state. In still another embodiment, the shell extension proxy handler 610 redirects a call to a GetIconLocation( ) function to a corresponding shell extension handler on the local machine 102, via the shell extension invoker 618, with an input parameter file system path from the remote machine 106 translated to a corresponding file system path on the local machine 102.

In one embodiment, the shell extension proxy handler 610 receives a return value generated by a corresponding shell extension handler. In another embodiment, the shell extension proxy handler 610 returns, to the shell 606, a filename and an icon index identifying the icon, as well as flags identifying, without limitation, the following: i) whether the shell 606 should cache the icon, ii) whether a specified filename/icon index pair contain the location of an icon in a file; iii) whether all objects of this file class have the same icon (and, hence, whether the shell extension could be replaced by a static icon definition); iv) whether the shell 606 should create a document icon using the returned icon; and v) whether the shell 606 should further modify the identified icon. In still another embodiment, the corresponding shell extension handler returns a valid icon path and the shell extension proxy handler 610 translates the path from a file system path on the local machine 102 to a file system path on the remote machine 106 and returns the translated flag to the shell 606. In yet another embodiment, the corresponding shell extension handler returns an indication that all objects of this file class use the same icon, which the shell extension proxy handler 610 uses when responding future calls for objects of this class.

In some embodiments, where a specified filename/icon index pair received from the shell extension proxy handler 610 do not contain the location of an icon in a file, the shell 606 may pass the returned values in a call to an Extract( ) function to get the icon handle. In one of these embodiments, when the Extract( ) function is called, the shell extension proxy handler 610 passes the request to the shell extension invoker 618 which calls the corresponding shell extension handler. In another of these embodiments, if the client handler returns valid icon handles, the icons are read, marshaled and transmitted to the shell extension proxy handler 610 where they are (cached and) turned into icons in memory. In still another of these embodiments, the handles to the in-memory icons are returned to the shell 606. In yet another of these embodiments, if the corresponding shell extension handler returns S_FALSE instead of returning the requested icon handles, the shell extension proxy handler 610 notifies the shell 606 to use the ExtractIcon( ) function on the filename/index returned from the original GetIconLocation( ) call.

In other embodiments, where the shell 606 should further modify the identified icon, the shell may add a stamp to the icon (such as a VISTA UAC shield icon in MICROSOFT WINDOWS environments). In still other embodiments, where the shell 606 should not further modify the identified icon, the shell may use a default icon instead. In still even other embodiments, where a file name identifying an icon is returned, the shell 606 attempts to load the icon from its cache. In one of these embodiments, however, a "no cache" flag defeats this attempt and the shell 606 will call an Extract( ) function. In yet other embodiments, where the GetIconLocation( ) function provides some but not all of the information associated with an icon, the shell 606 calls the Extract( ) function, passing in the returned filename/icon index to retrieve the icon's handle, requesting both small and large icon handles, passing in a parameter indicating the desired size of both. In one of these embodiments, the call to this function may return S_FALSE if the original filename/icon index is valid; in this case, the shell 606 uses those values to extract the icon. In further embodiments, a shell extension invoker 618 determines when a corresponding shell extension handler references an icon located in a file on the local machine 102, extracts the icon, gives it a unique identity for future reference and sends it to the shell extension proxy handler 610, which can cache it for future use, and return a reference to it (as a filename/icon index, or by causing the shell to call Extract( )). In one of these embodiments, this allows the caching of icons across connections and sessions.

In one embodiment, a shell 606 initializes a shell extension proxy handler 610 providing additional functionality for a data object, such as a file class object, a mounted drive object, or a control panel applet object. In another embodiment, a shell 606 receives an identification of a user request for access to functionality provided by a shell extension for a property sheet associated with a data object, such as a file class object, a mounted drive object, or a control panel applet object. In still another embodiment, the shell 606 calls a function, such as IShellExtInit::Initialize( ) passing in a data object containing the object's name (in CF_HDROP format) and a PIDL referencing the folder containing the object. In still another embodiment, for property sheets associated with a file class object or a mounted drive object, the shell 606 calls an AddPages( ) function to allow a shell extension handler to add a page to the property sheet. In still even another embodiment, for property sheets associated with a control panel applet object, the shell 606 calls a ReplacePage( ) function to allow a shell extension handler to replace a page. In yet another embodiment, for property sheets associated with a mounted drive object, the data object passed to an Initialize( ) method may be in CFSTR_MOUNTEDVOLUME format rather than CF_HDROP format (in cases where the volume is mounted to a folder rather than a drive letter).

In one embodiment, a property sheet page is a modeless dialog box, which means it can execute logic and produce graphics output. In another embodiment, the shell extension proxy handler 610, in communication with the shell extension invoker 618, inserts a proxy property sheet page in a display of the property sheet on the remote machine 106. In still another embodiment, the shell extension proxy handler 610, in communication with the shell extension invoker 618, ensures that a proxy property sheet page received from the local machine 102 is displayed above a display of the property sheet on the remote machine 106.

In one embodiment, a shell 606 initializes a shell extension proxy handler 610 providing additional functionality for an image associated with a data object; for example, the functionality may include a customized thumbnail image. In another embodiment, when a shell 606 receives a request for access to the customized thumbnail image, if the shell 606 does not have a copy of the thumbnail image in a cache on the remote machine 106, the shell 606 calls a function, such as IThumbnailProvider::GetThumbnail( ) which accepts a maximum thumbnail size and returns a HBITMAP and a parameter describing the alpha channel (or lack of it) in the returned bitmap.

In one embodiment, the shell extension proxy handler 610 redirects the call to the IThumbnailProvider::GetThumbnail( ) function to the shell extension invoker 618. In another embodiment, the shell extension invoker 618 may execute a corresponding shell extension handler on the local machine 102 in-process. In still another embodiment, the shell extension invoker 618 may execute a corresponding shell extension handler on the local machine 102 out-of-process. In yet another embodiment, the corresponding shell extension handler on the local machine 102 returns a thumbnail bitmap, which the shell extension invoker 618 forwards to the shell extension proxy handler 610.

In one embodiment, the shell extension invoker 618 forwards the thumbnail bitmap to the shell extension proxy handler 610 as a streamed (possibly compressed) bitmap. In another embodiment, the shell extension invoker 618 stores the thumbnail bitmap as a file on the client and returns a reference to the file to the shell extension proxy handler 610. In still another embodiment, the shell extension proxy handler 610 maintains a cache of received thumbnail bitmaps. In yet another embodiment, the shell extension proxy handler 610 forwards the received thumbnail bitmap to the shell 606.

In one embodiment, a shell 606 initializes a shell extension proxy handler 610 providing additional functionality for a display of dynamic information. In another embodiment, for example, a shell extension proxy handler 610 may provide additional dynamic information for use in infotips—the small tooltip-like windows that appear when a user hovers a pointing device over certain shell objects (especially many files and folders). In still another embodiment, such a shell extension proxy handler 610 may make use of a portion of a file to generate the infotip data for that file. In still even another embodiment, such a shell extension handler 620 may make use of data or metadata for an object in order to generate infotip data. In yet another embodiment, policies or other mitigation mechanisms (as described above) may be implemented to control which handler instances are integrated.

In one embodiment, a shell 606 receives a request for access to a customized infotip associated with a file and calls a function in a shell extension proxy handler 610, such as IQueryInfo::GetInfoTip( ) to retrieve the customized infotip. In another embodiment, at least one input flag specifies a variation of a request (e.g. requesting the name of the item, or, when the item is a shortcut, requesting the infotip for the shortcut or the target). In still another embodiment, the shell extension proxy handler 610 redirects the request to the shell extension invoker 618, which redirects the request to a corresponding shell extension handler. In still even another embodiment, the shell extension invoker 618 receives text for display as an infotip and forwards the received text to the shell extension proxy handler 610. In yet another embodiment, the shell extension proxy handler 610 returns the infotip text in a buffer allocated in a memory space of the shell 606 using a CoTaskMemAlloc( ) function.

In one embodiment, a shell 606 initializes a shell extension proxy handler 610 providing additional functionality for a display of a column of data. In another embodiment, the shell extension proxy handler 610 is a global object called every time the shell 606 receives a request to display data according to a "Details" view. In still another embodiment, the shell extension handler 620 may open and read the entire file for which column data is being requested. In still even another embodiment, the shell extension proxy handler 610 may only need to read a small portion of the file or of the file metadata.

In one embodiment, a shell 606 receives a request for access to a customized display of data in a column format. In another embodiment, the shell 606 uses an interface, such as IColumnProvider in responding to the request. In still another embodiment, the shell 606 calls a function, such as Initialize( ) to specify the folder that is about to be displayed. In still even another embodiment, the shell 606 calls a function, such as GetColumnInfo( ) to retrieve a column identifier and at least one characteristic of the column.

In one embodiment, the shell extension proxy handler 610 receives a call to an Initialize( ) function from the shell 606 and redirects the call to the shell extension invoker 618, which forwards the call to a corresponding shell extension handler on the local machine 102. In another embodiment, the corresponding shell extension handler returns a structure that identifies the column, a title and description, the type of data (as a VARIANT type), the list view format, and a set of flags for the default column state including, but not limited to, the following: String/integer/date, shown in the shell, Slow to compute (so data is retrieved by the shell asynchronously), displayed in the "More . . . " dialog rather than the shortcut menu, Hidden from the UI. In still another embodiment, the corresponding shell extension handler returns an identification of the customized column including a FMTID/PID pair, where FMTID is a "property set format identifier" defined as a GUID and where PID is a DWORD specifying the column's property identifier.

In one embodiment, the shell extension proxy handler 610 receives a call to a GetColumnInfo( ) function from the shell 606 and redirects the call to the shell extension invoker 618, which forwards the call to a corresponding shell extension handler on the local machine 102. In another embodiment, the corresponding shell extension handler retrieves data to display in a column for each file called. In still another embodiment, the shell extension proxy handler 610 receives a call to a GetItemData( ) function from the shell 606 and redirects the call to the shell extension invoker 618, which forwards the call to a corresponding shell extension handler on the local machine 102.

In one embodiment, the shell extension invoker 618 receives the retrieved column data from the corresponding shell extension handler and forwards the retrieved data to the shell extension proxy handler 610. In another embodiment, the shell extension proxy handler 610 provides the retrieved data to the shell 606. In still another embodiment, the shell extension proxy handler 610 caches the received data.

In one embodiment, a shell 606 receives a request for access to a shell extension proxy handler 610 that prevents folders from being copied, moved, deleted or renamed. In another embodiment, the shell extension proxy handler 610 is a global object called for every request to copy, move, delete, or rename a folder, and approves or vetoes the request.

In one embodiment, a shell 606 receives a request to copy, move, delete, or rename folder. In another embodiment, the shell 606 calls a function such as CopyCallBack( ) to specify the source and destination folders and their attributes, the operation to be performed, various flags that affect the operation, and a HWND that the shell extension proxy handler 610 may use as the parent window for any UI elements. In still another embodiment, the shell extension proxy handler 610 redirects the call to the shell extension invoker 618, which forwards the call to a corresponding shell extension handler on the local machine 102. In yet another embodiment, the corresponding shell extension handler returns a value indicating whether the shell 606 should allow the operation, prevent this operation but allow other operations that have been approved to continue, or cancel both the current operation and any pending approved operations.

In one embodiment, the shell extension invoker 618 receives the value from the corresponding shell extension handler and forwards the received value to the shell extension proxy handler 610. In another embodiment, the shell extension proxy handler 610 provides the received value to the shell 606. In still another embodiment, the shell extension proxy handler 610 caches the received value.

In one embodiment, the shell 606 initializes a shell extension handler implementing an interface such as IShellIconOverlayIdentifier. In another embodiment, a shell 606 receives a request for access to a shell extension handler that provides a customized icon overlay.

In one embodiment, the shell 606 calls a function such as GetOverlayInfo( ) to request a location of an icon overlay as a file path/icon index pair. In another embodiment, when more than one overlay is requested for a particular file and the shell cannot resolve the conflict using its own internal rules the shell 606 calls a function such as GetPriority( ) to determine an icon overlay's priority; for example, this may be a number from 0-100 with 100 being lowest where the highest priority overlay is the one used. In still another embodiment, before painting an object's icon, the shell 606 passes the object name to IsMemberOf( ) to request a value indicating whether or not to apply an identified overlay to an icon associated with a data object. In yet another embodiment, the shell 606 calls a function such as GetOverlayInfo( ) to request the overlay's filename/icon index, in order to access the overly in the system image list.

In one embodiment, the shell extension proxy handler 610 receives a call from the shell 606 to an interface such as IShellIconOverlayIdentifier or to a function such as GetOverlayInfo( ),GetPriority( ), or IsMemberOf( ). In another embodiment, the shell extension proxy handler 610 redirects the call to the shell extension invoker 618, which forwards the call to a corresponding shell extension handler on the local machine 102. In still another embodiment, the shell extension invoker 618 receives a result from the corresponding shell extension handler and forwards the result to the shell extension proxy handler 610. In some embodiments, the shell extension proxy handler 610 caches the result received from the shell extension invoker 618.

In one embodiment, an icon overlay identified by the corresponding shell extension handler on the local machine 102 is extracted and marshalled back to the shell extension proxy handler 610, which stores it in a local icon file and returns the file path to the shell 606. In another embodiment, the shell extension proxy handler 610 translates a path name on the local machine 102 identified by the corresponding shell extension handler and the shell extension proxy handler 610 forwards the translated path name to the shell 606. In still another embodiment, the shell extension proxy handler 610 receives an identification of a priority associated with an icon overlay and forwards the identification to the shell 606. In yet another embodiment, the shell extension proxy handler 610 receives a value indicating whether or not to apply an identified overlay to an icon associated with a data object and forwards the value to the shell 606.

In one embodiment, a shell 606 initializes a shell extension proxy handler 610 providing additional, customized searching functionality. In another embodiment, the shell 606 initializes a static shell extension proxy handler 610. In still another embodiment, the shell 606 initializes a dynamic shell extension proxy handler 610. In still even another embodiment, the shell 606 initializes a shell extension proxy handler 610 providing static DHTML documents that appear in the Start Search menu entry; when selected the documents cause a browser to be launched with the browser bar opened to the search document (and an optional document may be displayed to the right of the browser bar).

Figure 8:
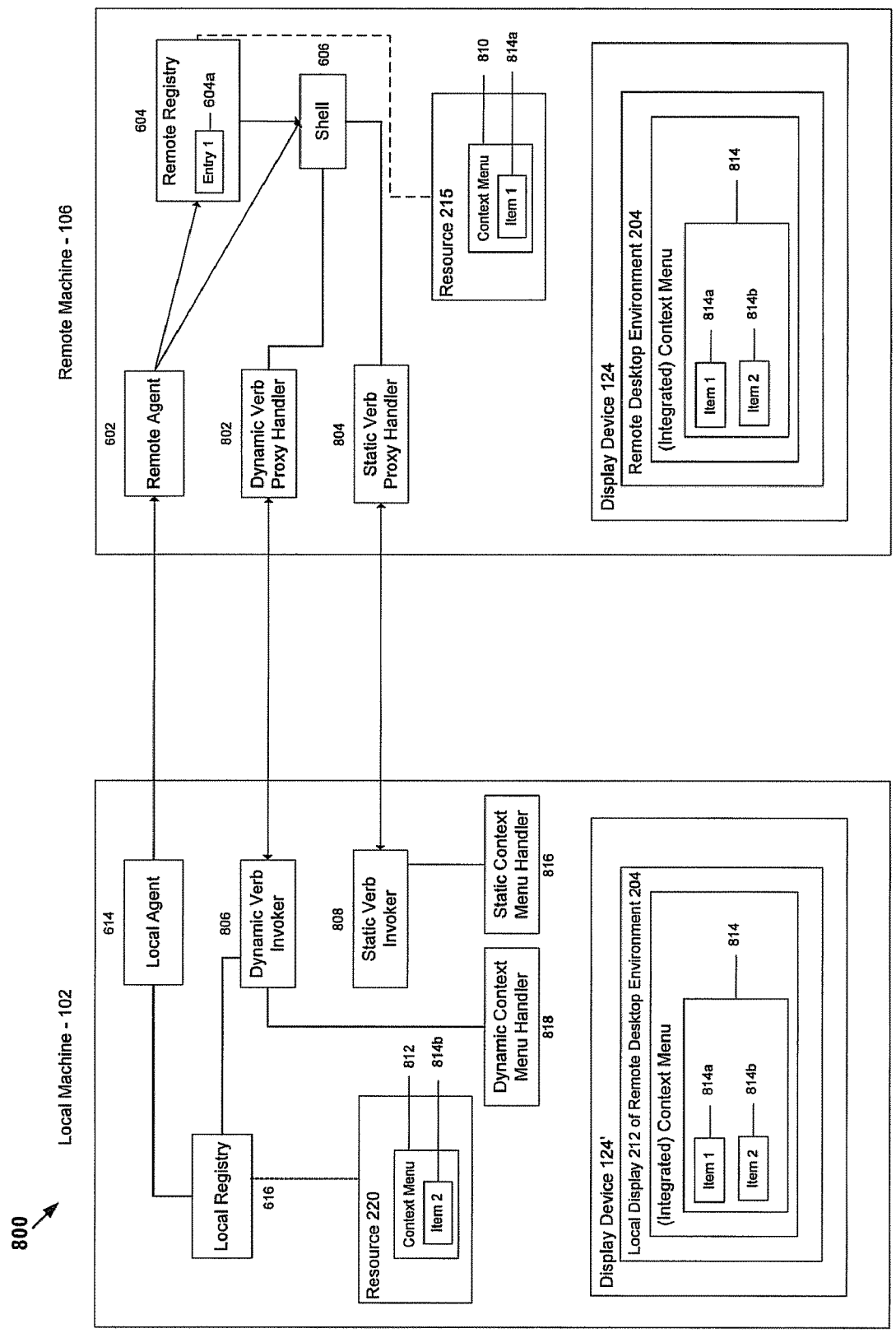
FIG. 8 is a block diagram depicting an embodiment of a system for providing, by a remote machine, access to functionality of a context menu associated with a resource executing on a local machine.

Referring now to FIG. 8, a block diagram depicts one embodiment of a system for providing, by a remote machine, access to functionality of a context menu associated with a resource executing on a local machine. In brief overview, the system 800 includes a local machine 102, a local agent 614, a resource 220 provided by the local machine 102, a context menu 812 associated with the resource 220, the context menu 812 including a context menu item 814*b*, a remote machine 106, a remote agent 602, a remote registry 604 including at least one registry entry 604*a*, a shell 606 on the remote machine 106, and a proxy handler (e.g., dynamic verb proxy handler 802 or static verb proxy handler 804).

In one embodiment, a context menu is a menu that is displayed when a user right-clicks a file, folder (or a collection of files or folders), a blank area of either the desktop, a folder view in Explorer, or other data object displayed in a desktop environment. In another embodiment, a shell on a machine 100 provides several default menu items in a context menu. In still another embodiment, a resource 220 may modify a default context menu to include additional context menu items. In still another embodiment, a shell extension handler may modify a default context menu to include additional context menu items. In yet another embodiment, whether a context menu item is displayed may depend on the particular object selected or on its attributes.

In one embodiment, a context menu item is associated with a resource 220. In another embodiment, the context menu item displays a description of a command that, when executed, provides access to functionality associated with or provided by the resource 220. In still another embodiment, the command is referred to as a verb. In still even another embodiment, a verb is an action that can be invoked on a file object. In still another embodiment, a verb may be static (i.e., valid for all instances of a particular file type) or dynamic (it might only apply to some of the files of a particular file type). In yet another embodiment, a modifiable default verb is associated with a context menu item and is launched when a user double-clicks on a file in the shell, or when a non-executable file is launched.

In one embodiment, a PseudoProgID may register static verbs that apply to all files that it handles. In another embodiment, these verbs include definitions of how to invoke the logic of the verb (as a command line app or via DDE or a COM interface). In still another embodiment, the shell defines some standard canonical verbs, and PseudoProgID registry keys can define static supplemental verbs in MICROSOFT WINDOWS XP or later. In yet another embodiment, a PseudoProgID registry key may also define ContextMenuHandlers—COM components that provide dynamic verbs (i.e. verbs that depend on the particular file(s), and may have or depend upon additional state).

In one embodiment, a shell verb underlies a context menu item. In another embodiment, a context menu item is associated with a default verb. In still another embodiment, the default verb is invoked by the shell when a non-executable file is launched (including when the user double-clicks on it in Explorer). In some embodiments, since shell verbs underlie context menu items, methods for integrating context menu items across machines include methods of integrating functionality provided by shell verbs. In one of these embodiments, methods for integrating the underlying verbs will also provide for integration of associations between the verbs and a type of file.

In one embodiment, each context menu item represents a verb (whether static or dynamic, canonical or supplemental, named or anonymous) that may be applied to a data object. In another embodiment, the shell constructs the context menu for a data object by including the appropriate subset of canonical verbs, any supplemental verbs which define a corresponding static menu item, and any dynamic menu items (corresponding to dynamic verbs) that are provided by an applicable ContextMenuHandler.

Referring now to FIG. 8, and in greater detail, the remote agent 602 executing on the remote machine 106 receives information associated with the context menu item 814b. In one embodiment, the information is associated with a verb definition, which itself is associated with the context menu item 814b. The context menu 814b is included within a context menu 812 and associated with a resource 220 provided by a local machine 102. The remote agent 602 modifies at least one registry entry 604a on the remote machine 106, responsive to the received information. In one embodiment, a context menu item 814b is associated with a static verb. In another embodiment, a context menu item 814b is defined statically in the registry, via the associated information. In still another embodiment, the context menu item 814b appears in a context menu 812 dynamically when the context menu is constructed by the shell 606.

In one embodiment, the remote agent 602 includes a receiver receiving an identification of the context menu item 814b. In one embodiment, the local agent 614 transmits, to the remote agent 602 information associated with a static verb. In another embodiment, this information includes a PseudoProgID to which the verb definition applies. In still another embodiment, the local agent 614 sends the verb name. In yet another embodiment, the local agent 614 sends an identification of the verb handler.

In one embodiment, for a static verb, the information includes an identification of one of the command line, DDE target or COM server, depending which one has been used to define the static verb. In another embodiment, for a dynamic verb, the information includes a GUID of the ContextMenuHandler that defines and implements a dynamic verb. In still another embodiment, the remote agent 614 may independently choose a method for each of static and dynamic verbs. In yet another embodiment, responsive to the received information, the remote agent 602 will install and/or deploy and/or configure at least one proxy handlers.

In some embodiments, the remote agent 602 includes a receiver receiving an identification of a command associated with the context menu item 814b. In one of these embodiments, the remote agent 602 modifies a registry entry 604a on the remote machine 106 to include the identification of the command associated with the context menu item 814b. In another of these embodiments, the command refers to a method used to implement a verb invocation. In still another of these embodiments, a command is itself a method that defines how a static verb invocation is handled. In still even another of these embodiments, a DDE command defines how a static verb invocation is handled. In still even another of these embodiments, a handler defined by a COM interface defines how a static verb invocation is handled. In yet another of these embodiments, a COM object implementing a COM interface defines how a dynamic verb invocation is handled.

In one embodiment, the remote agent 602 may receive an identification of a command on the local machine 102 that is associated with a verb underlying the context menu item 814b. In another embodiment, responsive to receiving the identification of the command, the remote agent 602 configures a registry entry on the remote machine to define a second command for that verb. In still another embodiment, the second command defines an invocation of the proxy handler for that verb definition. In yet another embodiment, the received command refers to a handler on the local machine 102, which the remote machine 106 may or may not have.

In another of these embodiments, the remote agent 602 installs a type of proxy handler (e.g., either at least one dynamic verb proxy handler 802, or at least one static verb proxy handler 804, or both) associated with the identified command. In other embodiments, a database, accessed by the remote agent 602, enumerates a plurality of proxy handlers (e.g., dynamic verb proxy handler 802 or static verb proxy handler 804). In one of these embodiments, the database maps the proxy handler instance to the corresponding local machine verb or local machine verb invocation method/handler. In further embodiments, the remote agent 602 monitors the remote desktop environment 204, communicates with other components of system 1100, and transmits data to the local machine 102 as described previously in connection with FIGS. 2-7.

In one embodiment, the remote agent 602 is a presentation layer protocol agent. In another embodiment, the remote agent 602 is a presentation layer protocol agent providing additional functionality as described herein. In still another embodiment, the remote agent 602 provides different functionality from that of a presentation layer protocol agent.

In some embodiments, the remote agent 602 includes a verb publishing agent. In one of these embodiments, the verb publishing agent receives data from a client verb monitor, which may be provided as a component of the local agent 614. In another of these embodiments, the verb publishing agent modifies a registry on the remote machine 106. In still another of these embodiments, the verb publishing agent notifies a shell executing on the remote machine 106 of the modification to the registry on the remote machine 106. In still even another of these embodiments, the verb publishing agent on the remote machine 106 removes a context menu item and its associated data upon termination of a connection with the local machine 102. In another embodiment, the verb publishing agent maps a static verb associated with a resource on the local machine to a remote desktop static verbs, and maps a dynamic verb associated with a resource on the local machine to a remote desktop dynamic verb. In yet another embodiment, the verb publishing agent maps a static verb associated with a resource 220 on the local machine 102 to a dynamic verb associated with a resource 215 on the remote machine 106.

In one embodiment, a verb associated with a PseudoProgID registry key identified on the local machine 102 is added to a registry on the remote machine 106. In another embodiment, at least one verb includes the default verb along with static and dynamic verb definitions and an identification of at least one verb handler for each verb instance, as well as any static verb menu item strings. In still another embodiment, a plurality of verbs are associated with the PseudoProgID.

In one embodiment, a context menu (or shortcut menu) (e.g., remote context menu 810 and local context menu 812) is displayed when a user right-clicks on one or more shell object. In another embodiment, each context menu item (e.g., item 814a, item 814b) represents a verb that may be applied to the shell object. In still another embodiment, a verb is an action that can be invoked on the file object. In still even another embodiment, verbs may be static; for example, a static verb may be valid for all instances of a particular file object type.

In one embodiment, a verb may be dynamic; for example, a dynamic verb may only apply to some of the file objects of a particular file object type. In another embodiment, dynamic verbs may utilize the assistance of a shell extension handler, which is a COM (Component Object Model) component that runs in-process to the shell. In still another embodiment, this handler provides the means to display different context menus for file objects of the same type. In yet another embodiment, a verb may be invoked when the user double-clicks on a file object, programmatically, or when a non-executable file is launched.

A proxy handler (e.g., dynamic verb proxy handler 802 or static verb proxy handler 804) associated with a context menu handler is installed by the remote agent 602. In one embodiment, the proxy handler is indirectly associated with the context menu item 814b. In another embodiment, the proxy handler is associated with a PseudoProgID. In some embodiments, a verb invoker (e.g., dynamic verb invoker 806 or static verb invoker 808) executes on the local machine 102. In one of these embodiments, the proxy handler (e.g., dynamic verb proxy handler 802 or static verb proxy handler 804) includes a transceiver for receiving a request for execution of a command associated with the context menu item 814b and redirecting the request to the verb invoker (e.g., dynamic verb invoker 806 or static verb invoker 808) for execution on the local machine 102. In one embodiment, the command refers to the invocation of the verb and is required for both dynamic and static verb proxy handlers. In another embodiment, the command refers to an API call used—typically, for dynamic verbs—as part of the context menu construction process.

In one embodiment, the proxy handler (e.g., dynamic verb proxy handler 802 or static verb proxy handler 804) may include a transceiver receiving a result of executing the command on the local machine 102 and providing the result to the shell 606 on the remote machine. In another embodiment, the verb invoker (e.g., dynamic verb invoker 806 or static verb invoker 808) may integrate the result of the execution of the command into the local display 212 of the desktop environment 204 providing integrated access both to resources provided by the remote machine 106 and resources provided by the local machine 102. In another embodiment, the shell 606 may integrate the result of the execution of the command into a display 212 of a desktop environment 204 on the remote machine 106 providing integrated access both to resources provided by the remote machine 106 and to resources provided by the local machine 102. In some embodiments, a user of a local machine 102 views a display of a context menu integrating menu items associated with resources from both the local machine 102 and the remote machine 106. In other embodiments, for example, a first context menu item is associated with an application provided by a remote machine 106 and a second context menu item associated with an application provided by the local machine 102 and providing additional functionality. In further embodiments, each context menu item in a context menu is associated with an application provided by a local machine 102. In some embodiments, a user interacts with a displayed context menu item to request access to functionality provided by an associated resource.

A shell 606 on the remote machine 106 receives, from the remote agent 602, a request for a display of a context menu 812 including the context menu item 814b, the request is generated on the local machine 102. In some embodiments, the shell 606 generates graphical data representing the requested context menu 812 including the context menu item 814b, responsive to the modified at least one registry entry 604a. In one of these embodiments, the proxy handler is a static verb proxy handler 804. In some embodiments, the remote agent 602 is a presentation layer protocol agent receiving a notification of the user interaction from the local machine 102. In one of these embodiments, the shell 606 receives the notification and identifies the interaction as a request for a context menu.

In one embodiment, a static verb proxy handler 804 is a target for static verbs integrated by the remote agent 614, or by a verb publishing agent, on behalf of at least one PseudoProgID. In another embodiment, the static verb proxy handler 804 implements at least one verb invocation interface (command line, DDE or DropTarget). In still another embodiment, the static verb proxy handler 804 proxies a verb invocation request to a static verb invoker 808 on the local machine 102. In still even another embodiment, the static verb proxy handler 804 transmits, to the static verb invoker 808, an identification of an invoked PseudoProgID. In still another embodiment, a verb or verb handler associated with a specific PseudoProgID instance is invoked. In yet another embodiment, the static verb proxy handler 804 communicates with a file system path mapping component during the proxied invocation to map a path on the remote machine 106 to a path to a file system object visible to the local machine 102.

In one embodiment, a static verb invoker 808 handles proxied static verb invocation requests originating from the remote machine 106. In another embodiment, the static verb invoker 808 receives an identification of at least one shell object, and data for identifying a verb handler on the local machine 102. In another embodiment, the static verb invoker 808 communicates with a file system path mapping component to map a path on the remote machine 106 to a path to a file system object visible to the local machine 102. In some embodiments, there is one instance of the static verb invoker 808. In other embodiments, there is a plurality of static verb invokers 808.

In other embodiments, the shell i) receives, from the proxy handler 802, data associated with the context menu item 814b and ii) generates graphical data representing the requested context menu 812 including the context menu item 814b, responsive to the received data associated with the context menu item 814b. In one of these embodiments, the remote agent 602 installed a dynamic verb proxy handler 802. In another of these embodiments, the proxy handler 802 includes a transceiver receiving, from the shell 606 on the remote machine 106, a request for data associated with the context menu and transmitting, to the shell 606, an identification of the context menu item 814b.

In one embodiment, a dynamic verb proxy handler 802 is a target for dynamic verbs integrated by the remote agent 614, or by a verb publishing agent, on behalf of at least one PseudoProgID. In another embodiment, the dynamic verb proxy handler 802 implements a context menu handler COM interfaces. In still another embodiment, the dynamic verb proxy handler 802 proxies a verb invocation request to a dynamic verb invoker 806 on the local machine 102. In still even another embodiment, the dynamic verb proxy handler 802 transmits, to the dynamic verb invoker 806, an identification of an invoked PseudoProgID. In still another embodiment, the dynamic verb proxy handler 802 communicates with a file system path mapping component during the proxied invocation to map a path on the remote machine 106 to a path to a file system object visible to the local machine 102. In yet another embodiment, the dynamic verb proxy handler 802 communicates with a window mapping component during a proxied invocation to map an identification of a window on the remote machine 106 to a window on the local machine 102.

In one embodiment, a dynamic verb invoker 806 handles proxied dynamic verb invocation requests originating from the dynamic verb proxy handler 802 on the remote machine 106. In some embodiments, there is one instance of the dynamic verb invoker 806. In one embodiment, the dynamic verb invoker 806 acts as a ContextMenuHandler host, hosting the ContextMenuHandler DLLs on the local machine 102 executing the proxied requests originating on the remote machine 106, and returning the results back to the remote machine 106. In other embodiments, there is a plurality of dynamic verb invokers 806.

In one embodiment, a 1:1 mapping exists between a verb proxy handler (e.g., dynamic verb proxy handler 802, or static verb proxy handler 804) and a target verb handler. In another embodiment, the target verb handler is a handler executable file on the local machine 102. In still another embodiment, the target verb handler is a handler executable file and an identification of at least one associated parameter. In still even another embodiment, there is a plurality of verb proxy handlers 802, 804. In yet another embodiment, a first verb proxy handler 802, 804 may be a copy of a binary file used by a second verb proxy handler 802, 804; the first verb proxy handler 802, 804 and the second verb handler 802, 804 having different names. In some embodiments, the mapping exists on the local machine. In other embodiments, the mapping exists on the remote machine.

In one embodiment, a 1:N mapping exists between a verb proxy handler 802, 804 and a plurality of target verb handlers. In another embodiment, the mapping target is identified by a {PseudoProgID,verb} tuple. In still another embodiment, a verb proxy handler 802, 804 proxies to multiple target verb handlers having the same form. In still even another embodiment, where a 1:N mapping exists, the target verb handler is a handler executable file on the local machine 102. In yet another embodiment, any form of static verb proxy handler 804 can be used to proxy to any form of static verb handler on the local machine 102. In some embodiments, the mapping exists on the local machine. In other embodiments, the mapping exists on the remote machine.

In one embodiment, a 1:1 mapping is provided between a ContextMenuHandler proxy handler on the remote machine 106 and a ContextMenuHandler dynamic verb handler on the local machine 102. In another embodiment, a 1:1 mapping is provided between a DropTarget proxy handler on the remote machine 106 and a static verb handler on the local machine 102 for a given {PseudoProgID,verb} pair. In still another embodiment, a 1:1 mapping is provided between a command line or DDE command static verb proxy handler and a command line or DDE command static verb invocation handler on the local machine. In yet another embodiment, a 1:N mapping is provided between a command line or DDE command static verb proxy handler, which maps to more than one command line or DDE command static verb handlers on the local machine 102.

A local agent 614 on the local machine 102 receives, from the remote agent 602, the generated graphical data and integrates the generated graphical data into a local display 212 of a desktop environment 204 providing integrated access both to resources provided by the remote machine 106 and resources provided by the local machine 102. In some embodiments, the local agent 614 identifies a verb definition associated with a resource 220 provided by the local machine 102 for integration into the desktop environment 204 providing integrated access both to resources provided by the remote machine 106 and resources provided by the local machine 102. In other embodiments, the local agent 614 publishes the identified context menu item 814*b*. For example, the local agent 614 may publish the identified context menu 812 to the remote agent 602. In still other embodiments, the local agent 614 transmits, to the remote agent 602 information associated with the context menu item 814*b*.

In one embodiment, the local agent 614 is a presentation layer protocol client. In another embodiment, the local agent 614 is a presentation layer protocol client providing additional functionality as described herein. In still another embodiment, the local agent 614 provides different functionality from that of a presentation layer protocol client.

In one embodiment, the local agent 614 includes a source verb monitor. In another embodiment, the source verb monitor identifies at least one file type associated with a verb associated with a resource 220 including a context menu item that is included in a local display of the integrated desktop environment. In still another embodiment, the source verb monitor monitors at least one file type associated with a verb associated with a resource 220 including a context menu item that is included in a local display of the integrated desktop environment.

In some embodiments, the local agent 614 includes a verb publishing handler. In one of these embodiments, the verb publishing handler receives data from a source verb monitor, which may be provided as a component of the local agent 614. In another of these embodiments, the verb publishing handler transmits the received data to a remote agent 614. In other embodiments, however, the remote agent 602 includes the verb publishing handler.

In one embodiment, the identified verb is static. In still another embodiment, the identified verb is identified via an identification of a pre-defined shell object. In still even another embodiment, the identified verb is identified via an identification of a PerceivedFileType. In yet another embodiment, the identified verb is identified via an enumeration of at least one PseudoProgID handling the verb.

In one embodiment, a dynamic verb and its associated context menu item may also be provided on demand by a ContextMenuHandler shell extension. In another embodiment, the shell extension handler is an in-process COM server that implements the IContextMenu COM interface. In still another embodiment, context menu items may be traditional menu entries (drawn by the system once defined by the handler) or may be owner-drawn by the handler as necessary. In some embodiments, a ContextMenuHandler whose GUID is <handler GUID> is bound to <PseudoProgID> by adding a registry key to a registry. In one of these embodiments, the registry key has the form: HKCR\<PseudoProgID>\shellex\ContextMenuHandlers\{<handler GUID>}.

In some embodiments, a ContextMenuHandler proxy handler COM server—which may be a dynamically linked library—is created. In one of these embodiments, as dynamic verb proxy handlers (i.e. ContextMenuHandlers) are integrated into the registry on the remote machine 106, a new copy of the ContextMenuHandler proxy handler executable is created each time a new ContextMenuHandler GUID from a local machine 102 is identified. In still another of these embodiments, the new copy is given a unique fully qualified filename and a mapping maintained from the new filename to the GUID on the local machine 102. In still even another of these embodiments, the dynamic verb handler identifies the new copy of the COM server executable via a new remote desktop GUID. In some embodiments, when executed, the proxy handler COM server analyzes its own file name to identify a GUID identifying a data object on the local machine 102 with which the shell extension proxy handler 610 and the proxy handler COM server are associated.

In one embodiment, a DropTarget proxy handler COM server DLL (or EXE) is created. In another embodiment, when a static verb is integrated into a registry on the remote machine 106, a copy of the DropTarget proxy handler COM server executable is created each time a new {PseudoProgID, verb} combination from the local machine 102 is identified. In still another embodiment, the copy is given a unique fully qualified filename and a mapping is maintained from the new filename to the {PseudoProgID,verb} tuple; for example, a file database table, data structure or embedded path element may store the mapping. In yet another embodiment, a new GUID on the remote machine 106 references the copy of the COM server executable. In some embodiments, when executed, the COM server inspects its own module filename and determines via the mapping which {PseudoProgID,verb} tuple it is acting on behalf of.

Figure 9:
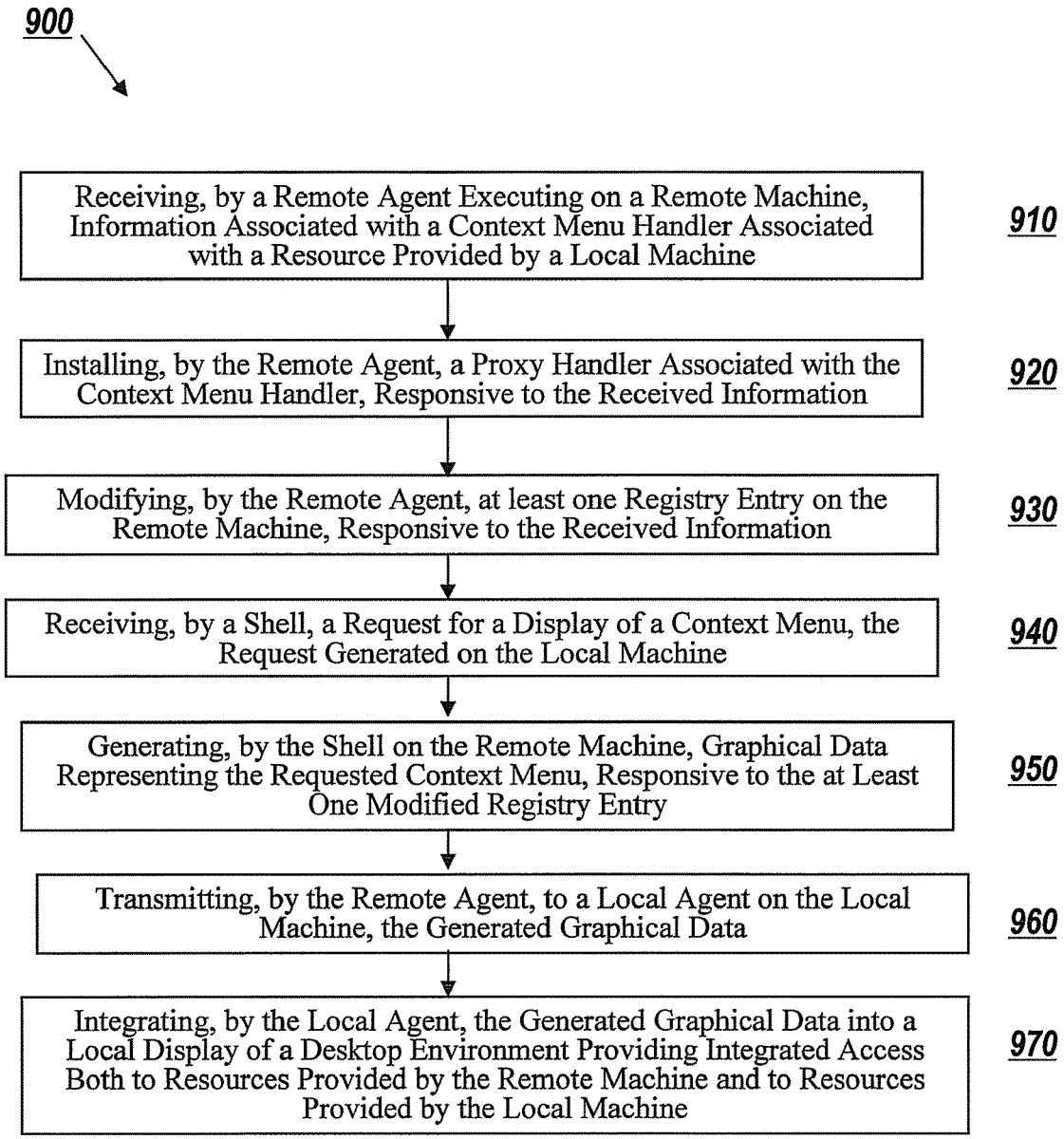
FIG. 9 is a flow diagram depicting an embodiment of a method for providing, by a remote machine, access to functionality of a context menu associated with a resource executing on a local machine.

Referring now to FIG. 9, a flow diagram depicts an embodiment of a method 900 for providing, by a remote machine 106, access to functionality of a context menu associated with a resource 220 executing on a local machine 102. In brief overview, the method 900 includes receiving, by a remote agent 602 executing on a remote machine 106, information associated with a context menu handler 816 associated with a resource 220 provided by a local machine 102 (block 910). The remote agent 602 installs a proxy handler (e.g., dynamic verb proxy handler 802 or static verb proxy handler 804) associated with the context menu handler 816, responsive to the received information (block 920). The remote agent 602 modifies at least one registry entry 604a on the remote machine 106, responsive to the received information (block 930). A shell 606 on the remote machine 106 receives, from the remote agent 602, a request for a display of a context menu 812 including the context menu item 814b, wherein the request is generated on the local machine 102 (block 940). The shell 606 on the remote machine 106 generates graphical data representing the requested context menu 812, responsive to the at least one modified registry entry 604a (block 950). The remote agent 602 transmits, to a local agent 614 on the local machine 102, the generated graphical data (block 960). The local agent 614 integrates the generated graphical data into a local display 212 of a desktop environment 204 providing integrated access both to resources provided by the remote machine 106 and to resources provided by the local machine 102 (block 970).

In one embodiment, shell context menu handling functionality provided by the local machine 102 is integrated into a shell context menu provided by the remote machine 106. In another embodiment, the context menu items and associated functionality handling provided by a resource 220 are integrated into a desktop environment provided by the remote machine 106 and made available within at least one shell context menu on the remote machine 106. In still another embodiment, methods and functions provide integration for context menu verbs and for handling user requests for access to the functionality. In yet another embodiment, the integration includes an integrated display of context menu items and access to integrated functionality, such as the execution of applications identified directly and by file type association.

In one embodiment, a context menu proxy handler integrates a display of a context menu item provided by a resource 220 on a local machine 102 in a context menu on a remote machine 106. In another embodiment, the context menu proxy handler leverages functionality for mapping a file system object located on the remote machine 106 to a file system object on the local machine 102. In some embodiments, the context menu proxy handler integrates the display of the context menu item and associated functionality provided by the resource 220 without requiring a modification to user interaction methods.

Referring now to FIG. 9, and in greater detail, a remote agent 602 executing on a remote machine 106 receives information associated with a context menu handler associated with a resource 220 provided by a local machine 102 (block 910). In some embodiments, the remote agent 602 receives an identification of the context menu handler 816. In other embodiments, the remote agent 602 receives an identification of a default action associated with the context menu 812. In yet other embodiments, the local agent 614 identifies a context menu item 814b associated with the resource 220 provided by the local machine 102. In some other embodiments, the remote agent 602 receives an identification of the context menu item 814b. In some embodiments, the local agent 614 identifies a context menu item 814b associated with a resource 220 provided by the local machine 102. In some of these embodiments, the local agent 614 may publish the identified context menu item 814b.

In one embodiment, the local agent 614 identifies information associated with a context menu item to transmit to the remote agent 602. In another embodiment, the local agent 614 accesses a registry on the local machine 102 to identify the context menu item or its associated information.

In some embodiments, as described above in connection with shell extension enumeration, a local agent 614 identifies a resource associated with a context menu handler. In one of these embodiments, a local agent 614 identifies the resource 220 after completing a process of enumerating at least one shell extension handler. In another of these embodiments, for each handler identified, the local agent 614 determines whether the identified handler is provided by one of the resources that is to be included in the display of the integrated, full-screen desktop. In other embodiments, as described above in connection with shell extensions and file type association identification, the local agent 614 identifies at least one file type referencing a PseudoProgID or a ProgID. referenced by PseudoProgID or ProgID. In further embodiments, the local agent 614 transmits, to the remote agent 602, a graph of associations between nodes consisting of file types, PseudoProgID, verbs, verb handler executables, along with disparate attributes associated with each node.

In one embodiment, the local agent 614 identifies a file type associated with a verb or context menu handler associated with a resource 220 included in an integrated desktop environment. In another embodiment, the local agent 614 identifies an association between an identified file type and a PseudoProgID to create a file type association for a context menu. In still another embodiment, the local agent 614 identifies a default ProgID.

In one embodiment, the local agent 614 identifies a static verb defined by a PsuedoProgID registry key in a registry on the local machine 102. In another embodiment, the local agent 614 retrieves from a registry on the local machine 102 an enumeration of keys of the form:

HKCR\<PseudoProgID>\shell\<verb>, where <verb> is the language-independent name of the command. In still another embodiment, a default verb is defined by the "(Default)" value of the "shell" key (parent of the verb key above), or if no default value is given there the default verb is "open". In still even another embodiment, for a registered resource 220, the data is found under key HKCR\Applications\<app> instead, where <app> is the executable name (generally including the .exe or .dll extension) but omitting path. In still another embodiment, the verb definition registry key contains the menu item text (if any) and defines method(s) to invoke it, including, but not limited to, the following: an command line to execute, a DDE conversation to launch with an application, and a COM server GUID implementing an IDropTarget interface. In yet another embodiment, this information is also used by a function such as a ShellExecute( ) function when called to invoke the given static verb on a file associated with the given PseudoProgID registry key. Although this document describes the process in terms of HKCR, in some embodiments, the shell uses additional layers of registry keys to determine appropriate behavior for a particular object. These keys may define user customization for a file type, system file associations, system file perceived type associations, and wildcard keys for the base class and all file system objects.

In one embodiment, a local agent 614 identifies a static verb associated with a context menu item included in an integrated desktop environment. In another embodiment, the local agent 614 retrieves an enumeration of a static verb and its associated context menu item from a registry on the local machine 102. In still another embodiment, the local agent 614 retrieves all registry keys having any of the following forms:

HKCR\<ProgID>\shell\<verb>
HKCR\<Pre-defined shell object>\shell\<verb>
HKCR\Applications\<registered app>\shell\<verb>.

In one embodiment, for an identified registry key, the local agent 614 gathers a default REG_SZ value defining a context menu item string for that verb. In another embodiment, for an identified registry key, the local agent 614 gathers an identification of a method for invoking the verb, including, without limitation: i) a command subkey whose default REG_SZ value identifies a command line to use (with "% 1" as the placeholder token for the target object(s), and additional parameters for canonical printer-related verbs; ii) a "ddeexec" subkey whose default REG_SZ value is a DDE command string to send, and any additional subkeys identifying additional DDE parameters; and iii) a "DropTarget" subkey with a "Clsid" REG_SZ value defining the GUID of the COM server that implements the verb using the IDropTarget interface, and an executable for a COM server. In another embodiment, the local agent 614 identifies, in a PseudoProgID grandparent registry key (the parent of the "shell" key), a "DefaultIcon" subkey whose default REG_SZ value specifies the default icon to use for files associated with this ProgID. In still another embodiment, the local agent 614 identifies, in a PseudoProgID grandparent registry key (the parent of the "shell" key), a FriendlyTypeName value whose default value includes a string resource specification that is suitable for display to the user. In still even another embodiment, the local agent 614 identifies, in a PseudoProgID grandparent registry key (the parent of the "shell" key), an "InfoTip" value, identified as for "FriendlyTypeName" but for use as an info tip. In yet another embodiment, the local agent 614 identifies, in a PseudoProgID grandparent registry key (the parent of the "shell" key), an "EditFlags" value that controls at least one aspect of the shell's handling of file types handled by this PseudoProgID. In further embodiments, this process provides a list of defined PseudoProgID, and for each one a list of static verbs, and for each verb the definition of the executable handler(s) that implement them.

In one embodiment, a local agent 614 identifies a context menu handler associated with a context menu item included in an integrated desktop environment. In another embodiment, the local agent 614 retrieves an enumeration of the context menu handler from a registry on the local machine 102. In still another embodiment, the local agent 614 retrieves all registry keys having any of the following forms:

HKCR\<ProgID>\shellex\ContextMenuHandlers
HKCR\<Pre-defined shell object>\shellex\ContextMenuHandlers
HKCR\Applications\<registered app>\shellex\ContextMenuHandlers In still even another embodiment, a subkey of an identified registry key defines a context menu handler. In still another embodiment, a subkey has a name of the form {<handler GUID>}. In yet another embodiment, a subkey has an arbitrary name whose "(Default)" REG_SZ value is of the form {<handler GUID>}.

In one embodiment, where the local agent 14 identifies a DropTarget registry key, given the GUID, the handler executable can be looked up in the CLSID registry. In another embodiment, a context menu handler may also specify a shellex\MayChangeDefaultMenu subkey that indicates that the handler should be called even for the default action, as the default verb may depend on the object targeted. In still another embodiment, this process provides a list of defined PseudoProgIDs, and for each one a list of ContextMenuHandlers, and for each handler the GUID and executable handler that implements them.

In one embodiment, a remote agent 602 receives, from a local agent 614, information associated with a context menu item. In another embodiment, the remote agent 602 receives an identification of the context menu item.

The remote agent 602 installs a proxy handler 804 associated with the context menu handler 816, responsive to the received information (block 920).

In one embodiment, the remote agent 602 installs a static verb proxy handler 804 associated with the context menu handler 816, responsive to the received information. In one embodiment, the remote agent 602 virtually installs a shell extension proxy handler. In some embodiments, the remote agent 602 intercepts a request for an identification of a handler. In one of these embodiments, the remote agent 602 intercepts a request for a file in a file system identifying the handler. In another of these embodiments, the remote agent 602 intercepts a request for a registry key in a registry identifying the handler. In still another of these embodiments, In still another of these embodiments, the remote agent 602 responds to an intercepted request with an identification of the shell extension proxy handler. In still even another of these embodiments, a file system filter driver intercepts the request and responds with the identification of the shell extension proxy handler. In yet another of these embodiments, a registry filter driver intercepts the request and responds with the identification of the shell extension proxy handler. In other embodiments, the remote agent 602 includes a hooking component hooking a request for an identification of a handler and responding with an identification of the shell extension proxy handler. In still other embodiments, the remote agent 602 intercepts a COM function call for an identification of a handler and responds with an identification of the shell extension proxy handler.

The remote agent 602 modifies at least one registry entry 604*a* on the remote machine 106, responsive to the received information (block 930).

A shell 606 on the remote machine 106 receives, from the remote agent 602, a request for a display of a context menu 812 including the context menu item 814b, wherein the request is generated on the local machine 102 (block 940). The shell 606 on the remote machine 106 generates graphical data representing the requested context menu 812 including the context menu item 814b, responsive to at least one modified registry entry 604a (block 950). The remote agent 602 transmits, to a local agent 614 on the local machine 102, the generated graphical data (block 960). The local agent 614 integrates the generated graphical data into a local display 212 of a desktop environment 204 providing integrated access both to resources provided by the remote machine 106 and to resources provided by the local machine 102 (block 970).

In some embodiments, the static verb proxy handler 804 receives, from the shell 606, a request for execution of a command associated with the context menu item 814b associated with the resource 220 provided by the local machine 102. The static verb proxy handler 804 redirects the request to a static verb invoker 808 executing on the local machine 102, and the static verb invoker 808 executes the command. In one of these embodiments, a result of executing the command on the local machine 102 is integrated into a desktop environment 204 of the remote machine 106.

In one embodiment, a shell 606 receives an identification of a user interaction with a displayed context menu and requests execution of an associated static verb. In another embodiment, a local agent 102 transmits, to a remote agent 106, the identification of the user interaction and the remote agent 106 transmits the identification to the shell 606. In still another embodiment, the shell 106 retrieves data for display to the user from the modified registry entry. In yet another embodiment, the shell 106 transmits the identification to a static verb proxy handler for processing, the static verb proxy handler identified to the shell 106 in the modified registry entry.

In one embodiment, a shell 606 identifies a user interaction with a displayed context menu item. In another embodiment, the shell 606 calls a function, such as IContextMenu::InvokeCommand( ), to initiate execution of the command associated with the displayed context menu item. In still another embodiment, the static verb proxy handler 804 provides the integration between the local machine 102 and the remote machine 106. In another embodiment, the static verb proxy handler 804 identifies a verb handler on the local machine 102 for which the request is intended. In still another embodiment, the static verb proxy handler 804 identifies a {PseudoProgID,verb} combination triggered by a user interaction with an associated data object. In yet another embodiment, the static verb proxy handler 804 handles a request from the shell 606 and proxies it to the identified verb handler on the local machine 102. In some embodiments, the proxy verb handler identifies a GUID of a local machine verb handler (either an IDropTarget instance).

In one embodiment, the shell 106 transmits the identification to an IDropTarget COM server instance implementing static verb proxy handler logic. In another embodiment, the shell 106 calls a function, such as an IDropTarget::Drop( ), function on the specified instance of a static verb proxy handler COM server. In still another embodiment, the static verb proxy handler COM server inspects its own fully qualified module filename and maps that to a PseudoProgID registry key on the local machine 102 and to a verb that it is acting on behalf of. In still even another embodiment, the static verb proxy handler COM server transmits an identification of the mapped PseudoProgID registry, the static verb, and any additional data—such as drop target parameters—to a static verb invoker on the local machine 102. In some embodiments, the file system path mapping component provides a mapping from a path on the remote machine 106 to a path on the local machine 102.

In one embodiment, a static verb invoker 808 inspects a registry to determine how to invoke the given {PseudoProgID,verb} action. In another embodiment, the static verb invoker 808 redirects the data received from the static verb proxy handler 804 on the remote machine 106 to a shell on the local machine 102. In still another embodiment, the static verb invoker 808 provides the requested functionality. In still even another embodiment, the static verb invoker 808 receives a notification from the shell that the shell has provided the requested functionality.

In some embodiments, the static verb invoker 808 notifies the static verb proxy handler 804 that the functionality has been provided. In one of these embodiments, the static verb proxy handler 804 notifies the shell 606 on the remote machine 106 that the functionality has been provided. In another of these embodiments, the static verb proxy handler 804 integrates a display of output data generated by the providing of the functionality—such as, for example, output data generated by an execution of an application—into a desktop environment on the remote machine 106.

Figure 10A:
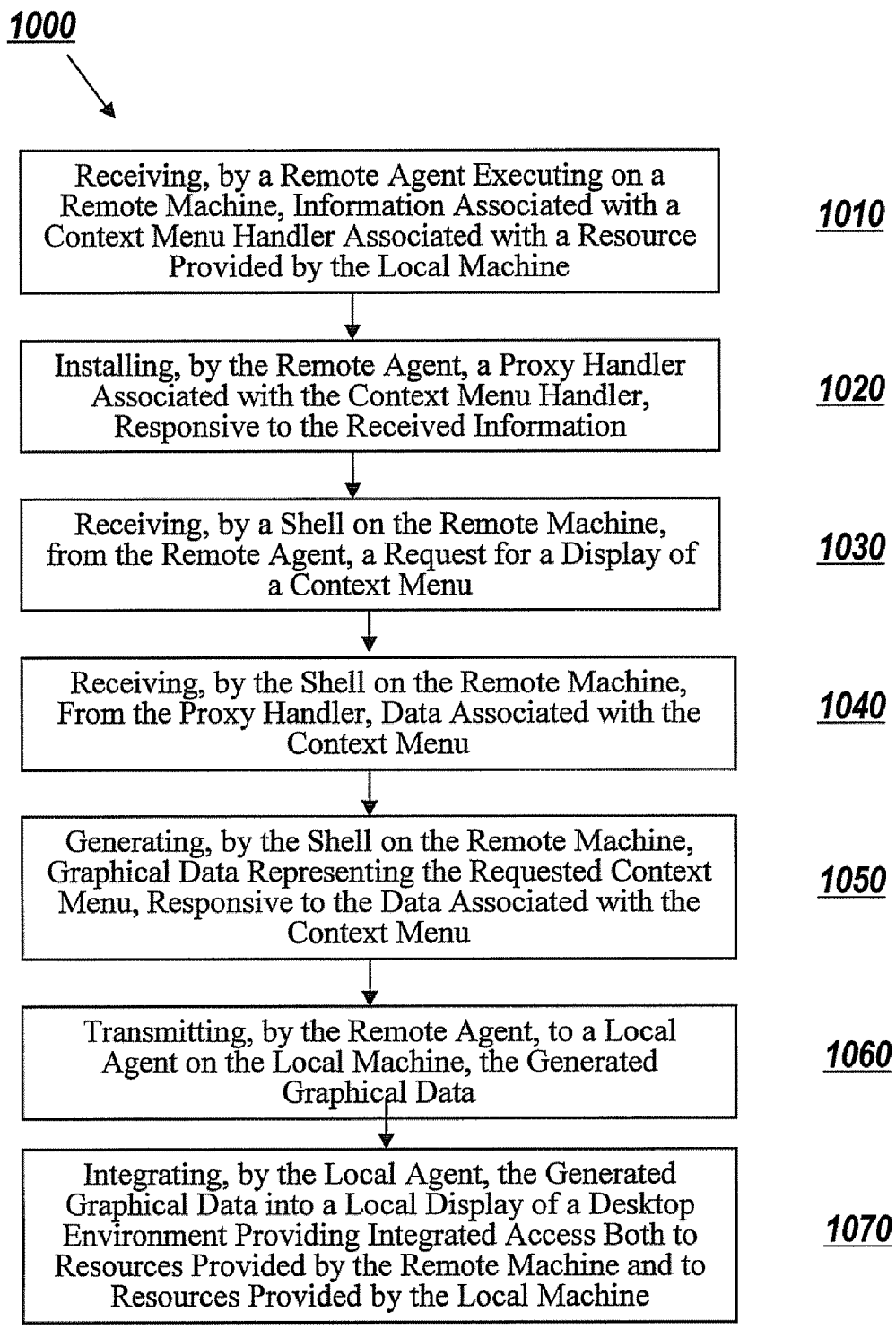
FIG. 10A is a flow diagram depicting an embodiment of a method for providing, by a remote machine, access to functionality of a context menu associated with a resource executing on a local machine.

Referring now to FIG. 10A, a flow diagram depicts an embodiment of a method 1000 for providing, by a remote machine 106, access to functionality of a context menu associated with a resource 220 executing on a local machine 102. In brief overview, the method 1000 includes receiving, by a remote agent 602 executing on a remote machine 106, information associated with a context menu handler 818 associated with a resource 220 provided by a local machine 102 (block 1010). The remote agent 602 installs a proxy handler 802 associated with the context menu handler 818, responsive to the received information (block 1020). A shell 606 on the remote machine 106 receives, from the remote agent 602, a request for a display of a context menu 812, including, in some embodiments, the context menu item 814b, wherein the request is generated on the local machine 102 (block 1030). The shell 606 on the remote machine 106 receives, from the proxy handler 802, data associated with the context menu 812 (block 1040). The shell 606 on the remote machine 106 generates graphical data representing the requested context menu 812, responsive to the data associated with the context menu item 812 (block 1050). The remote agent 602 transmits, to a local agent 614 on the local machine 102, the generated graphical data (block 1060). The local agent 614 integrates the generated graphical data into a local display 212 of a desktop environment 204 providing integrated access both to resources provided by the remote machine 106 and to resources provided by the local machine 102 (block 1070).

A remote agent 602 executing on a remote machine 106 receives information associated with a context menu handler 818 associated with a resource 220 provided by a local machine 102 (block 1010). In some embodiments, the remote agent 602 receives an identification of a context menu item 814b. In other embodiments, the remote agent 602 receives an identification of a command associated with the context menu item 814b. In yet another embodiment, the remote agent 602 receives an identification of a default action associated with a PseudoProgID. In some embodiments, the local agent 614 identifies a context menu item 814b associated with a resource 220 provided by the local machine 102. In some of these embodiments, the local agent 614 may publish the identified context menu item 814b.

The remote agent 602 installs a proxy handler 802 associated with the context menu handler 818, responsive to the received information (block 1020). In some embodiments, the remote agent installs a dynamic verb proxy handler 802 associated with a PseudoProgID, responsive to the received information. In other embodiments, a shell 606 uses an IShellExtInit COM interface and invokes an Initialize( ) function to initialize interaction, by a dynamic verb proxy handler 802, with the object. In further embodiments, the shell 606 passes, to the proxy handler, information identifying a data object with which the user interacted. In one of these embodiments, the shell 606 passes, to the dynamic verb proxy handler 802, an identification of a folder. In another of these embodiments, the shell 606 passes, to the dynamic verb proxy handler 802, an identification of at least one file object.

In one embodiment, the remote agent 602 virtually installs a shell extension proxy handler. In some embodiments, the remote agent 602 intercepts a request for an identification of a handler. In one of these embodiments, the remote agent 602 intercepts a request for a file in a file system identifying the handler. In another of these embodiments, the remote agent 602 intercepts a request for a registry key in a registry identifying the handler. In still another of these embodiments, In still another of these embodiments, the remote agent 602 responds to an intercepted request with an identification of the shell extension proxy handler. In still even another of these embodiments, a file system filter driver intercepts the request and responds with the identification of the shell extension proxy handler. In yet another of these embodiments, a registry filter driver intercepts the request and responds with the identification of the shell extension proxy handler. In other embodiments, the remote agent 602 includes a hooking component hooking a request for an identification of a handler and responding with an identification of the shell extension proxy handler. In still other embodiments, the remote agent 602 intercepts a COM function call for an identification of a handler and responds with an identification of the shell extension proxy handler.

A shell 606 on the remote machine 106 receives, from the remote agent 602, a request for a display of a context menu 812 including, in some embodiments, the context menu item 814*b* (block 1030). The shell 606 on the remote machine 106 receives, from the proxy handler 802, data associated with the context menu 812 (block 1040).

In one embodiment, the dynamic verb proxy handler 802 receives the identification of the user interaction with the object. In another embodiment, the dynamic verb proxy handler 802 receives an identification of the object. In still another embodiment, the dynamic verb proxy handler 802 identifies the object, responsive to the received notification. In yet another embodiment, the dynamic verb proxy handler 802 determines whether to provide a menu item for this interaction responsive to the identification of the object.

In one embodiment, the shell uses an IContextMenu interface to invoke a QueryContextMenu( ) function. In another embodiment, the shell 606 provides a handle to a context menu being built and at least one other parameter associated with the context menu. In still another embodiment, the context menu proxy handler adds at least one menu item to the context menu and reports back information related to the items that were added. In yet another embodiment, the context menu proxy handler can add arbitrary menu items (including submenus and owner-drawn items).

In some embodiments, the shell 606 calls a function, such as IContextMenu::GetCommandString( ), to retrieve data associated with the displayed context menu item. In one of these embodiments, for example, the shell 606 may retrieve text for display, in a status bar, such as a fly-by help string. In another of these embodiments, the shell 606 may retrieve an identification of a verb associated with the context menu item. In still another of these embodiments, the shell 606 identifies a window associated with the displayed menu item.

In other embodiments, the shell 606 calls a COM function provided by the dynamic context menu handler, such as IContextMenu3::HandleMenuMsg2( ), to handle windows message associated with the displayed context menu item. In one of these embodiments, the shell 606 processes a message, such as WM_MEASUREITEM, which is used to request the current size of the owner-drawn menu item. In another of these embodiments, the shell 606 processes a message, such as WM_DRAWITEM, which is used to draw the owner-drawn item. In still another of these embodiments, the shell 606 processes a message, such as WM_MENUCHAR, which is used to handle owner-drawn menu accelerator keys. In yet another of these embodiments, the shell 606 processes a message, such as WM_INITMENUPOPUP.

The shell 606 on the remote machine 106 generates graphical data representing the requested context menu 812 and, in some embodiments, the context menu item 814*b*, responsive to the data associated with the context menu 812 (block 1050).

In one embodiment, the shell 606 generates a context menu associated with a resource 220 provided by the local machine 102. In another embodiment, the shell 606 identifies a dynamic verb proxy handler 802 associated with the context menu; for example, the shell 606 may query a registry to determine whether a PsuedoProgID registry key associated with the resource identifies a dynamic verb proxy handler 802. In still another embodiment, the shell initializes the dynamic verb proxy handler 802 for use in the generation of the context menu.

In one embodiment, the shell 606 calls a function, such as IShellExtInit::Initialize( ), identifying at least one item for which the shell 606 is constructing the context menu. In another embodiment, the dynamic verb proxy handler 802 receives the request from the shell 606. In still another embodiment, the dynamic verb proxy handler 802 inspects its fully qualified pathname and uses that to determine the mapping to the GUID of the ContextMenuHandler on the local machine 102 that it is acting on behalf of. In yet another embodiment, the dynamic verb proxy handler 802 redirects the request to the dynamic verb invoker 806 on the local machine 102 with the identified ContextMenuHandler GUID. In some embodiments, the file system mapping components maps at least one path identifying the at least one item identified in the request by the shell 606 to a path for an item on the local machine 102.

In one embodiment, the dynamic verb invoker on the local machine 102 hosts the ContextMenuHandler on the local machine 102. In another embodiment, the dynamic verb invoker initializes the ContextMenuHandler. In still another embodiment, the dynamic verb invoker 806 redirects, to the ContextMenuHandler, the request received from the dynamic verb proxy handler 802. In still even another embodiment, the ContextMenuHandler determines whether a menu item is associated with the at least one item identified by the shell 606. In yet another embodiment, the ContextMenuHandler returns the identification, if any, to the shell 606.

In one embodiment, the shell calls a function, such as IContextMenu::QueryContextMenu( ) to pass the request, with any associated data (such as the ContextMenuHandler GUID) to the dynamic verb invoker 806. In another embodiment, the dynamic verb invoker 806 constructs an empty context menu and passes the request to the ContextMenuHandler on the local machine 102. In still another embodiment, the ContextMenuHandler on the local machine 102 inserts the additional menu items into the empty context menu. In still even another embodiment, the resulting menu items are enumerated by the dynamic verb invoker 806 using GetMenuItem( ). In yet another embodiment, the dynamic verb invoker 806 redirects the enumeration to the dynamic verb proxy handler 802, which inserts them into the context menu identified by the shell 606 and returns an identification of the modification to the shell 606.

In one embodiment, if owner-drawn context menu items were specified, then the shell calls IContextMenu3::HandleMenuMsg2( ) on the dynamic verb proxy handler 802 with owner-drawn messages. In another embodiment, the dynamic verb proxy handler 802 proxies the received request to the ContextMenuHandler on the local machine 102.

In one embodiment, a window mapping component translates a window identification provided by the shell 606 to identify a window associated with the at least one item. In another embodiment, the window mapping component translates the window identification to an identification of a window on the local machine 102. In still another embodiment, the translated window name is used by the ContextMenuHandler on the local machine 102 to paint a portion of the window on the local machine 102 with the owner-drawn items "over the top" of the data sent by the remote machine 106. In other embodiments, the ContextMenuHandler paints the menu items to an off-screen buffer instead. In one of these embodiments, the ContextMenuHandler transmits the results of painting the owner-drawn item to the off-screen surface to the dynamic verb proxy handler 802, where the dynamic verb proxy handler 802 can paint the owner-drawn item on to the remote desktop context menu.

In one embodiment, a user interaction with a context menu item includes the highlighting of the menu item. In another embodiment, the shell 606 calls a function, such as IContextMenu::GetCommandString( ), to retrieve text for display as a "fly-over help" message. In still another embodiment, the dynamic verb proxy handler 802 receives the function call and proxies the request to the ContextMenuHandler on the local machine 102.

In one embodiment, a user interaction with a context menu item includes invoking a menu command. In another of these embodiments, the shell 606 calls a function such as IContextMenu::InvokeCommand( ) with an identification of a window object associated with the context menu and an identification of a window region (for example, by identifying screen coordinates) in which the command was invoked. In still another embodiment, the dynamic verb proxy handler receives the function call and proxies the request to the ContextMenuHandler on the local machine 102 via the dynamic verb invoker 806. In still another embodiment, the dynamic verb proxy handler 802 receives the function call and proxies the request to the ContextMenuHandler on the local machine 102, which creates a user interface in response to the menu command invocation. In some embodiments, the execution of the invoked command occurs on the local machine 102. In one of these embodiments, the results of execution of the invoked command are returned to the shell 606. In further embodiments, verbs may be programmatically invoked.

The remote agent 602 transmits, to a local agent 614 on the local machine 102, the generated graphical data (block 1060). The local agent 614 integrates the generated graphical data into a local display 212 of a desktop environment 204 providing integrated access both to resources provided by the remote machine 106 and to resources provided by the local machine 102 (block 1070). In other embodiments, the proxy handler 802 receives, from the shell 606, a request for execution of a command associated with a context menu item 814b in the context menu 812 associated with the resource 220 provided by the local machine 102. The proxy handler 802 redirects the request to a verb invoker 806 executing on the local machine 102, and the verb invoker 806 executes the command. In one of these embodiments, the dynamic verb invoker 806 and the dynamic verb proxy handler 802 provide substantially similar functionality for handling redirected requests for execution of context menu verbs as the functionality provided by the static verb invoker 808 and the static verb proxy handler 804 described above in connection with FIG. 9. In another of these embodiments, a result of executing the command on the local machine 102 is integrated into a desktop environment 204 of the remote machine 106.

Figure 10B:
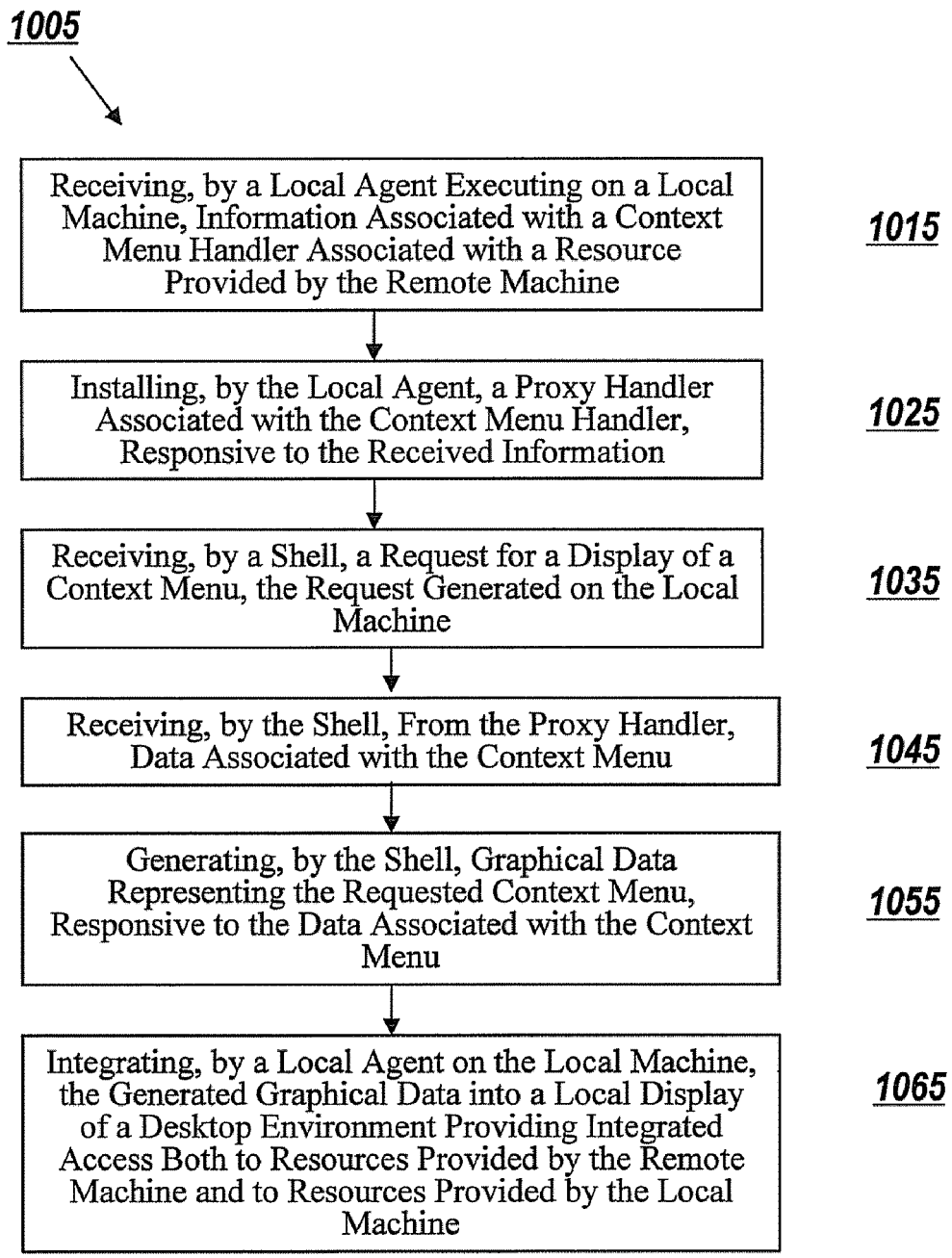
FIG. 10B is a flow diagram depicting an embodiment of a method for providing, by a local machine, access to functionality of a context menu associated with a resource executing on a remote machine.

Referring now to FIG. 10B, a flow diagram depicts an embodiment of a method 1005 for providing, by a local machine 102, access to functionality of a context menu 812 associated with a resource 220 executing on a local machine 102. The method 1005 includes receiving, by a local agent 614 executing on a local machine 102, information associated with a context menu handler 818 associated with a resource 220 provided by a local machine 102 (block 1015). The local agent 602 installs a proxy handler 802 associated with the context menu handler 818, responsive to the received information (block 1025). A shell 606 on the remote machine 106 receives, from the remote agent 602, a request for a display of a context menu 812, including, in some embodiments, the context menu item 814b, wherein the request is generated on the local machine 102 (block 1035). The shell 606 on the remote machine 106 receives, from the proxy handler 802, data associated with the context menu 812 (block 1045). The shell 606 on the remote machine 106 generates graphical data representing the requested context menu 812, responsive to the data associated with the context menu 812 (block 1055). The local agent 614 integrates the generated graphical data into a local display 212 of a desktop environment 204 providing integrated access both to resources provided by the remote machine 106 and to resources provided by the local machine 102 (block 1065).

In some embodiments, the proxy handler 802 receives, from the shell 606, a request for execution of a command associated with the context menu 812 associated with the resource 220 provided by the remote machine 106. The proxy handler 802 redirects the request to a verb invoker 806 executing on the remote machine 106. The shell 606, in communication with the verb invoker 806, executes the command.

In one embodiment, a method includes receiving, by a local agent 614 executing on a local machine 102, information associated with a context menu handler associated with a resource 215 provided by a remote machine 102. The local agent 614 installs a proxy handler associated with the context menu handler, responsive to the received information. The local agent 614 modifies at least one registry entry on the local machine 102, responsive to the received information. A shell receives a request for a display of a context menu, wherein the request is generated on the local machine 102. The shell generates graphical data representing the requested context menu 812, responsive to the at least one modified registry entry. The local agent 614 integrates the generated graphical data into a local display 212 of a desktop environment 204 providing integrated access both to resources provided by the remote machine 106 and to resources provided by the local machine 102.

Figure 11A:
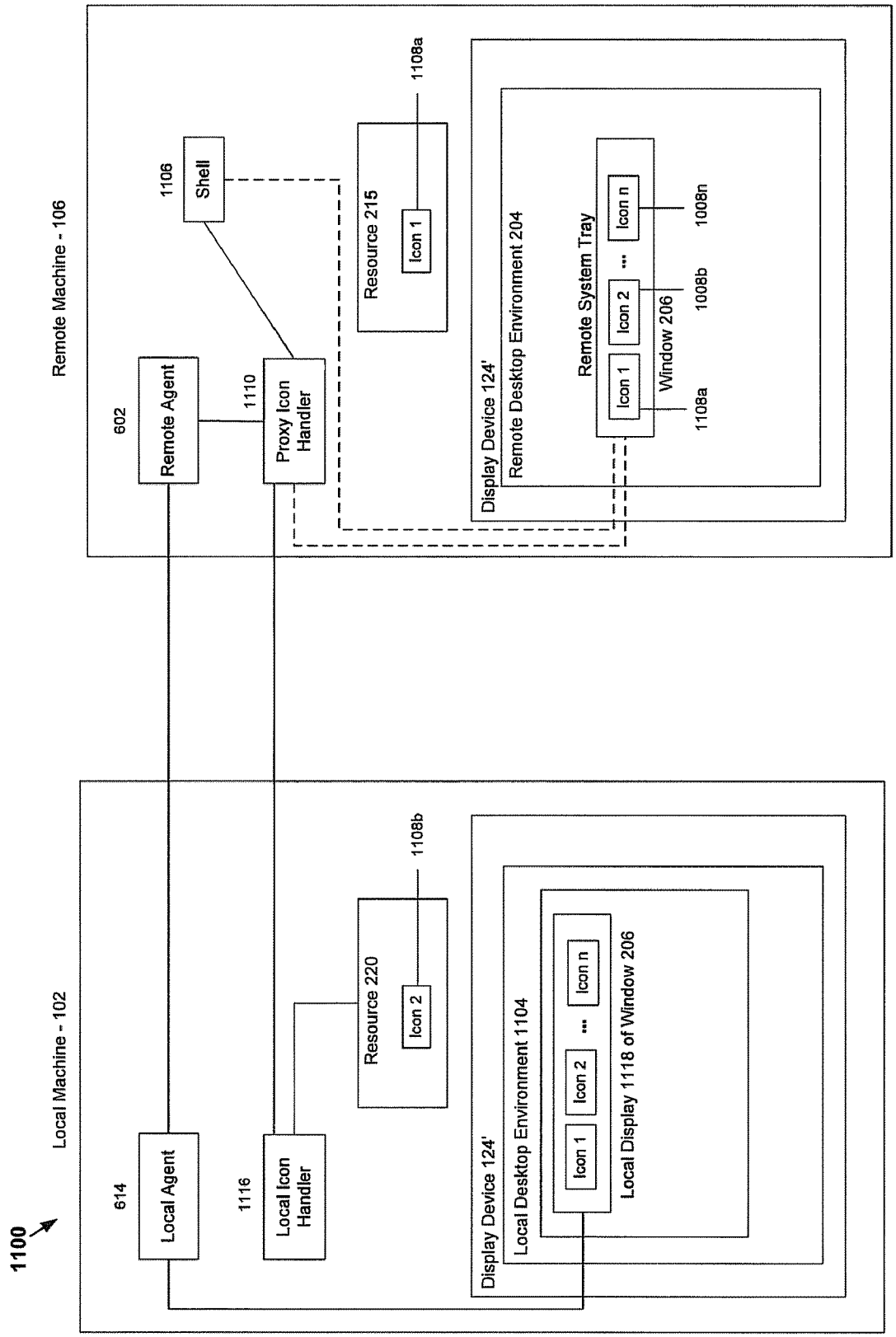
FIG. 11A is a block diagram depicting an embodiment of a system for providing, by a remote machine, access to graphical data associated with a resource provided by a local machine.

Referring now to FIG. 11A, a block diagram depicts one embodiment of a system 1100 for providing, by a remote machine, access to graphical data associated with a resource provided by a local machine. In brief overview, the system 1100 includes a remote machine 106, a remote agent 602, a proxy icon handler 1110, a local machine 102, a local agent 614, a local icon handler 1116, an icon 1108b associated with a resource 220 provided by the local machine 102, a shell 1106 on the remote machine 106, and a window 206 displaying a plurality of icons 1108a-n in a remote desktop environment 204. In some embodiments, the system 1100 visually integrates a subset of the system tray (or "systray") icons present on a local machine 102 into the system tray of the remote machine 106. A system tray window 206 may include, for example and without limitation, such icons as a battery meter, PC card status, volume control, task scheduler, printer, clock, anti-virus programs, and any other icon.

In one embodiment, an icon is animated. In another embodiment, an icon may change appearance—or be replaced by a second icon—to reflect an underlying state of a resource associated with the icon. In still another embodiment, a display of an icon that is obscured by a representation of a second data object may be included in the integrated display. In still even another embodiment, a window displaying a plurality of icons may have a fixed size, limiting the number of displayable icons. In yet another embodiment, a modified version of an icon is displayed; for example, a version of the icon identifying a machine on which an associated resource executes may display.

In one embodiment, the icon is an icon displayed in a system tray window. In another embodiment, the icon is an icon displayed in a toolbar control. In still another embodiment, the icon is an icon displayed in a system control area window. In yet another embodiment, the icon is an icon displayed in a notification area window.

In one embodiment, the icon provides functionality upon request by a user. In another embodiment, the functionality provided is the execution of a resource associated with the icon; for example, a user may select the icon by selecting the display of the icon with a pointing device to request execution of a resource associated with the icon ("clicking on the icon"). In still another embodiment, the functionality is a display of a dynamically-generated data object upon request by a user; for example, a user may position a pointing device cursor over a display of an icon ("hovering the mouse over the icon") and view a dynamically-generated window providing the user with information associated with the icon.

Referring now to FIG. 11A, and in greater detail, the remote agent 602, executing on a remote machine 106, initializes a proxy icon handler 1110. In some embodiments, the remote agent 602 initializes the proxy icon handler 1110 and communicates with various components of system 1100 as described previously in connection with FIGS. 6-10. In one embodiment, the remote agent 602 includes a transmitter transmitting, to the local agent, a z-order entry for the window displaying the plurality of icons.

The proxy icon handler 1110 includes a transceiver receiving, from an icon handler 1116 on a local machine 102, data associated with an icon 1108b associated with a resource 220 provided by the local machine 102. The proxy icon handler 1110, in communication with a shell 1106 on the remote machine 106, may modify a window 206 displaying a plurality of icons 1108a-n in a remote desktop environment 204, wherein the plurality of icons includes at least one icon 1108a associated with a resource 215 provided by the remote machine 106 and includes the icon 1108b associated with the resource 220 provided by the local machine 102.

In some embodiments, the proxy icon handler 1110 includes a transceiver receiving a request for access to the resource 220 provided by the local machine 102 associated with the icon 1108b and redirecting the request to the icon handler 1116 executing on the local machine 102. In one embodiment, the local icon handler 1116 communicates with a shell extension invoker to receive messages from the remote machine 102. In another embodiment, the local icon handler 1116 communicates with a local agent 1014 to receive messages from the remote machine 102. In still another embodiment, the local icon handler 1116 communicates directly with the proxy icon handler 1110 to receive messages. In still even another embodiment, the local icon handler 1116 receives a redirected message identifying a user request for access to functionality provided by an icon published to the desktop environment on the remote machine 106. In yet another embodiment, the local icon handler 1116 receives a redirected message including a request for graphical data associated with an icon managed by the local icon handler 1116.

In some embodiments, the local icon handler 1116 includes a transmitter for sending, to the proxy icon handler 1110, information associated with a local icon. In one of these embodiments, the local icon handler 1116 includes functionality for identifying a current state of a local icon—such as whether or not the icon is currently displayed. In another of these embodiments, local icon handler 1116 includes functionality for identifying informational text associated with the icon; for example, the local icon handler 1116 may be in communication with a local registry, retrieve informational text to be displayed with the local icon upon request, and transmits the informational text to the proxy icon handler 1110. In still another of these embodiments, the local icon handler 1116 retrieves data from a registry on the local machine 102 to identify the current state of the local icon 1108 and the informational text associated with the local icon 1108; for example, the local icon handler 1116 may include a method or function for requesting an enumeration of registry keys to retrieve the data from the registry. In other embodiments, the local icon handler 1116 includes a receiver receiving, from the proxy icon handler 1110, a direction to display icon data locally.

In one embodiment, the proxy icon handler 1110 may include a receiver receiving an identification of the icon 1108b associated with a resource 220 provided by the local machine 102. In some embodiments, the proxy handler 1110 may include a receiver receiving a file including the icon 1108b associated with a resource 220 provided by the local machine 102. In other embodiment, the proxy handler 1110 may include a receiver receiving a data stream including the icon file. In still other embodiments, the proxy icon handler 1110 may generate the window 206 displaying the plurality of icons 1108a-n in the remote desktop environment 204, the window including at least one icon 1108a associated with a resource 215 provided by the remote machine 106 and including a modified version of the icon 1108b associated with the resource 220 provided by the local machine 102. In further embodiments, the proxy icon handler 1110 may modify the window 206 displaying the plurality of icons 1108a-n in the remote desktop environment 204, the window including at least one icon 1108a associated with a resource 215 provided by the remote machine 106 and including a modified version of the icon 1108b associated with the resource 220 provided by the local machine 102. In some embodiments, the proxy icon handler 1110 does not modify the window 206. In some embodiments, the proxy icon handler 1110 does not modify the icon 1108b.

The proxy icon handler 1110 may further generate a system tray window 206 displaying the plurality of icons 1108a-n in the remote desktop environment 204, wherein the plurality of 1108a-n includes at least one icon 1108a associated with a resource 215 provided by the remote machine 106 and the icon 1108b associated with the resource 220 provided by the local machine 102. In some embodiments, the proxy icon handler 1110 may modify an existing system tray window 206 displaying the plurality of icons 1108a-n in the remote desktop environment 204.

In one embodiment, a single process provides the functionality of the proxy icon handler 1110. In another embodiment, a process need not be dedicated to this purpose, as long as it can provide reliable and reasonably prompt handling of the icon notification window messages. In still other embodiments, multiple processes may provide the functionality.

In one embodiment, the local icon handler 1118 includes a Shell_NotifyIcon( ) function. In another embodiment, the local icon handler 1118 intercepts a function for identifying a resources calling the Shell_NotifyIcon( ) function. In still another embodiment, the local icon handler 1118 hooks the Shell_NotifyIcon( ) function. In yet another embodiment, the local icon handler 1118 executes prior to the installation of an icon associated with a resource 220 provided by the local machine. In some embodiments, initialization of the local icon handler 1118 requires a reboot of the remote machine 106 and administrative privileges. In other embodiments, initialization of the local icon handler 1118 does not require a reboot of the remote machine 106 or administrative privileges.

A local agent 614, executing on the local machine 102, receives, from the remote agent 602, window attribute data associated with the window 206 displaying the plurality of icons 1108a-n and graphical data representing the window 206. In some embodiments, the local agent 614 receives, from the remote agent 602, a z-order entry for the window 206 displaying the plurality of icons 1108a-n in the remote desktop environment 204. In some embodiments, the window 206 may be the system tray window of the remote machine 106. In other embodiments, the window 206 may be the taskbar window of the remote machine 106. The local agent 614 displays the received graphical data in a window 1118 formed according to the received window attribute data. In some embodiments, the local agent 614 replaces a display of a system tray window 1112 on the local machine 102 with a display 1118 of the window 206 generated by the proxy icon handler 1110 on the remote machine 106. In other embodiments, the local agent 614 displays, according to the received window attribute data, a full-screen, integrated desktop within a window 1118.

In some embodiments, the proxy icon handler 1110 applies a filter to remove, from the plurality of icons 1108a-n, a duplicate icon. In one of these embodiments, the filter is used to eliminate a duplicate icon where two instances of a resource are executing and a user requests—directly or indirectly through a preference or policy setting associated with the user or with the resource—the removal of duplicate icons. In another of these embodiments, the filter is used in combination with a policy or administrative setting to prevent integration of an icon; for example, a management component may limit a number of integrated icons to prevent a representation of a system tray from exceeding a limitation on size.

Figure 11B:
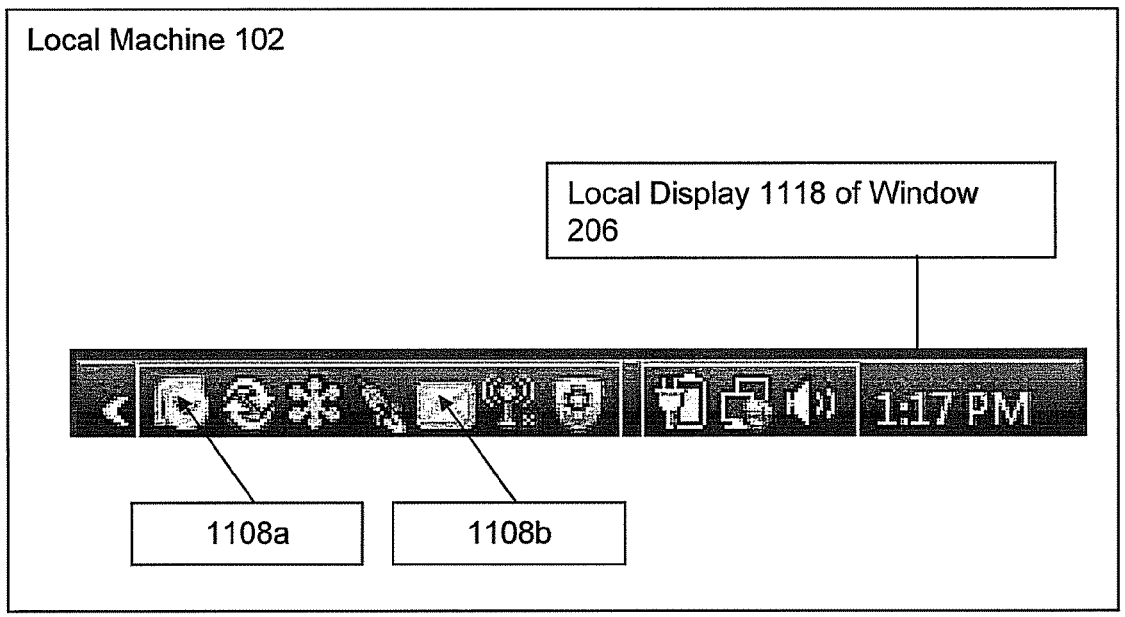
FIG. 11B is a screen shot depicting one embodiment of an integrated context menu.

Referring now to FIG. 11B, a screen shot depicts one embodiment of a remote system tray including a plurality of icons 1108a-b. As depicted in FIG. 11B, the representation of the icon 1108b provided by the local machine 102 is included in a system tray window displaying a representation of the icon 1108a associated with the resource 215 provided by the remote machine 106. In one embodiment, the system tray is displayed on the local machine 102. In another embodiment, the system tray is referred to as a notification area within a toolbar control. In still another embodiment, the system tray is referred to as a system control area. In still even another embodiment, the system tray includes a notification area. In yet even another embodiment, the system tray includes a system control area.

Figure 12:
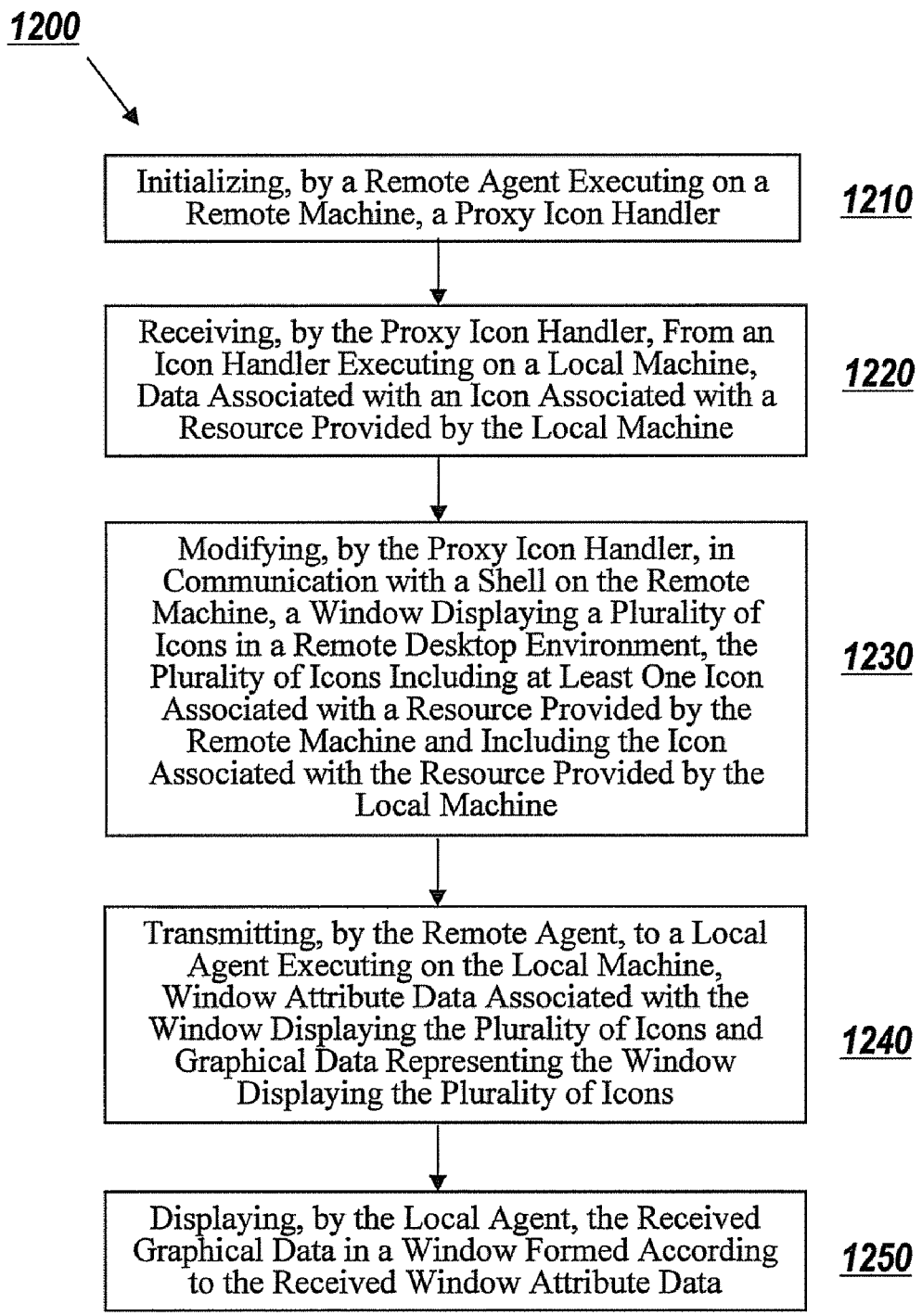
FIG. 12 is a flow diagram depicting an embodiment of a method for providing, by a remote machine, access to graphical data associated with a resource provided by a local machine.

Referring now to FIG. 12, a flow diagram depicts an embodiment of a method 1200 for providing, by a remote machine 106, access to graphical data associated with a resource 220 provided by a local machine 102. In brief overview, the method 1200 includes initializing, by a remote agent 602 executing on a remote machine 106, a proxy icon handler 1110 (block 1210). The proxy icon handler 1110 receives, from an icon handler 1116 executing on a local machine 102, data associated with an icon 1108b associated with a resource 220 provided by the local machine 102 (block 1220). The proxy icon handler 1110, in communication with a shell 1106 on the remote machine 106, modifies a window 206 displaying a plurality of icons (e.g., 1108a, 1108b) in a remote desktop environment 204, the plurality of icons (e.g., 1108a, 1108b) including at least one icon (e.g., 1108a) associated with a resource 215 provided by the remote machine 106 and including the icon 1108b associated with the resource 220 provided by the local machine 102 (block 1230). The remote agent 602 transmits, to a local agent 614 executing on the local machine 102, window attribute data associated with the window 206 displaying the plurality of icons (e.g., 1108a, 1108b) and graphical data representing the window 206 displaying the plurality of icons (e.g., 1108a, 1108b) (block 1240). The local agent 614 displays the received graphical data in a window 1118 formed according to the received window attribute data (block 1250).

A remote agent 602, executing on a remote machine 106, initializes a proxy icon handler 1110 (block 1210). In some embodiments, the remote agent 602 initializes the proxy icon handler and communicates with various components of system 1100 as described previously in connection with FIGS. 6-11.

The proxy icon handler 1110 receives, from an icon handler 1116 executing on a local machine 102, data associated with an icon 1108b associated with a resource 220 provided by the local machine 102 (block 1220). In some embodiments, the proxy icon handler 1110 may receive an identification of the icon 1108b associated with a resource 220 provided by the local machine 102. In other embodiments, the proxy icon handler 1110 may retrieve a file including the icon 1108b associated with a resource 220 provided by the local machine 102. In one embodiment, the proxy icon handler 1110 receives an identification of an icon associated with a resource provided by the local machine, the icon displayed in a system tray window maintained by the local machine. In another embodiment, the proxy icon handler 1110 receives an identification of an icon associated with a resource provided by the local machine, the icon displayed in a system control area window maintained by the local machine. In still another embodiment, the proxy icon handler 1110 receives an identification of an icon associated with a resource provided by the local machine, the icon displayed in a notification area window maintained by the local machine.

In some embodiments, the proxy icon handler 1110 receives an identification of at least one icon associated with a resource provided by the local machine. In one of these embodiments, the proxy icon handler 1110 receives the identification from the remote agent 602. In another of these embodiments, the proxy icon handler 1110 receives the identification from the local icon handler 1116 executing on the local machine 102. In other embodiments, the proxy icon handler 1110 receives graphical data associated with the icon. In one of these embodiments, the graphical data is displayed to display the icon. In still other embodiments, the proxy icon handler 1110 receives an identification of a modification to a previously-identified icon. In one of these embodiments, the proxy icon handler modifies a representation of the icon on the remote machine 106 responsive to the identification of the modification.

In one embodiment, a local icon handler 1116 identifies the at least one icon for inclusion in an integrated display of a window including a plurality of icons. In another embodiment, the local icon handler 1116 uses MICROSOFT Active Accessibility to identify a data object associated with an icon on the local machine 102, the data object identifying screen coordinates for the bounds of the icon along with a caption. In still another embodiment, the local icon handler 1116 uses a screen-scraping technique to generate a copy of graphical data displayed in the identified screen coordinates and associated with the at least one icon. In still even another embodiment, the local icon handler 1116 retrieves an enumeration of the at least one icon and associated icon data from a registry on the local machine 102. In yet another embodiment, the local icon handler 1116 retrieves an enumeration including a unique listing of each of a plurality of icons. In some embodiments, the local icon handler 1116 uses a message-based interface to a toolbar control to retrieve information about at least one icon in the toolbar that is used by WINDOWS to implement the notification area (or the system control area).

In some embodiments, the local icon handler 1116 monitors a local icon for changes, such as insertion, deletion, or modification of the local icon. In one of these embodiments, the local icon handler 1116 monitors all icon-related operations on the local machine 102. In another of these embodiments, the local icon handler 1116 identifies a resource 220 associated with an icon 1108b by processing a monitored, icon-related operation. In still another of these embodiments, the local icon handler 1116 hooks a response by at least one resource 220 to a WINDOWS message directing resources on the local machine 102 to generate a corresponding at least one icon 1108b. In still even another of these embodiments, the local icon handler 1116 hooks a WINDOWS message by at least one resource 220 to a system tray area data object modifying a second data object displayed by the system tray area data object. In yet another of these embodiments, the local icon handler 1116 retrieves data from a buffer within a memory space associated with a shell on the local machine 102.

In some embodiments, the local icon handler 1116 sends a WINDOWS control message to identify a total number of icons displayed by a data object displaying a plurality of icons (such as a system tray window displaying a plurality of icons). In one of these embodiments, the local icon handler 1116 calls a function, such as TB_GETBUTTON(k) and receives a data structure, such as a TBBUTTON struct, containing information relating to an icon including, but not limited to, the following: i) a bitmap index of an image list; ii) a command identifier for the icon; and iii) an identification of text associated with the icon.

In one embodiment, a local agent 614 on the local machine 102 transmits, to the remote agent 602, data associated with the icon associated with the resource 220 provided by the local machine 102. In another embodiment, the local agent 614 transmits data including an identification of a change to data associated with the icon and previously transmitted to the remote agent 602. In still another embodiment, the remote agent 602 forwards the received data to the proxy icon handler 1110. In yet another embodiment, a proxy handler 1110 associates a proxy icon with a data object representing a system tray on the remote machine 106 responsive to the received information. In one embodiment, data associated with the proxy icon specifies a proxy icon handler that should receive notifications of user interaction. In another embodiment, data associated with the proxy icon identifies display data that the proxy icon handler should display upon receiving a notification of a type of user interaction; for example, the data may identify a type of pop-up menu to display when a user clicks on an icon in the system tray associated with the proxy icon or identifying a type of informational window to display when a user positions a cursor icon over the icon in the system tray.

The proxy icon handler 1110 modifies a window 206 displaying a plurality of icons 1108a-n in a remote desktop environment 204, the plurality of icons 1108a-n including at least one icon 1108 associated with a resource 215 provided by the remote machine 106 and including the icon 1108b associated with the resource 220 provided by the local machine 102 (block 1230). In some embodiments, the window 206 displaying the plurality of icons 1108a-n may be a system tray window 206 of the remote desktop environment 204. In other embodiments, the proxy icon handler 1110 removes, from the plurality of icons 1108a-n, a duplicate icon. In one of these embodiments, the proxy icon handler 1110 applies a filter to remove a duplicate icon. In still other embodiments, the proxy icon handler 1110 modifies the window 206 displaying the plurality of icons 1108a-n in the remote desktop environment 204, the window 206 including at least one icon 1108a associated with a resource 215 provided by the remote machine 106, and including a modified version of the icon 1108b associated with the resource 220 provided by the local machine 102.

In one embodiment, graphical data associated with a data object maintained on the remote machine 106 is displayed on the local machine 102. In another embodiment, for example, a user interface element is generated on the remote machine 106—such as an icon, menu, tool bar or task bar—and a remote agent 602 transmits graphical data representing the user interface element for display on the local machine 102. In still another embodiment, the local machine 102 displays the graphical data according to window attribute data received from the remote agent 602; for example, the remote agent 602 may transmit to the local agent 1014 coordinates for a window region on the remote machine 106 and the local agent 1014 may display received graphical data in a corresponding window region on the local machine 102. In still even another embodiment, the display of the graphical data may obscure a display of a data object maintained on the local machine 102. In yet another embodiment, for example, a local agent 1014, in communication with a shell, directs the display of a local task bar and then directs the display, on top of the display of the local task bar, of graphical data associated with a task bar on the remote machine 106. In some embodiments, as described above, the methods and systems described herein provide functionality for integrating the display of both local and remote data objects.

In one embodiment, a proxy icon handler 1110 on the remote machine 106 modifies a system tray window to include graphical data received from the local machine 102 and representing a system tray icon associated with a resource 220 on the local machine. In another embodiment, and as described in greater detail below, the remote agent 602 transmits graphical data to the local machine 102 for display. In still another embodiment, the local agent 1014 directs the formation of a system tray window displaying the graphical data received from the remote agent 602—including the graphical data forming the icon representing a system tray icon associated with a resource 220 on the local machine 102.

In one embodiment, a proxy icon handler 1110 accesses an application programming interface, such as Shell_NotifyIcon( ), to request insertion, modification, deletion or change of focus of an icon into the system tray on the remote machine 106. In another embodiment, the proxy icon handler 1110 accesses an interface to retrieve an icon handler defining an appearance of an icon. In still another embodiment, the proxy icon handler 1110 provides an interface to which the shell 606 may send a notification of a user interaction with a message identifier and an icon identifier. In yet another embodiment, a parameter of the interface defines presence, captions, appearance, and behavior of data displayed with the icon, such as an informational window generated when a user interacts with the icon.

In one embodiment, the proxy icon handler 1110 receives messages associated with user interactions with the proxy icon. In another embodiment, the proxy icon handler 1110 receives, from the shell 606, windows messages with a message ID. In still another embodiment, the shell 606 transmits the messages to a window associated with the proxy icon handler 1110. In still even another embodiment, these messages incorporate notification data that is constructed according to a specified, currently-active type of notification behavior. In yet another embodiment, the proxy icon handler 1110 provides functionality for processing the notification messages.

The remote agent 602 transmits, to a local agent 614 executing on the local machine 102, window attribute data associated with the window 206 displaying the plurality of icons 1108*a-n* and graphical data representing the window 206 displaying the plurality of icons 1108*a-n* (block 1240). In some embodiments, the remote agent 602 transmits, to the local machine 102, a z-order entry for the window displaying the plurality of icons 1108*a-n*.

The local agent 614 displays the received graphical data in a window 1118 formed according to the received window attribute data (block 1250). In some embodiments, a display of a system tray 1112 on the local machine 102 is replaced with a display 1118 of the window 206 displaying the plurality of icons 1108*a-n*.

In one embodiment, the proxy icon handler 1110 receives a request for access to the resource 220 provided by the local machine 102 and associated with the icon 1108*b*. In another embodiment, the proxy icon handler 1110 redirects the request to the icon handler 1116 executing on the local machine 102. In still another embodiment, the proxy icon handler 1110 redirects the request to the local agent 614 on the local machine 102. In still even another embodiment, the proxy icon handler 1110 receives, from the remote agent 602, an identification of a user interaction with the icon 1108*b* associated with the resource 220 provided by the local machine 102. In one embodiment, the request for access to the resource is a result of a user interaction with a display, on the local machine 102, of a data object. In another embodiment, using a pointing device such as a mouse to click on an icon or to hover a cursor over an icon, a user may request the display of an icon-specific context menu. In still another embodiment, a user may request the display of a window, such as a new window, a window obscured by a display of a different data object, or a minimized window. In yet another embodiment, the user may request access using a keyboard.

Figure 13:
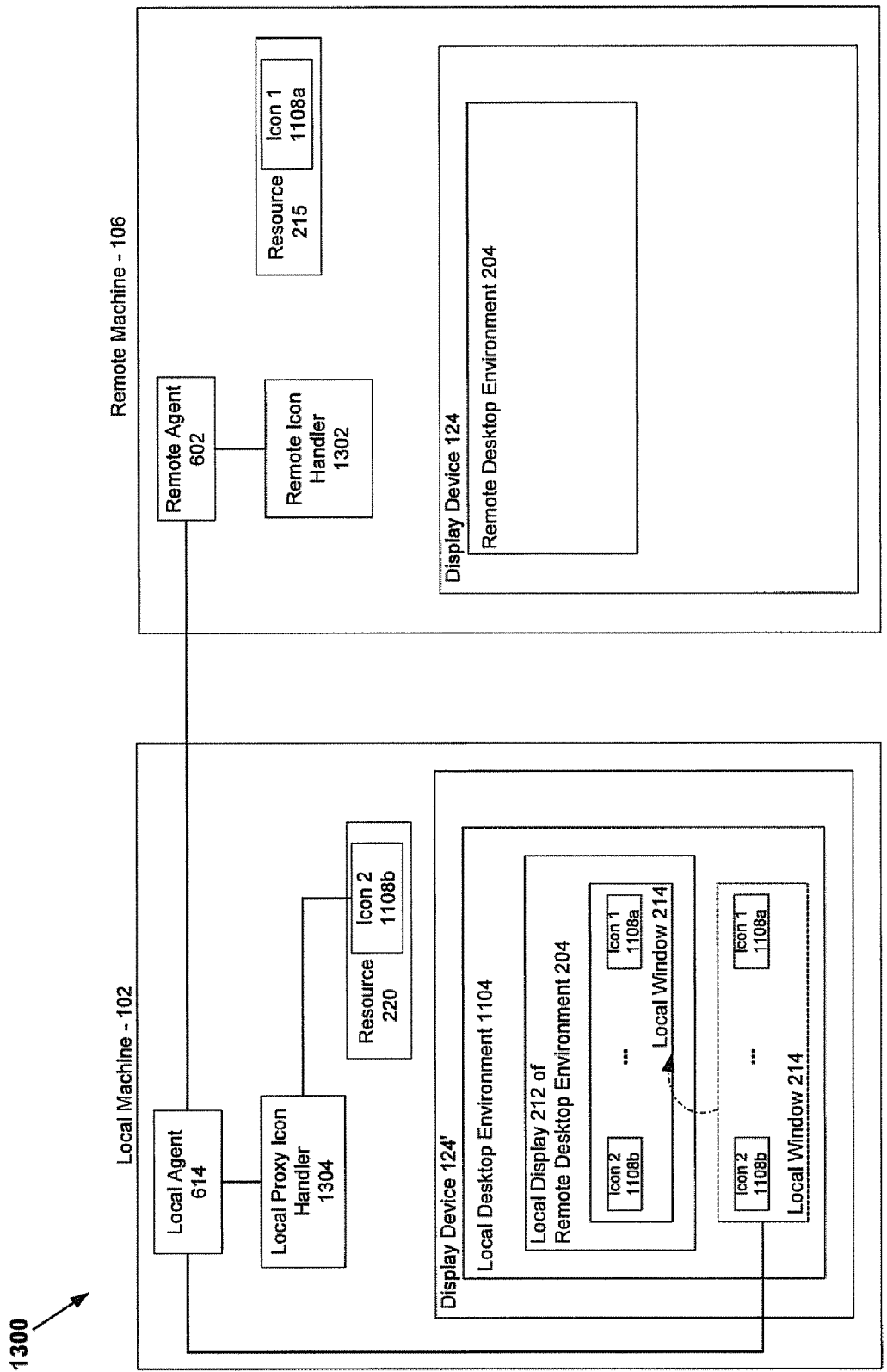
FIG. 13 is a block diagram depicting an embodiment of a system for providing, by a local machine, access to graphical data associated with a resource provided by a remote machine.

Referring now to FIG. 13, a block diagram depicts one embodiment of a system 1300 for providing, by a local machine 102, access to graphical data associated with a resource provided by a remote machine 106. In brief overview, the system 1300 includes a local machine 102, a local agent 614, a remote machine 106, a remote agent 602, a remote desktop environment 204, an icon 1108*a* associated with a resource 215 provided by the remote machine 106, and a local window 214 displaying a plurality of icons in a local desktop environment 1104, the plurality of icons including at least one icon (e.g., 1108*b*) associated with a resource (e.g. 220) provided by the local machine. In some embodiments, the local window 214 may be a system tray window 1112 of the local machine 102.

In more detail, the system 1300 includes a local agent 614 which incorporates an icon 1108*a*, associated with a resource 215 provided by a remote machine 106, into a local window 214 displaying a plurality of icons in a local desktop environment 1104, wherein the plurality of icons include at least one icon (e.g., 1108*b*) associated with a resource (e.g., 220) provided by the local machine 102. In some embodiments, the local window 214 is a system tray window 1112 of the local machine 102. The local agent 614 associates or re-parents the local window 214 to a window 212 displaying, to a user of the local machine 102, a desktop environment 204 maintained by the remote machine 106 and providing integrated access to both resources provided by the local machine 102 and resources provided by the remote machine.

In other embodiments, the system 1300 includes a proxy icon handler 1304 on the local machine 102 which receives a request for access to the resource 215 provided by the remote machine 106 and associated with the icon 1108*a*. In some of these embodiments, the proxy icon handler 1304 redirects the request to the remote agent 602. In other embodiments, the proxy icon handler 1304 redirects the request to a remote icon handler 1302. Alternatively or additionally, the proxy icon handler 1304 may receive an identification of a user interaction with the local display of the icon 1108*a* associated with the resource 215 provided by the remote machine 106. Alternatively or additionally, the local agent 614 may receive, from the proxy icon handler 1304, an identification of a user interaction with the icon 1108*a* associated with the resource 215 provided by the remote machine 106.

Referring now to FIG. 14, a flow diagram depicts an embodiment of a method 1400 for providing, by a local machine 102, access to graphical data associated with a resource 215 provided by a remote machine 106. In brief overview, the method 1400 includes receiving, by a local agent 614 executing on a local machine 102, an icon 1108*a* associated with a resource 215 provided by the remote machine 106 (block 1410). The local agent 614 incorporates the icon 1108*a* associated with the resource 215 provided by the remote machine 106 into a local window 214 displaying a plurality of icons in a local desktop environment 1104, wherein the plurality of icons includes at least one icon 1108*b* associated with a resource 220 provided by the local machine 102 (block 1420). The local agent 614 re-parents the local window 214 displaying the plurality of icons in the local desktop environment 1104 to a window 212 displaying, to a user of the local machine 102, a desktop environment 204 maintained by the remote machine 106 and providing integrated access to both resources provided by the local machine 102 and resources provided by the remote machine 106 (block 1430).

In more detail, a local agent 614, executing on a local machine 102, receives an icon 1108*a* associated with a resource 215 provided by the remote machine 106 (block 1410). In some embodiments, the local agent 614 receives the icon 1108*a* from a remote agent 602 executing on the remote machine 106.

The local agent 614 incorporates the icon 1108*a* associated with the resource 215 provided by the remote machine 106 into a local window 214 displaying a plurality of icons in a local desktop environment 1104, wherein the plurality of icons includes at least one icon 1108*b* associated with a resource 220 provided by the local machine 102 (block 1420). In some embodiments, the local window 214 is a system tray window 1112 on the local machine 102.

The local agent 614 re-parents the local window 214 displaying the plurality of icons in the local desktop environment 1104 to a window 212 displaying, to a user of the local machine 102, a desktop environment 204 maintained by the remote machine 106 and providing integrated access to both resources provided by the local machine 102 and resources provided by the remote machine 106 (block 1430). In some embodiments, the local agent 614 replaces the display by over-painting and dynamically anchoring the local window over the top of the remote one, as described in greater detail below.

In some embodiments, the local agent 614 redirects, to a remote icon handler 1302, a request for access to the resource 215 provided by the remote machine and associated with the icon 1108a. In some of these embodiments, the remote icon handler 1302 provides access to the resource 215 provided by the remote machine 106 and associated with the icon 1108a. In yet another embodiment, the local agent 614 may receive, from a local proxy icon handler 1304, an identification of a user interaction with the icon 1108a associated with the resource 215 provided by the remote machine 106.

In one embodiment, the local proxy icon handler 1304 receives a notification of a user interaction with a representation of the identified icon. In another embodiment, the local proxy icon handler 1304 receives the notification from a shell. In still another embodiment, the local proxy icon handler 1304 receives the notification from the remote agent 602. In still even another embodiment, the local proxy icon handler 1304 is associated with a window and message loop for receiving window messages notifying the local proxy icon handler 1304 of the user interaction. In yet another embodiment, the local proxy icon handler 1304 redirects the received notification to a corresponding icon handler on the remote machine 106.

In one embodiment, an icon may provide functionality when a user interacts with a display of a data object; for example, by clicking on the icon or using a keyboard to interact with the icon. In another embodiment, the icon may provide functionality in response to a left click with a pointing device such as a mouse or pressing a key on the keyboard such as the space bar. In still another embodiment, the icon may provide functionality in response to a right-click with a pointing device or pressing a key combination or special key such as Shift-F10 or the Context Menu key. In yet another embodiment, the icon may provide functionality in response to interaction other a selection by the user of an icon by clicking on the icon with a pointing device; for example, the user may use a pointing device to hover a cursor icon over an icon without clicking on or selecting the icon in any way.

In some embodiments, the user interacts with the icon in different ways depending on what version of what operating system the remote machine 106 executes. For example, MICROSOFT WINDOWS 95 notifications appear to be essentially raw user interaction messages (window mouse and keyboard messages), while some applications appear to respond in non-standard ways to various user inputs; MICROSOFT WINDOWS 2000 sends higher level notification messages (such as WM_CONTEXTMENU or NIN_SELECT) for certain types of user interaction rather than raw mouse or keyboard messages; MICROSOFT WINDOWS XP added explicit notification messages for icons with balloon tooltips (e.g. NIN_BALLOONSHOW); MICROSOFT WINDOWS VISTA added notification messages for rich icon pop-up UIs (e.g. NIN_POPUPOPEN). In one of these embodiments, the remote machine 106 provides different notification messages than the local machine 102 provides. In another of these embodiments, the local proxy icon handler 1304 translates the messages into a format expected by the local machine 102.

In one embodiment, once an icon is displayed within the system tray, user interactions with the icon are reported as windows messages with a given message ID to the given handler HWND. In another embodiment, a window, such as a remote system tray window 206, transmits a notification of a user interaction with the icon to a shell 1106. In still another embodiment, the proxy icon handler 1110 receives, from a shell 1106, a notification of a user interaction with the icon. In yet another embodiment, the proxy icon handler 1110 receives, from a window, such as a remote system tray window 206, a notification of a user interaction with the icon.

In one embodiment, the proxy icon handler 1110 processes a notification of a user interaction with an icon. In another embodiment, the proxy icon handler 1110 identifies a request for functionality in the notification of the user interaction. In still another embodiment, the proxy icon handler 1110 provides the requested functionality; for example, the proxy icon handler 1110 may retrieve from a cache on the remote machine 106 data for use in generation of a dynamic display of information associated with the icon (such as text for display in a pop-up window generated when a user hovers a pointing device over the icon). In still even another embodiment, the proxy icon handler 1110 redirects the notification of the user interaction to the remote machine 102; for example, the proxy icon handler 1110 may redirect the notification to a local icon handler 1116 or to the local agent 614. In yet another embodiment, the proxy icon handler 1110 includes data associated with the notification to the remote machine 102.

In one embodiment, a local icon handler 1116 receives a notification of a user interaction with an icon associated with the local icon handler 1116. In another embodiment, the local icon handler 1116 receives the notification from the local agent 614. In still another embodiment, the local icon handler 1116 receives the notification from the proxy icon handler 1110. In yet another embodiment, the local icon handler 1116 receives the notification from a shell extension invoker on the local machine 102. In some embodiments, the notification is of a user interaction via a keyboard with an icon. In other embodiments, the notification is of a user interaction via a mouse or other pointing device with an icon.

In one embodiment, the local icon handler 1116 identifies a data object, such as a window, associated with the icon identified in the received notification. In another embodiment, the local icon handler 1116 retrieves an identification of the data object from a local registry. In still another embodiment, the local icon handler 1116 identifies a type of functionality requested by the user. In still even another embodiment, the local icon handler 1116 determines that the user has requested a dynamic display of information in a window associated with the icon; for example, the local icon handler 1116 may determine that the user positioned a display of a pointing device cursor over an icon, without selecting the icon (i.e., the user may have hovered a mouse cursor over an icon without clicking on the icon). In yet another embodiment, the local icon handler 1116 determines that the user has requested execution of a resource associated with the icon; for example the local icon handler 1116 may determine that the user clicked on the icon.

In some embodiments, the local icon handler 1116 directs the execution of a resource 220 responsive to processing a received notification of a user interaction with an icon associated with the local icon handler 1116. In one of these embodiments, the local icon handler 1116 directs a shell executing on the local machine 102 to execute the resource 220. In another of these embodiments, the local icon handler 1116 transmits to the resource 220 an initialization message in a format expected by the resource 220. In other embodiments, an icon is hidden and the functionality requested by the user is the display of the icon. In one of these embodiments, the local icon handler 1116 receives a notification of a user interaction with a first icon and determines that the user interaction is a request for a display of a second icon.

In one embodiment, the local icon handler 1116 generates a data object, such as a window, for dynamic display of data associated with an icon. In another embodiment, the local icon handler 1116 identifies, within a notification of a user interaction with the icon, window coordinates identifying a location on a screen at which the user interaction occurred; for example, the notification may include an identification of the coordinates at which the user positioned the display of the cursor. In still another embodiment, the local icon handler 1116 directs the display of the generated data object at or near the coordinates identified in the notification. In yet another embodiment, the local agent 614 receives an identification of the screen coordinates and directs the relocation of the displayed data object generated by the local icon handler 1116.

Desk Band Integration

Figure 15:
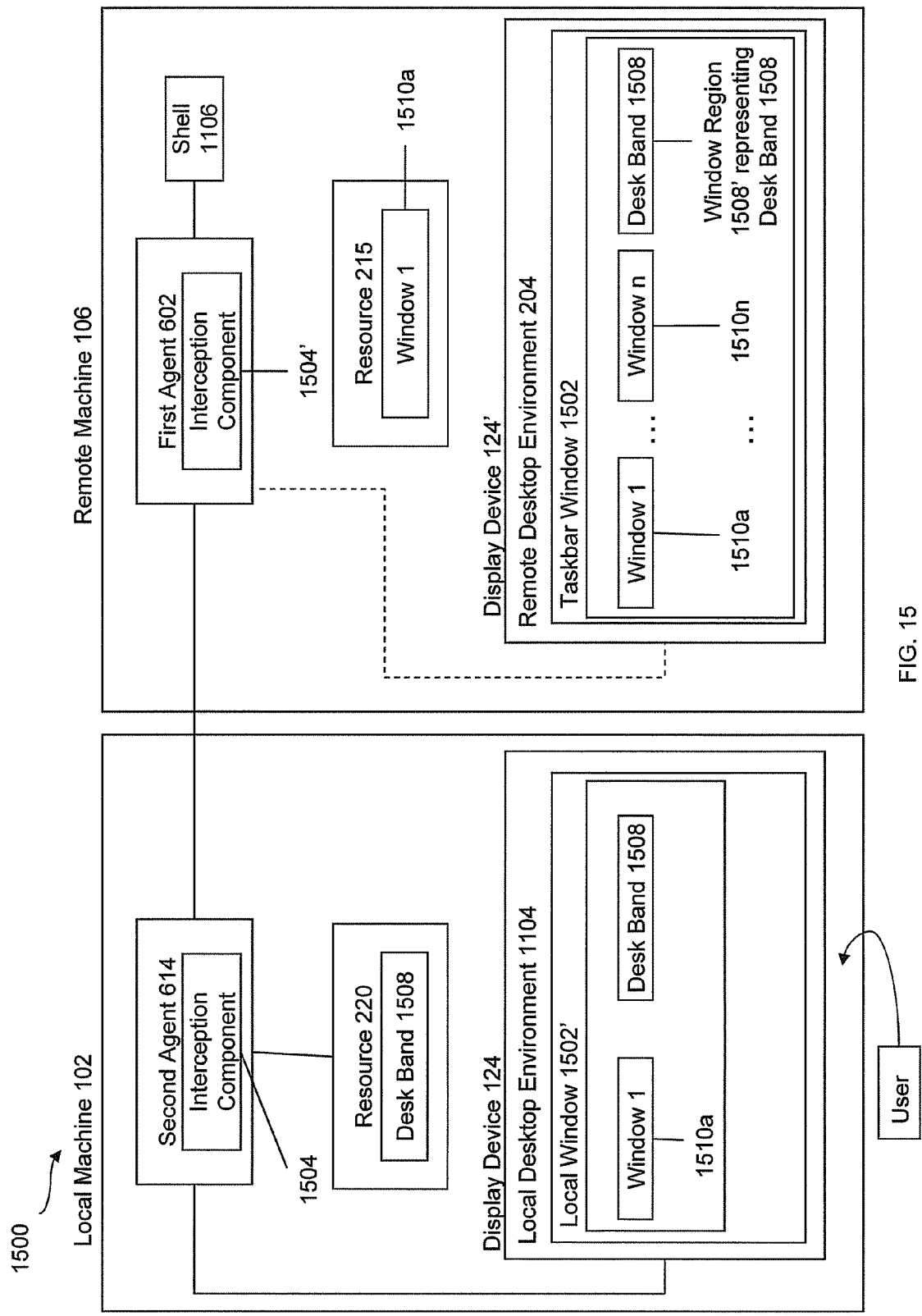
FIG. 15 is a block diagram depicting an embodiment of a system for providing, by a remote machine, access to a desk band associated with a resource executing on a local machine.

Referring now to FIG. 15, a block diagram depicts one embodiment of a system for providing, by a remote machine, access to a desk band associated with a resource executing on a local machine. In brief overview, the system 1500 includes a remote machine 106, a first agent 602 executing on the remote machine, a shell 1106 executing on the remote machine 106, a local machine 102, a second agent 614 executing on the local machine 102, a resource 220 provided by the local machine 102, and a desk band 1508 associated with the local resource 220.

Referring now to FIG. 15, and in greater detail, a first agent 602 executing on a remote machine 106 receives an identification of a desk band 1508 associated with a resource 220 provided by a local machine 102. The first agent 602, in communication with a shell 1106 executing on the remote machine 106, maintains a taskbar window 1502 in a desktop environment 204 on the remote machine 106. The taskbar window 1502 includes at least one window 1510*a* associated with a resource 215 provided by the remote machine 106. The taskbar window 1502 includes a window region 1508' representing the desk band 1508 by using graphical data stored on the remote machine 106. The taskbar window 1502 includes a window region 1508' representing the desk band 1508 by using graphical data received from the local machine 102.

In one embodiment, the first agent 602, in communication with the shell 1106 executing on the remote machine 106, maintains a taskbar window in a desktop environment on the remote machine 106, the taskbar window including a window region representing the desk band on the local machine by using graphical data received from the local machine 102. In another embodiment, the first agent 602 transmits an identification of the window region to the second machine 102. In still another embodiment, the first agent 602 transmits an identification of a parent or ancestor window of the taskbar window including the window region representing the desk band. In yet another embodiment, the first agent 602 transmits an identification of a z-order entry for the task bar window in a z-order list maintained by the remote machine 106. In some embodiments, the first agent 602 monitors the remote desktop environment 204, communicates with other components of system 1500, and transmits data to the local machine 102 as described previously in connection with FIGS. 2-14.

A second agent 614 executing on the local machine 102 receives window attribute data and output data associated with the taskbar window 1502 in the desktop environment 204 on the remote machine 106. The second agent 614 displays at least a portion of the received output data in a local window 1502' on a desktop environment 1104 on the local machine 102. In one embodiment, the window attribute data includes a z-order entry for the taskbar window 1502. In another embodiment, output data may include any human-perceptible data (e.g., graphical data, audio data, etc.). In yet another embodiment, output data may be generated by execution of the local resource 220.

In some embodiments, the local window 1502' on the desktop environment 1104 on the local machine 102 is a local display of the desktop environment 204 on the remote machine 106. In other embodiments, the local window 1502' on the desktop environment 1104 on the local machine 102 is a local display of the taskbar window 1502 in the desktop environment 204 on the remote machine 106.

In other embodiments, the second agent 614 includes an interception component 1504 intercepting a user interaction with a local display of the received output data. In some of these embodiments, the interception component 1504 redirects the user interaction to the desk band 1508 associated with the resource 220 provided by the local machine 102. In yet other embodiments, the first agent 602 includes an interception component 1504' that intercepts and redirects the user interaction to at least one of the shell 1106 and the second agent 614.

In one embodiment, a resource 220 provides at least a portion of its user interface via a user interface element referred to as a desk band. In another embodiment, a desk band is provided as a toolbar. In still another embodiment, a desk band is provided as a toolbar that that can be added to the WINDOWS taskbar. In yet another embodiment, a desk band may allow or prohibit itself to be dragged off the taskbar onto a desktop environment. In some embodiments, a toolbar is associated with a media player. In one of these embodiments, for example, a mini-player provided by a resource such as WINDOWS MEDIA player or an ITUNES player.

In some embodiments, where a remote machine 106 maintains a full-screen desktop environment for display to a user by a local machine 102, the display of the full-screen desktop environment may prevent the user from viewing or easily accessing the desk band 1508. In other embodiments, where a remote machine 106 transmits at least a portion of a desktop environment for display to a user by a local machine 102, the display of the portion of the desktop environment may prevent the user from viewing or easily accessing the desk band 1508. In one of these embodiments, for example, the remote machine 106 transmits graphical data and window attribute data associated with a window in the desktop environment and the local machine 106 displays the graphical data in a local window formed according to the received window attribute; the local window displaying the received graphical data may block the display of a locally-generated desk band. In still other embodiments, implementing the methods and systems described herein allow a user to view and interact with an integrated desktop environment providing access to resources provided by a remote machine and to resources, such as a desk band, provided by a local machine. In one of these embodiments, a display of the local desk band toolbar is integrated into a display of a remote taskbar.

In some embodiments, the methods and systems describe herein apply to applications and functionality other than desk bands or media player toolbars. In one of these embodiments, for example, the methods and systems described herein apply also to configuration panels and bars such as, without limitation, the Microsoft WINDOWS "language bar", the "Quick Launch" toolbar, "Desktop" toolbar, and the "Tablet PC Input Panel". In another of these embodiments, the methods and systems described herein apply also to configuration panels and areas such as, without limitation, the Microsoft VISTA "System Control Area". In still another of these embodiments, the methods and systems described herein provide functionality for integrating a system tray, such as, without limitation, a MICROSOFT system tray in its entirety.

In one embodiment, a desk band 1508 is a mini-player toolbar which is enabled when a user right-clicks on a blank area of a WINDOWS taskbar and enables the mode by interacting with a context menu associated with the task bar. In another embodiment, for example, a mini-player toolbar is enabled by interacting with a "Toolbars" context menu to enable the "WINDOWS MEDIA Player" mini-player toolbar. In still another embodiment, with the mini-player toolbar enabled, the mini-player toolbar is shown instead of a taskbar button whenever the media player is in the minimized state. In some embodiments, there is a separate "mini-player" mode that shows a larger version of the mini-player in a regular top level window. In one of these embodiments, the integration of the window displaying the larger version of the mini-player is performed as described above in connection with FIGS. 2-5.

In some embodiments, where a desk band 1508 is a mini-player associated with a media player resource, the desk band 1508 provides a user interface allowing a user to request access to functionality provided by the media player resource 220. In one of these embodiments, the functionality includes the ability to restore a window displaying the media player, stop the playing of an audio or visual track, play an audio or visual track, and adjust a level of volume of the track. In another of these embodiments, the functionality includes the ability to display output data generated by an execution of the media player resource; for example, a user may request the display of an image associated with the media player resource. In still another of these embodiments, a user positions a pointing device over the desk band 1508 (for example, "hovering" a cursor icon over the desk band) and this results in a display of a window associated with the resource; for example, a pop-up status window may display.

In one embodiment, a desk band 1508 is hosted by a shell on the local machine 102 and implemented by a COM object referred to as a desk band object. In another embodiment, multiple desk bands 1508 may be created and registered, thus making them available for integration into the taskbar window 1502. In still another embodiment, a desk band 1508 initially appears in the taskbar, but can be dragged to the desktop where it appears as a separate window. In yet another embodiment, a desk band 1508 is a kind of toolbar.

In some embodiments, a desk band object is a COM object that implements interfaces including, but not limited to, IDeskBand, IObjectWithSite and IPersistStream. In one of these embodiments, the desk band object is in communication with a container object, which may also be a COM object. In another of these embodiments, an interface such as IDeskBand is used by the container object to obtain display information (title, min/max/preferred sizes, display flags) from the desk band object. In still another of these embodiments, an interface such as IObjectWithSite is used to set up bi-directional communication between a desk band object and its site within the container object (including defining the parent window for the desk band object's window). In this embodiment, the desk band object informs the container object when it wishes to change size, show/hide itself or other bands, trigger a chevron pop-up menu, and more. In still even another of these embodiments, an interface such as IPersistStream is used for persisting a desk band, and the implementation may be empty if no persistence is required. In yet another of these embodiments, an interface such as IInputObject is used to handle focus change notifications and to translate accelerator keys. In other embodiments, a desk band object implements an interface IInputObject to accept user input and IContextMenu in order to provide a context menu.

In one embodiment, the desk band object requests an identification of a parent window. In another embodiment, the desk band object receives the identification from a container object. In still another embodiment, the desk band object displays, in the identified parent window, output data generated by an execution of a resource with which the desk band object is associated. In still even another embodiment, the desk band object displays, in the identified parent window, a child window displaying output data generated by an execution of a resource with which the desk band object is associated. In yet another embodiment, the desk band object communicates with its container object, its site, and a shell to direct the display of data, including modifications to displayed data, such as changes to display parameters, window focus, and accelerators.

In some embodiments, and by way of example, a toolbar associated with a WINDOWS MEDIA player is hosted as follows, where window captions are enclosed in double quotes and window classnames are unquoted (similar to Microsoft Spy++), dimensions are shown in [square brackets] and indentation is used to show parent-child relationships:

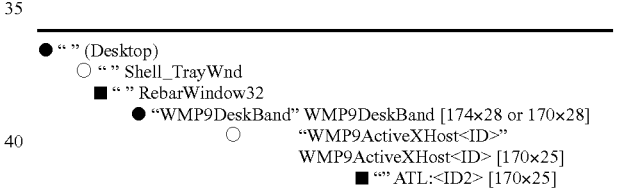

where the <ID> and <ID2> are dynamic hexadecimal IDs that change from invocation to invocation and where the WMP9DeskBand is a desk band root window, created whenever the WMP toolbar is enabled, hidden when WMP is restored to normal windowed modes, and shown when the mini-player toolbar is shown.

In one of these embodiments, a media info window is a top level window:

where the <ID> and <ID2> are dynamic hexadecimal IDs that change from invocation to invocation. In another of these embodiments, the media info window is created the first time it is required and hidden/shown on demand thereafter. In still another of these embodiments, the media info window is destroyed when WMP is restored (and the desk band window is hidden). In still even another of these embodiments, when the media info window is visible, it is dynamically anchored either above or below the mini-player toolbar (for horizontally oriented taskbars) or to one side of the mini-player toolbar (for vertically oriented taskbars), even if the task bar slides in/out of view. In yet another of these embodiments, clicking on the main area of the media info window replaces it with the visualization and video window.

In one embodiment, a visualization and video window has substantially the same high level structure as the media info window described above. In another embodiment, the visualization and video window has a different size from the media info window described above. In still another embodiment, the visualization and video window is created on demand, hidden/shown thereafter as needed and destroyed when the media player resource is restored. In still even another embodiment, the visualization and video window is dynamically anchored to the mini-player toolbar when visible. In yet another embodiment, the visualization and video window has additional child windows as follows:

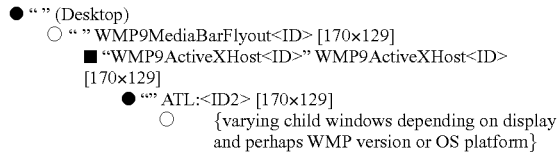

where the <ID> and <ID2> are dynamic hexadecimal IDs that change from invocation to invocation and where the additional child windows depend on the current display (e.g. visualization or video). In some embodiments, a media info window can be distinguished from a visualization and video window by their differing sizes.

In some embodiments, a desk band 1508 implements a COM interface IObjectWithSite through which the container can pass the IUnknown pointer for the site object. In one of these embodiments, the container may pass new site pointers at any time and the desk band 1508 handles updated site information upon receipt. In another of these embodiments, when a new site is passed, a desk band object implementation of the desk band 1508 calls a function such as IOleWindow::GetWindow( ) on the new site to obtain and store a handle for a parent window. In still another of these embodiments, the desk band object may create the desk band object's window as child of the identified parent window. In still another of these embodiments, in which the desk band 1508 implements an interface such as IInputObject, the desk band object may retrieve and save a site interface such as IInputObjectSite.

In some embodiments, the methods and systems described herein provide mechanisms for integrating a toolbar, such as a mini-player toolbar, desk band toolbar, and other types of toolbars. In one of these embodiments, for example, a mechanism is provided for displaying a proxy toolbar on the desktop environment displayed on the remote machine and redirecting user interface interactions with the proxy toolbar to the toolbar on the local machine. In another of these embodiments, a mechanism is provided for transmitting toolbar graphical data from the local machine to the remote machine for display on the remote machine, and redirecting user interface interactions from the remote machine back to the corresponding toolbar on the local machine. In still another of these embodiments, a mechanism is provided for re-parenting a window displaying a toolbar window on a desktop environment provided by a local machine. In yet another of these embodiments, a mechanism is provided for proxying the container site-desk band interaction between the local machine and the remote machine 106.

Referring now to FIG. 16, a flow diagram depicts one embodiment of a method for providing, by a remote machine, access to a desk band associated with a resource executing on a local machine. In brief overview, the method includes receiving, by a first agent 602 executing on a remote machine 106, an identification of a desk band 1508 associated with a resource 220 provided by a local machine 102 (block 1610). The method includes maintaining, by the first agent 602, in communication with a shell 1106 executing on the remote machine 106, a taskbar window 1502 in a desktop environment 204 on the remote machine 106, the taskbar window 1502 including at least one window 1510a associated with a resource 215 provided by the remote machine 106 and including a window region 1508' representing the desk band 1508 by using graphical data stored on the remote machine 106 (block 1620). The method includes transmitting, by the first agent 602, to a second agent 614 executing on the local machine 102, window attribute data and output data associated with the taskbar window 1502 in the desktop environment 204 on the remote machine 106 (block 1630). The method includes displaying, by the second agent 614 executing on the local machine 102, at least a portion of the received output data in a local window 1502' on a desktop environment 1104 on the local machine 102 (block 1640).

Referring now to FIG. 16, and in greater detail, a first agent 602 executing on a remote machine 106 receives an identification of a desk band 1508 associated with a resource 220 provided by a local machine 102 (block 1610). In one embodiment, the first agent 602 receives the identification of the desk band 1508 from the second agent executing on the local machine 102. In another embodiment, the second agent 614 transmits graphical data associated with the desk band to the first agent 602. In still another embodiment, the local agent 614 captures, periodically, a snapshot of graphical data displayed by the desk band object. In still another embodiment, the local agent 614 transmits graphical data associated with the desk band to the remote agent 602 according to a presentation layer protocol.

The first agent 602 maintains a taskbar window 1502 in a desktop environment 204 on the remote machine 106, the taskbar window including at least one window 1510a associated with a resource 215 provided by the remote machine 106 and including a window region 1508' representing the desk band 1508 by using graphical data stored on the remote machine 106 (block 1620). In some embodiments, the first agent 602 maintains a taskbar window 1502 in a desktop environment 204 on the remote machine 106, the taskbar window 1502 including at least one window 1510a associated with a resource 215 provided by the remote machine 106 and including a window region representing the desk band 1508 on the local machine 102 by using graphical data received from the local machine 102.

In one embodiment, a display of a local taskbar on a local machine 102 is obscured by a display of a full-screen integrated desktop received from the remote machine 106. In another embodiment, a taskbar window 1502 maintained on the remote machine 106 and displayed in the full-screen integrated desktop is modified to provide space to show the toolbar when required, and functionality is provided to ensure that various other user interface features work.

In some embodiments, the taskbars on both the remote machine 106 and the local machine 102 have the same orientation. In one of these embodiments, where the taskbars are both horizontal, the remote agent 602 directs a display of at least one new row on the taskbar on the remote machine 106. In another of these embodiments, the remote agent 602 anchors a proxy taskbar window representing a taskbar window maintained on the local machine 102 to the at least one new row in the desktop environment maintained on the remote machine. In other embodiments, the taskbars on both the remote machine 106 and the local machine 102 have different orientations; for example, the remote machine 106 may display a vertical taskbar and the local machine 102 displays a horizontal taskbar. In one of these embodiments, taskbar orientations need not be synchronized, as a proxy desk band handler can specify the orientation required by the remote machine 106, even if that differs from the taskbar orientation of a taskbar on the local machine 102. In still other embodiments, if a toolbar on the local machine is hidden, the window region 1508' representing the desk band 1508 on the remote machine is also hidden, thus increasing available space on the taskbar. In further embodiments, if a toolbar on the local machine is visible, the window region 1508' representing the desk band 1508 on the remote machine is also visible.

In one embodiment, where the remote desktop taskbar orientation changes, the window size of the local desk band 1508 and the location relative to the parent window change to match the location and size of the updated representation of window region 1508'. In another embodiment, the local agent 614 changes an orientation of a local taskbar window 1502 to match that of the taskbar window maintained on the remote machine 106. In still another embodiment, the change of the taskbar on the local machine 102 triggers a change in the orientation of the toolbar user interface 1508 to conform to that of the window region 1508'.

The first agent 602 transmits, to a second agent 614 executing on the local machine 102, window attribute data and output data associated with the taskbar window 1502 in the desktop environment 204 on the remote machine 106 (block 1630). In one embodiment, the first agent 602 transmits the output data to the second agent 614 according to a presentation layer protocol, such as ICA, RDP, or any of the protocols described above in connection with FIGS. 1A-1C. In some embodiments, a window attribute data may relate to an ancestor or parent window of taskbar window 1502.

In some embodiments, the remote agent 602 receives a notification of a transition between a hidden desk band and a visible desk band on the local machine 102 and automates the same transition for a window region 1508' on the remote desktop. In one of these embodiments, the local agent 614 notifies the remote agent 602. In another of these embodiments, the local agent 614 detects a transition using a MICROSOFT Active Accessibility hook. In still another of these embodiments, a component (such as the local agent 614 or the remote agent 602) monitors for a top-level window state transition and/or the appearance or disappearance of a desk band object in the shell; for example, the component may monitor for top-level WMP window state transitions (class "WMPlayerApp") and/or the appearance/disappearance of the WMP9DeskBand under Shell_TrayWnd. In yet another of these embodiments, for generic desk bands, the system may include a component monitoring for desk band windows under Shell_TrayWnd's RebarWindow32.

The second agent 614 executing on the local machine 102 displays at least a portion of the received output data in a local window 1502' on a desktop environment 1104 on the local machine 102 (block 1640). In one embodiment, the second agent 614 displays, in a taskbar window 1502' on a desktop environment 1104 on the local machine 102, at least a portion of the received output data.

In one embodiment, the local agent 614 receives coordinates that define an apparent location of a window region 1508' representing desk band 1508 on the taskbar window 1502 in the desktop environment maintained on the remote machine 106. In another embodiment, the local agent 614 uses graphical indicators displayed in the window region 1508', and transmitted as part of the output data sent by the remote agent 602, to detect the location of the presentation of window region 1508' within the local display of the remotely-maintained desktop environment. In still another embodiment, the local agent 614 uses the received coordinates to identify a location within a local display of the remotely-maintained desktop environment. In still another embodiment, the local agent 614 uses the identified location in directing a display of the local toolbar such that the toolbar display overlays the presentation of the window region 1508'. In still even another embodiment, the local agent 614 dynamically monitors local windows to identify a change to a toolbar window or a window associated with the toolbar window, such as a fly-out window; for example, the local agent 614 may determine when a user has minimized a resource 220 to, or restored from, a toolbar mode. In yet another embodiment, the local agent 614 notifies the remote agent 602 when the local agent 614 detects a change to window attribute data—including a visual state—of the toolbar.

In one embodiment, an operating system provides an interface that may be called to enable a toolbar. In another embodiment, enabling the toolbar need only be done once to enable a proxy desk band; thereafter, automation can be achieved by having the desk band ask its container control to show or hide itself. In still another embodiment, one may automate a remote desktop taskbar's context menu. In yet another embodiment, automation can be achieved via the keyboard, as there are hotkeys to set focus to a system tray and to invoke its context menu from which the Toolbars submenu is accessed. In some embodiments, the AutoHotKey program may be used to perform context menu automation. In one of these embodiments, an AutoHotKey script (including compiled versions for those without AutoHotKey) provides several working methods to toggle a toolbar. In other embodiments, a hot key command—a particular keystroke combination, for example—is intercepted by the local agent 614. In one of these embodiments, a user interaction with a keyboard—for example, striking a particular combination of keys—is detected and sent, from the remote agent 602 to the local agent 614. In another of these embodiments, the local agent 614 then displays the local taskbar context menu. In some embodiments, a user may still desire functionality for enabling and disabling a toolbar while interacting with a local display of a remotely-maintained desktop environment. In one of these embodiments, a user may enable or disable a toolbar on the local machine via a taskbar context menu integrated into a remotely-maintained desktop environment.

In one embodiment, an interaction between a container site and a desk band 1508 hosting a toolbar is redirected to the local agent 614 for processing. In another embodiment, the system provides functionality supporting container-desk band collaboration, including dynamically changing display info and collaborative focus/accelerator handling.

In some embodiments, the first agent 602 receives a request for execution of a command associated with a user interface element displayed by the desk band 1508 associated with the resource 220 provided by a local machine 102. In one of these embodiments, a desk band 1508 provides access to functionality provided by the resource 220 executing on the local machine 102 and the request for execution of the command is a request to execute the provided functionality. In another of these embodiments, where the resource 220 is a multimedia application, the desk band 1508 may provide functionality for, without limitation, stopping, playing, pausing, or muting, a display of audio or visual media, for restoring a display of the resource 220 itself, for modifying a level of volume of an audio track, and for showing a visualization associated with the media. In still another of these embodiments, the first agent 602 redirects the request to the second agent 614 on the local machine. In still even another of these embodiments, the second agent 614 transmits the request received from the first agent to the resource executing on the local machine. In another one of these embodiments, the first agent 602 intercepts a user interaction with the window region 1508'. In still another of these embodiments, the second agent 614 intercepts a user interaction with the window region 1508'. In one of these embodiments, the second agent 614 redirects the user interaction to the desk band 1508 associated with the resource 220 provided by the local machine 102. In yet another of these embodiments, the local resource 220 directs the display, on the desktop environment 1104 on the local machine 102, of output data generated in response to receiving the request. In some embodiments, the first agent 602 transmits to the second agent 614, a z-order entry for the task bar window 1502.

In one embodiment, a proxy toolbar window is displayed in a window region 1508' on the desktop environment maintained on the remote machine. In another embodiment, the proxy toolbar redirects user interface interactions with the proxy toolbar to the toolbar on the local machine.

In one embodiment, a proxy desk band object (not shown) on the remote machine 106 adds an entry to a taskbar window context menu (to allow itself to be enabled or disabled). In another embodiment, this entry has text (e.g. "WINDOWS MEDIA Player on client" or "<desk band name> on client") associated with the resource 220 and displayed to a user. In still another embodiment, the proxy desk band object redirects the setting to the local machine 102.

In some embodiments, the first agent 602 receives a request for display of additional data associated with the resource 220 provided by the local machine 102. In one of these embodiments, a user of the local machine 102 uses a pointing device, such as a mouse, to initiate the display of a local window 1502' associated with the desk band, such as a pop-up window, the local window 1502' displaying additional details associated with the functionality of the resource 220 provided by the local machine 102. In another of these embodiments, the local window 1502' associated with the desk band 1508 displays a user interface for requesting access to functionality provided by the resource 220 executing on the local machine 102. In still another of these embodiments, the local window 1502' is anchored to the local representation of the remote taskbar 1502 in which the desk band 1508 is displayed. In still even another of these embodiments, the first agent 602 generates the requested display. In yet another of these embodiments, the first agent 602 transmits the request to the second agent 614 executing on the local machine 102 and the second agent 614 directs the display.

In some embodiments, the system emulates the look and feel of a toolbar. In one of these embodiments, the remote agent 602 creates a proxy toolbar window, and graphical data associated with the desk band 1508 is shown on the taskbar window 1502 in the desktop environment 204 maintained on the remote machine 106. In another of these embodiments, when a corresponding toolbar window 1508 appears on a taskbar window 1502 of the local machine 102, the remote agent 602 displays the proxy toolbar window on the desktop environment 204 on the remote machine 106. In still another of these embodiments, the remote agent 602 provides access to individual controls associated with the desk band 1508, just as the desk band 1508 on the local machine 102 does. In still even another of these embodiments, the remote agent 602 changes a vertical-horizontal orientation of the displayed proxy toolbar window to synchronize the display of the proxy toolbar window with a display of the toolbar window on the local machine. In yet another of these embodiments, the remote agent 602 changes a vertical-horizontal orientation of the displayed proxy toolbar window without synchronizing the display of the proxy toolbar window with that of the displayed window on the local machine 102.

In one embodiment, user interactions with the proxy toolbar window are redirected to the local machine 102 to automate the toolbar 1508 on the local machine 102. In another embodiment, MICROSOFT Active Accessibility is used to automate the toolbar 1508 on the local machine 102, and each control on the toolbar 1508 on the local machine 102 is accessible. In still another embodiment, the local agent 614 emulates mouse clicks at the same point relative to the toolbar 1508 on local machine 102 as was clicked relative to the proxy toolbar window on remote machine 106.

In some embodiments, the remote agent 602 and the local agent 614 integrate a display of a dynamically-generated window associated with an integrated toolbar (for example, a "fly-out" window). In one of these embodiments, the remote agent 602 monitors a window region displaying a toolbar, on at least one of the local machine 102 and the remote machine 106. In another of these embodiments, the local agent 614 monitors a window region displaying a toolbar, on at least one of the local machine 102 and the remote machine 106. In still another of these embodiments, when a user interacts with the display of the integrated toolbar to request a display of data in a dynamically-generated window, such as a fly-out window, the remote agent 602 directs the creation of a new window. In still even another of these embodiments, when a user interacts with the display of the integrated toolbar to request a display of data in a dynamically-generated window, such as a fly-out window, the local agent 614 directs the creation of a new window. In yet another embodiment, at least one of the remote agent 602 and the local agent 614 maintain a dynamically-generated window; for example, an agent may modify or remove the dynamically-generated window.

In one embodiment, a local agent 614 integrating a toolbar 1508 associated with a resource provided by the local machine 102 into a display of a desktop environment 204 maintained by the remote machine 106 modifies the form, or the apparent form, of the toolbar 1508 during integration. In another embodiment, the local agent 614 detects that a display of a toolbar window on the local machine 102 is obscured by a display of a full-screen desktop environment maintained by the remote machine 106. In still another embodiment, the local agent 614 displays the toolbar window as floating on the display of the desktop environment on the local machine 102, instead of displaying the toolbar window as integrated into a local taskbar window; for example, the local agent 614 may automate a user interface, use window messages, or use programmatic means to reposition the toolbar window. In still even another embodiment, the local agent 614 integrates a floating toolbar as described herein, in connection with integration of taskbar-bound toolbars. In yet another embodiment, the local agent 614 does not re-parent any windows, instead relying on the toolbar having an "always on top" setting and dynamically anchoring the floating toolbar to the current location of the taskbar's reserved space.

In one embodiment, when using a remote full-screen desktop, a user may want to use multiple languages or multiple keyboards (or at least keyboard layouts), and to switch between them on demand. In another embodiment, an operating system provides a desk band for assisting a user in handling these configuration settings. In still another embodiment, for example, when keyboards are connected to the local machine 102, should the user wish to use a different keyboard layout (and/or different language), then the local machine 102 may be a preferable place to manage those settings rather than the remote machine 106. In still even another embodiment, for example, a MICROSOFT Language Bar, which may be a toolbar in the taskbar, assists with handling at least one of these configuration settings for WINDOWS. In yet another embodiment, a language bar toolbar is a top level window and can be moved anywhere on the desktop rather than being bound to the taskbar. In some embodiments, a user activates a language bar toolbar. In one of these embodiments, the methods and systems described herein in connection with desk band integration provide functionality for integrating all types of toolbars, including language bar toolbars.

In some embodiments, a user interacting with a local display of an integrated desktop environment may access functionality associated with a global restore-from-toolbar hotkey (ALT+SHIFT+P). In one of these embodiments, a local agent 614 detecting the user interaction (for example, identifying that the user has pressed a combination of keys on the keyboard) does not transmit an identification of the detected user interaction to the remote machine 106, sending it instead to the resource 220. In another of these embodiments, the local agent 614 leverages code that determines whether to pass identifications of certain interaction to the remote machine 106 or to process the interaction on the local machine 102. In other embodiments, a modification to the remote agent 602 provides a user with access to the functionality associated with a global restore-from-toolbar hotkey. In still other embodiments, a hooking component intercepts a global keyboard interaction with the remote machine 106 and sends an identification of the keystroke back to the local agent 614 for processing.

In some embodiments, the methods and systems described above take a client-side toolbar (or the entire taskbar) and create the appearance of a floating toolbar on the desktop environment maintained on the remote machine 106 by creating the appearance of graphics anchored to a window region other than that containing the remote display of a taskbar window. In other embodiments, the methods and systems described above provide functionality for displaying toolbars and window maintained on the local machine as "always-on-top" fly-out windows or floating toolbars integrated into the local display of the remotely-maintained desktop environment.

In one embodiment, the methods and systems described above in connection with desk band toolbars associated with resources on a local machine 102 and integrated into remotely-maintained desktop environments also apply to keyboard-related toolbars. In another embodiment, a method and system for integration of a toolbar (such as a keyboard-related toolbar, or a client-side mouse control toolbar, or a Tablet PC Input toolbar) causes a graphical data associated with a toolbar maintained on the local machine 102 to display at a window region that would otherwise display a local representation of a remotely-maintained taskbar.

Figure 17:
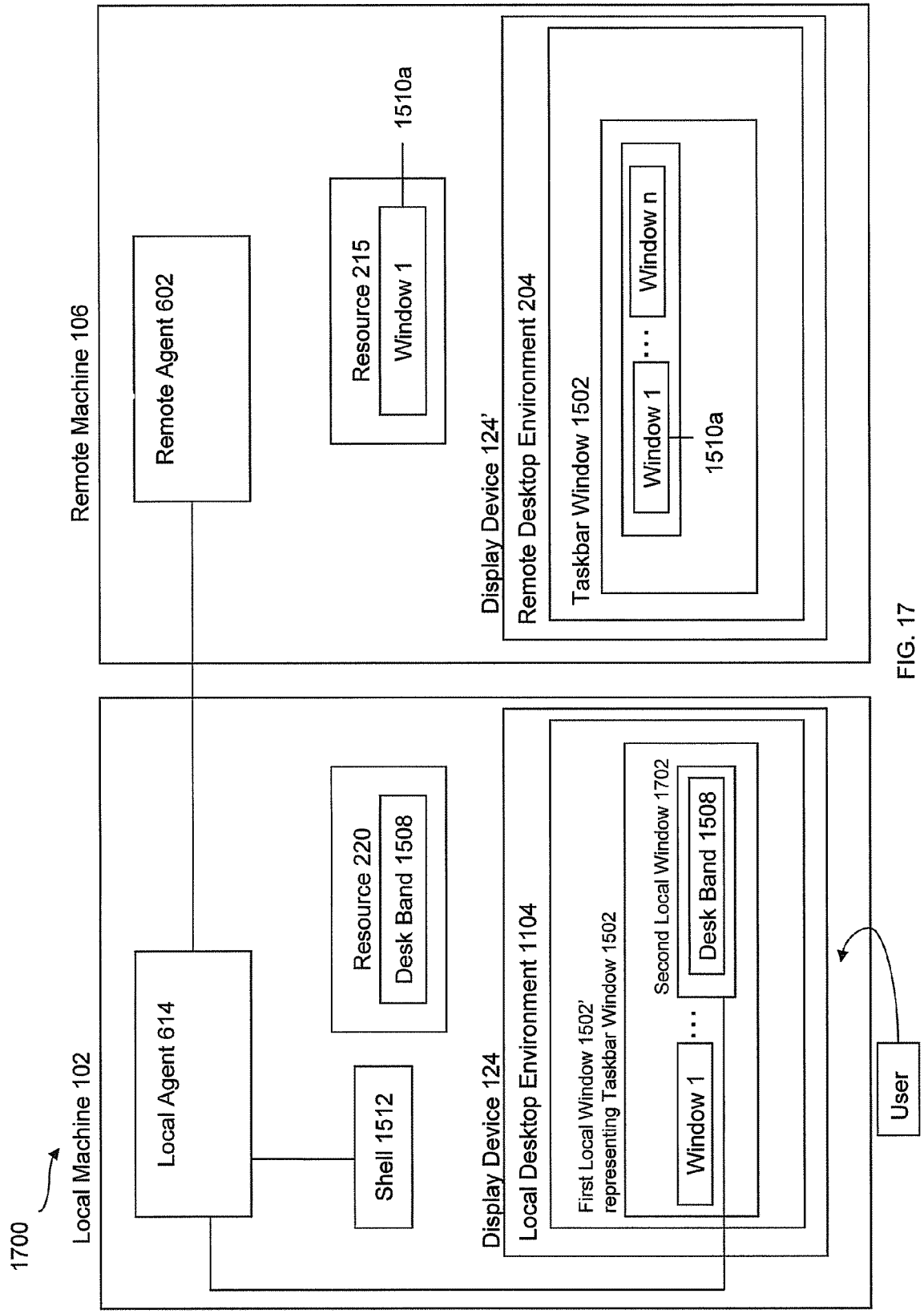
FIG. 17 is a block diagram depicting an embodiment of a system for providing, by a remote machine, access to a desk band associated with a resource executing on a local machine.

Referring now to FIG. 17, a block diagram depicts one embodiment of a system for providing, by a remote machine, access to a desk band 1508 associated with a resource 220 executing on a local machine 102. In brief overview, the system 1700 includes a remote machine 106, a taskbar window 1502 maintained by the remote machine 106, a local machine 102, a local agent 614 executing on the local machine 102, a shell 1512 executing on the local machine 102, a resource 220 provided by the local machine 102, and a desk band 1508 associated with the local resource 220.

In some embodiments, a desk band window can be re-parented to a local window displaying the remote full screen desktop. In one of these embodiments, a component on the remote machine 106 can monitor for and communicate updates of a window region 1508' that reserves space on the remote taskbar for a local display of a desk band on the local machine. In another of these embodiments, a component on the local machine 102 receives at least one such update. In still another of these embodiments, the component on the local machine 102 moves a re-parented desk band window 1508 so that it is drawn over top of an image of the window region 1508'. In yet another of these embodiments, the component on the local machine 102 directs a display of the image of the desk band graphics over the top of the image of the window region 1508'.

Referring now to FIG. 17, and in greater detail, a local agent 614 executing on a local machine 102 includes a receiver receiving window attribute data associated with a taskbar window 1502 maintained by a remote machine 106. The local agent 614 displays a first local window 1502' representing the taskbar window 1502 maintained on the remote machine 106, responsive to the received window attribute data. In some embodiments, the receiver receives output data representing a window 1510a associated with a resource 215 provided by the remote machine 106 and displayed in a taskbar window 1502 on the remote machine 106. In one of these embodiments, the local agent 614 further displays the output data representing the window 1510a associated with the remote resource 215 in a local taskbar window displaying 1502' displaying at least one desk band 1508 associated with a resource 220 provided by the local machine 102. In another embodiment, the desk band 1508 displays, in a window region identified by the received window attribute data, output data generated by an execution of the resource 220 provided by the local machine 102.

In one embodiment, the remote agent 602 generates a window region 1508' by creating a proxy toolbar or desk band in the taskbar window 1502. In another embodiment, the remote agent 602 generates a window region 1508' by resizing another window inside the taskbar window 1502. In still another embodiment, the remote gent 602 generates a window region 1508' by adding a child window to a toolbar control window in the taskbar and resizing the child control or window.

Referring now to FIG. 18, a flow diagram depicts one embodiment of a method for providing, by a remote machine, access to a desk band 1508 associated with a resource 220 executing on a local machine 102. In brief overview, the method includes receiving, by a local agent 614 executing on a local machine 102, window attribute data associated with a taskbar window 1502 maintained by a remote machine 106 (block 1810). The local agent 614 displays, to a user of the local machine 102, a first local window 1502' representing the taskbar window 1502 maintained on the remote machine 106, responsive to the received window attribute data (block 1820). The local agent 614 re-parents a second local window 1702 displaying a desk band 1508 associated with a resource 220 provided by the local machine 102, to the first local window 1502' representing the taskbar window 1502 maintained on the remote machine 106 (block 1830).

In some embodiments, a desk band window 1508 can be re-parented to a local window displaying the remote full screen desktop. In one of these embodiments, a component on the remote machine 106 can monitor for and communicate updates of the screen location of a window region 1508' that reserves space on the remote taskbar for a local display of a desk band on the local machine. In another of these embodiments, a component on the local machine 102 receives at least one such update. In still another of these embodiments, the component on the local machine 102 moves a re-parented desk band window so that it is drawn over top of an image of the window region 1508'. In yet another of these embodiments, the component on the local machine 102 directs a display of the image of the desk band graphics over the top of the image of the window region 1508'.

In one embodiment, a local agent 614 uses an aspect of window re-parenting that displays the toolbar graphics over the top of the window region 1508'. In this embodiment, the toolbar is a top-level window and is relocated periodically (for example, every 20 ms or every time the proxy band location changes) and kept above the window displaying the window region 1508' in a z-order list. In some embodiments, this functionality is provided for either the actual toolbar on the local machine or to the corresponding proxy window on the remote machine. In one of these embodiments, the corresponding proxy window is displayed as a top-level window, even if the actual toolbar window is not a top-level window. In another of these embodiments, the toolbar window is kept above the proxy band display in the z-order on the remote machine 106. In still another of these embodiments, the corresponding proxy window is kept above the proxy on the remote machine 106.

Referring now to FIG. 18, and in greater detail, a local agent 614 executing on a local machine 102 receives window attribute data associated with a taskbar window 1502 maintained by a remote machine 106 (block 1810). In one embodiment, the received window attribute data includes an identification of a window region on the taskbar window 1502 reserved for a display, by the remote machine 106, of the desk band 1508. The local agent 614 displays, to a user of the local machine 102, a first local window 1502' representing the taskbar window 1502 maintained on the remote machine 106, responsive to the received window attribute data (block 1820). In some embodiments, the local agent 614 further receives output data representing a window 1510a associated with a resource 215 provided by the remote machine 106 and displayed in a taskbar window 1502 on the remote machine 106. In one such embodiment, output data may include any human perceptible data (e.g., graphical data, audio data, etc.). In yet another such embodiment, output data may be generated by execution of the local resource 215. In one of these embodiments, the local agent 614 may display the received output data in a local taskbar window also displaying at least one desk band 1508 associated with a resource 220 provided by the local machine 102. In some embodiments, the second local window 1702 is the local taskbar window.

The local agent 614 re-parents a second local window 1702 displaying a desk band 1508 associated with a resource 220 provided by the local machine 102, to the first local window 1502' representing the taskbar window 1502 maintained on the remote machine 106 (block 1830). In one embodiment, output data is generated by an execution of the local resource 220. In such an embodiment, the desk band 1508 displays, in the second local window 1702, the generated output data. In another embodiment, the local agent 614 on the local machine 102 to paint an image of a local toolbar at a location identified by the window attribute data identifying the window region 1508'. In yet another embodiment, the local agent 614 directs a display of the second local window 1702 displaying a desk band 1508 associated with the local resource 220, the second local window 1702 displayed at a window region identified responsive to the received window attribute data.

In some embodiments, a method for toolbar window re-parenting is provided. In one of these embodiments, no graphics or user input redirection are necessary, as all graphics are painted on the local machine 102 by the resource 220 and relevant user interactions are sent directly to the resource 220. In one of these embodiments, re-parenting eliminates a round trip for toolbar graphics in which the local agent 614 transmits the graphical data to the remote agent 602, which later sends the graphical data to the local agent 614 with window attribute data and output data associated with the integrated desktop environment. In another of these embodiments, toolbar graphics captured on the client are applied directly to a local display 1502' of the taskbar window maintained by the remote machine 106. In still another of these embodiments, for example, the local agent 614 displays the taskbar window including a window region 1508' and painting over the display an image of the local desk band 1508.

In one embodiment, the local agent 614 identifies a child window that provides a display of a toolbar associated with a resource 220 on the local machine 102. In another embodiment, the local agent 614 changes a parent window and location of the child window to a window displaying locally the taskbar window maintained by the remote machine 106. In still another embodiment, the local agent 614 dynamically changes a location of the child window so that it lies over the top of the representation of the corresponding window region 1508'. In still even another embodiment, the local agent 614 uses an identification of a window region 1508' received from the remote agent 602 to change the location of the child window. In yet another embodiment, re-parenting the child window to the local representation of the remote taskbar 1502' displays an integrated taskbar to a user.

In one embodiment, the local agent 614 re-parents the child window 1508 to a top-level window generated or maintained on the local machine 102. In another embodiment, the top-level window is then positioned over the top of the local representation of 1508'. In still another embodiment, the local agent 614 re-parents the child window 1508 so that it is a top-level window that may be positioned over the top of the local representation of 1508'. In yet another embodiment, the local agent 614 paints the image of the child window 1508 over the top of the local representation of desk band 1508'.

In some embodiments, a user manually re-parents a window on a local machine to a window displaying locally a remotely-maintained desktop environment. In other embodiments, a display of the re-parented window is modified. In one of these embodiments, for example, the re-parented window is drawn with a border.

In some embodiments, graphical data may be periodically obtained from a local desk band 1508 by various means (e.g. by screen scraping, directing the window to paint or print itself to an off-screen surface) and then painted at the location occupied by the local representation of the window region 1508'. In one of these embodiments, this mechanism has a substantially similar result as that of transmitting toolbar graphics from a local desk band window to a second local window on the local machine, avoiding a round trip to the server.

In some embodiments, graphical data created on the local machine 102 for the toolbar 1508 on associated with the resource 220 are intercepted and transmitted to the remote machine 106. In one of these embodiments, the remote agent 614 displays the received graphical data displayed in the corresponding window region 1508' on the desktop environment on the remote machine 106. In another of these embodiments, the remote agent 602 directs a display of the received graphical data in a taskbar window in the desktop environment. In still another of these embodiments, the remote agent 602 transmits graphical data for the desktop environment to the local agent 614—including graphical data received from the local agent 614. In yet another of these embodiments, the remote agent 602 handles changes in user interface orientation, providing the local taskbar orientation is synchronized to that of the remote desktop taskbar.

Figure 19:
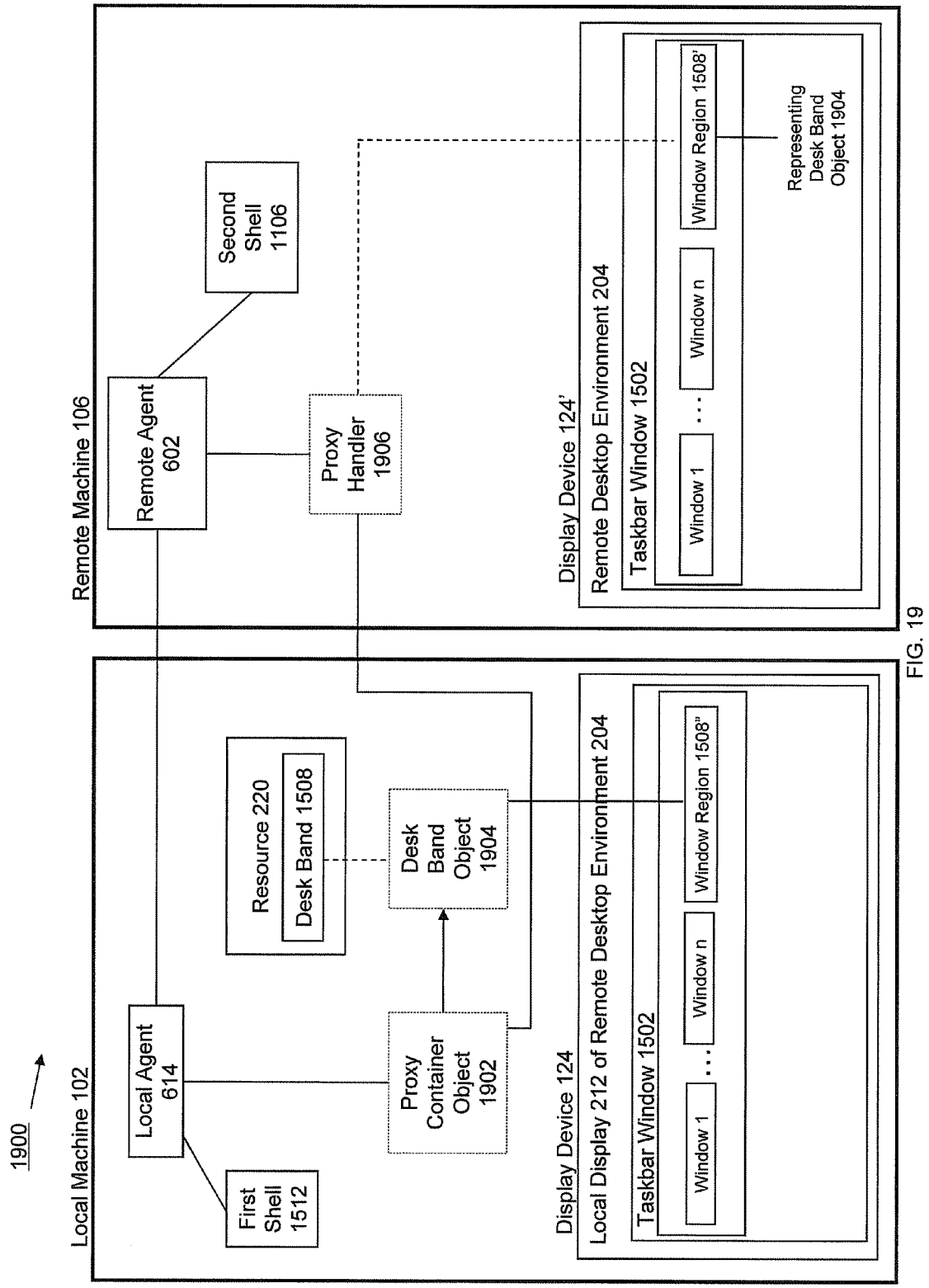
FIG. 19 is a block diagram depicting an embodiment of a system for providing, by a remote machine, access to a desk band associated with a resource executing on a local machine.

Referring now to FIG. 19, a block diagram depicts one embodiment of a system for providing, by a remote machine 106, access to a desk band 1508 associated with a resource 220 executing on a local machine 102. In brief overview, the system 1900 includes a local agent 614 and a local shell 1512 executing on a local machine 102, a resource 220 provided by the local machine 102, a proxy container object 1902 on the local machine 102, a desk band object 1904 associated with the local resource 220, a remote agent 602 executing on a remote machine 106, and a proxy handler 1906 on the remote machine 106.

Referring now to FIG. 19, and in greater detail, a local agent 614, executing on a local machine 102, detects a request by a local shell 1512 for creation of a desk band object 1904 associated with a resource 220 provided by the local machine 102 and instantiates a proxy container object 1902, responsive to detecting the request. In some embodiments, the local agent 614 detects, in communication with a registry on the local machine, the request by the shell 1512 for creation of a desk band object 1904 with a local resource 220.

The proxy container object 1902 instantiates the desk band object 1904 and identifies a window region (e.g., 1508") as a desk band site. In one embodiment, the proxy container object 1902 is a COM object. In some embodiments, the proxy container object 1902 passes the same window region 1508" to the desk band 1508 as its site.

In one embodiment, a proxy container object 1902 acts as a virtual desk band to a container, and as a container for a desk band. In another embodiment, such a proxy container object 1902 implements a different form of re-parenting by dynamically changing the site instead of the parent window. In still another embodiment, for each site change, the desk band object 1904 modifies its display to conform to the new site.

In one embodiment, the proxy container object 1902 is registered on the local machine 102 instead of the desk band object actually associated with the resource 220. In another embodiment, desk band registration information is modified to allow the registration of the proxy container object 1902. In other embodiments, a component on the local machine 102 hooks calls to COM interfaces in the container (in one embodiment, the shell) and redirects requests to create an instance of the desk band COM object to request creation of an instance of the proxy container 1902 instead.

In one embodiment, such a proxy container object 1902 running on the local machine 102 acts as a transparent proxy. In another embodiment, the proxy container object 1902 passes a call from the container to the desk band and passes the desk band calls to the container. In still another embodiment, the proxy container object 1902 does not modify a call before passing it to the desk band from the container. In yet another embodiment, the proxy container object 1902 does not modify a call before passing it to the container from the desk band.

A remote agent 602, executing on a remote machine 106, receives an identification of a desk band object 1904 associated with the local resource 220. The remote agent 602 maintains a window region 1508' in a taskbar 1502 on a desktop environment 204 maintained on the remote machine 106, wherein the window region 1508' represents the identified desk band object 1904. In some embodiments, the proxy container object 1902 includes a translation component translating an identification of a window region 1508' received from the remote agent 602 into an identification of a window region on a display on the local machine 102.

A proxy handler 1906 is instantiated by the remote agent 602 and is associated with the identified desk band object 1904. The proxy handler 1906 transmits, to the proxy container object 1902, an identification of a window region 1508' associated with the identified desk band object 1904. In one embodiment, the proxy container object 1902 uses this information to specify a new, or updated, site to the desk band object 1904.

A desk band object 1904 directs a display of output data in the identified window region in a display 212 on the local machine 102 of the desktop environment 204 maintained on the remote machine.

Figure 20:
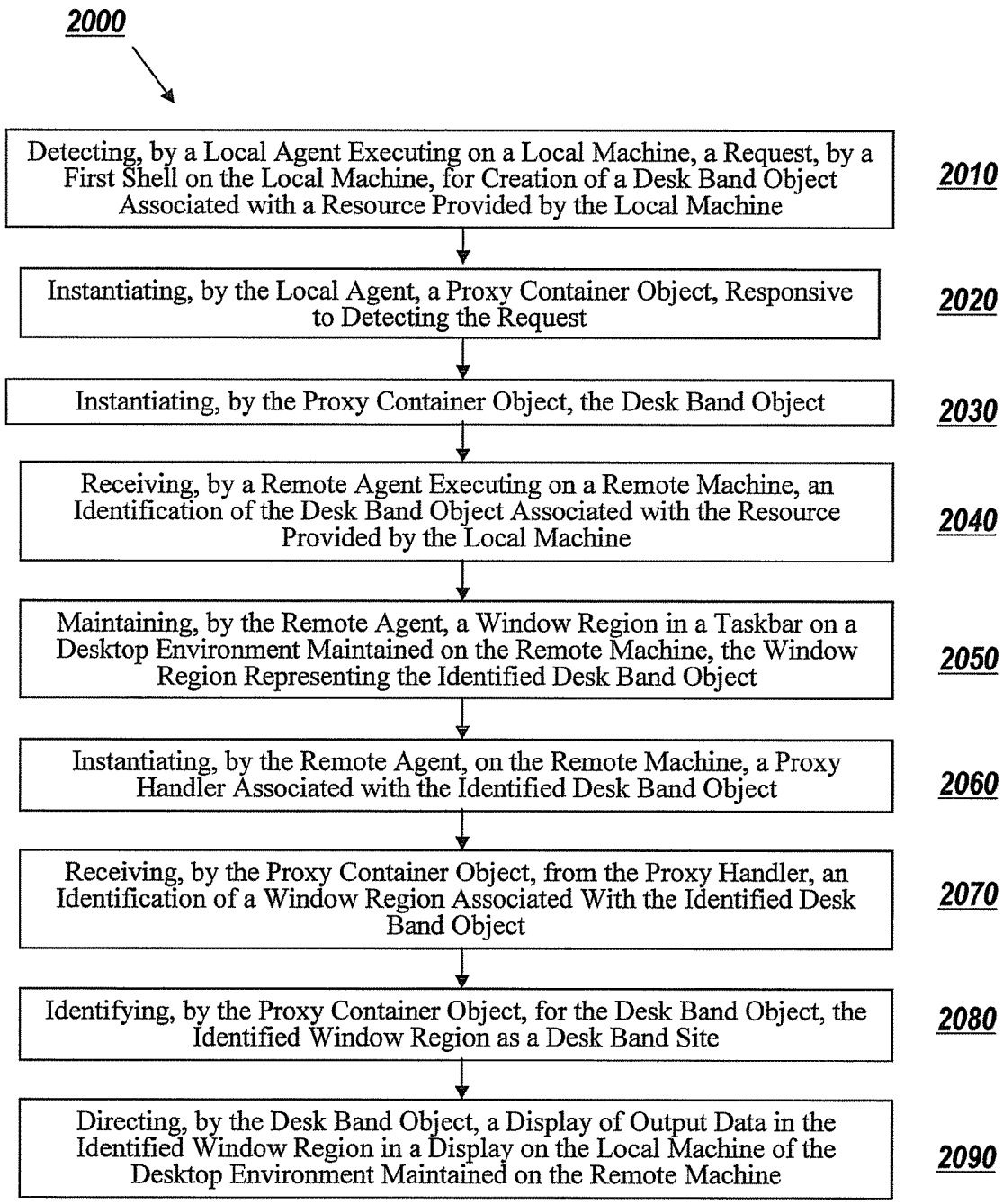
FIG. 20 is a flow diagram depicting an embodiment of a method for providing, by a remote machine, access to a desk band associated with a resource executing on a local machine.

Referring now to FIG. 20, a flow diagram depicts one embodiment of a method 2000 for providing, by a remote machine 106, access to a desk band 1508 associated with a resource 220 executing on a local machine 102. In brief overview, the method includes detecting, by a local agent 614 executing on a local machine 102, a request, by a first shell 1512 on the local machine 102, for creation of a desk band object 1904 associated with a resource 220 provided by the local machine 102 (block 2010). The local agent 614 instantiates a proxy container object 1902, responsive to detecting the request (block 2020). The proxy container object 1902 instantiates the desk band object 1904 (block 2030). A remote agent 602 executing on a remote machine 106 receives an identification of the desk band object 1904 associated with the resource 220 provided by the local machine 102 (block 2040). The remote agent 602 maintains a window region 1508' in a taskbar 1502 on a desktop environment 204 maintained on the remote machine 106, the window region 1508' representing the identified desk band object 1904 (block 2050). The remote agent 602 instantiates a proxy handler 1906 on the remote machine 106, the proxy handler 1906 being associated with the identified desk band object 1904 (block 2060). The proxy container object 1902 receives, from the proxy handler 1906, an identification of a window region 1508' associated with the identified desk band object 1904 (block 2070). The proxy container object 1902 identifies, for the desk band object 1904, the identified window region 1508' as a desk band site (block 2080). The desk band object 1904 directs a display of output data in the identified window region 1508' in a display on the local machine 102 of the desktop environment 204 maintained on the remote machine 106 (block 2090).

Referring now to FIG. 20, and in greater detail, a local agent 614 executing on a local machine 102, detects a request, by a shell 1512 on the local machine 102, for creation of a desk band object 1904 associated with a resource 220 provided by the local machine 102 (block 2010). In one embodiment, the local agent 614, in communication with a registry on the local machine 102, detects a request by the shell 1512 on the local machine 102 for creation of a desk band object 1904 associated with a local resource 220.

The local agent 614 instantiates a proxy container object 1902, responsive to detecting the request (block 2020). The proxy container object 1902 instantiates the desk band object 1904 (block 2030). A remote agent 602 executing on a remote machine 106 receives an identification of the desk band object 1904 associated with the local resource 220 (block 2040). In one embodiment, the remote agent 602 receives the identification of the desk band object 1904 from the local agent 614.

In another embodiment, the remote agent 602 receives the identification of the desk band object 1904 from the proxy container object 1902.

The remote agent 602 maintains a window region 1508' in a taskbar 1502 on a desktop environment 204 maintained on the remote machine 106, the window region 1508' representing the identified desk band object 1904 (block 2050). In one embodiment, the remote agent 602 in communication with a shell 1106 on the remote machine 106 maintains a window region 1508' in a taskbar 1502 on a desktop environment 204 on the remote machine 106, the window region 1508' representing the identified desk band object 1904.

The remote agent 602 instantiates a proxy handler 1906 on the remote machine 106, the proxy handler 1906 being associated with the identified desk band object 1904 (block 2060). In one embodiment, the proxy handler 1906 is provided as part of the remote agent 602. The proxy container object 1902 receives, from the proxy handler 1906, an identification of a window region 1508' associated with the identified desk band object 1904 (block 2070). The proxy container object 1902 identifies, for the desk band object 1904, the identified window region 1508' as a desk band site (block 2080). In one embodiment, the proxy container object 1902 translates an identification of a window region 1508' received from the proxy handler 1906 into an identification of a window region 1508" on a display 124 on the local machine 102.

In some embodiments, the proxy container object 1902 on the local machine 102 is in communication with a proxy desk band handler 1906 on the remote machine 106. In one of these embodiments, the proxy container object 1902 on the local machine 102 redirects calls including site information received from the proxy desk band handler 1906 on the remote machine 106 to the desk band on the local machine 102. In another of these embodiments, the proxy container object 1902 on the local machine 102 translates window attribute data received from the proxy desk band handler 1906 on the remote machine 106 and redirects the translated data to the desk band on the local machine 102; for example, the proxy container object 1902 on the local machine 102 may translate data including, but not limited to, an identification of a parent window and coordinates identifying a window region 1508'. In still another of these embodiments, the proxy container object 1902 on the local machine 102 redirects calls received from the desk band on the local machine 102 to the proxy desk band handler 1906 on the remote machine 106. In still even another of these embodiments, the proxy container object 1902 provides integration between a desk band maintained on the local machine 102 and a taskbar maintained on the remote machine 106. In still even another of these embodiments, the proxy container object 1902 integrates the handling of dynamically changing display information, collaborative focus, and accelerator handling.

The desk band object 1904 directs a display of output data in the identified window region 1508' in a display on the local machine 102 of the desktop environment 204 maintained on the remote machine 106 (block 2090). In one embodiment, the desk band object 1904 directs a display of output data in the identified window region 1508' in a display 212 on the local machine 102 of the desktop environment 204 maintained on the remote machine 106.

Figure 21:
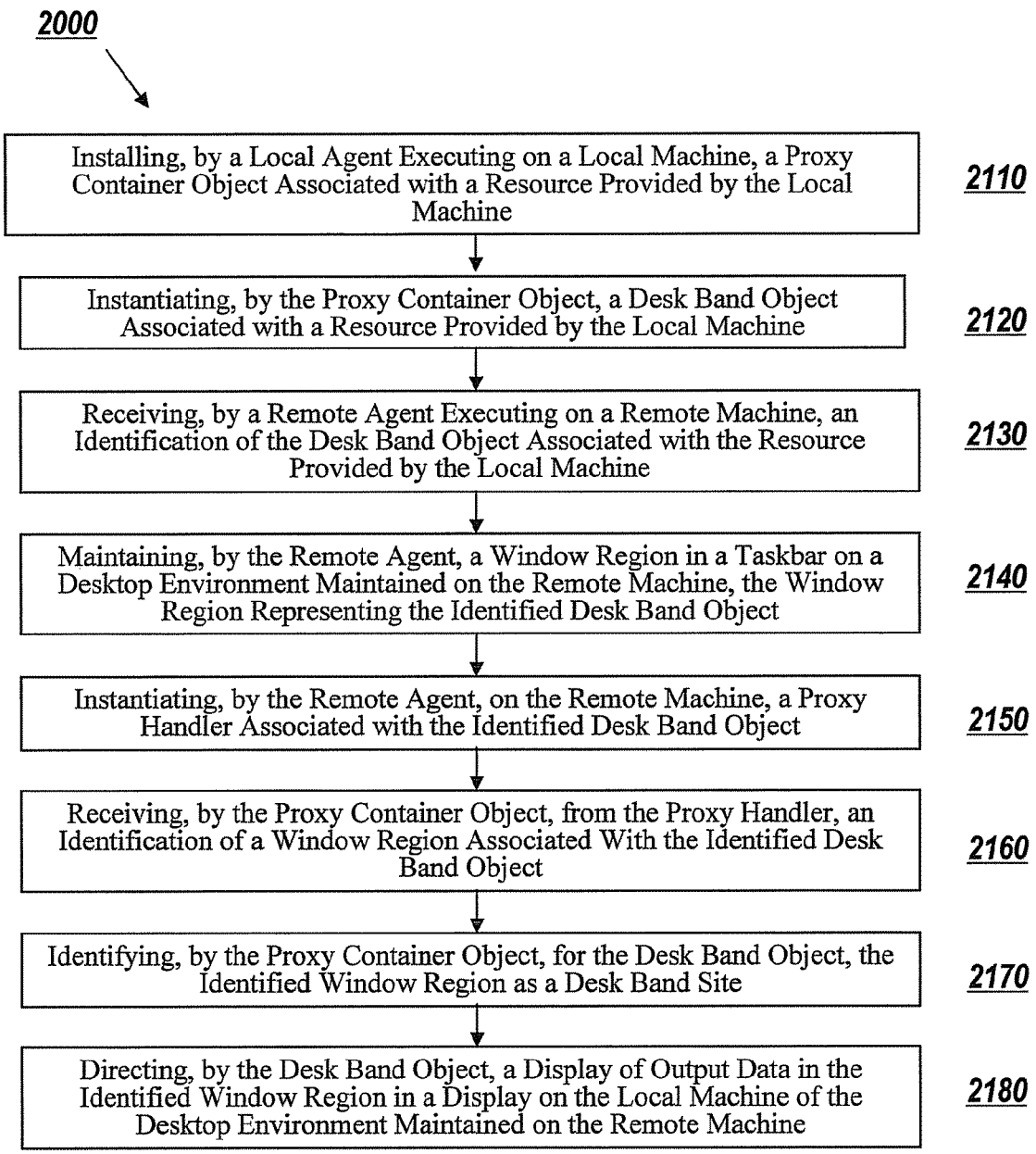
FIG. 21 is a flow diagram depicting an embodiment of a method for providing, by a remote machine, access to a desk band associated with a resource executing on a local machine.

Referring now to FIG. 21, a flow diagram depicts one embodiment of a method 2100 for providing, by a remote machine 106, access to a desk band 1508 associated with a resource 220 executing on a local machine 102. In brief overview, the method 2100 includes installing, by a local agent 614 executing on a local machine 102, a proxy container object 1902 associated with a resource 220 provided by the local machine 102 (block 2110). A remote agent 602 executing on a remote machine 106 receives an identification of the desk band object 1904 associated with the local resource 220 (block 2130). The remote agent 602 maintains a window region 1508' in a taskbar 1502 on a desktop environment 204 maintained on the remote machine 106, the window region 1508' representing the identified desk band object 1904 (block 2140). The remote agent 602 instantiates a proxy handler 1906 on the remote machine 106, the proxy handler 1906 being associated with the identified desk band object 1904 (block 2150). The proxy container object 1902 receives, from the proxy handler 1906, an identification of a window region 1508' associated with the identified desk band object 1904 (block 2160). The proxy container object 1902 identifies, for the desk band object 1904, the identified window region 1508' as a desk band site (block 2170). The desk band object 1904 directs a display of output data in the identified window region 1508' in a display on the local machine 102 of the desktop environment 204 maintained on the remote machine 106 (block 2180).

Referring now to FIG. 21, and in greater detail, in one embodiment, the remote agent 602 receives the identification of the desk band object 1904 from the local agent 614. In another embodiment, the remote agent 602 receives the identification of the desk band object 1904 from the proxy container object 1902. In still another embodiment, the remote agent 602, in communication with a second shell 1106 on the remote machine 106, maintains a window region 1508' in a taskbar 1502 on a desktop environment 204 on the remote machine 106, the window region 1508' representing the identified desk band object 1904. In one embodiment, the proxy container object 1902 translates an identification of a window region 1508' received from the proxy handler 1906 into an identification of a window region 1508" on a display 124 on the local machine 102. The desk band object 1904 directs a display of output data in the identified window region 1508' in a display on the local machine 102 of the desktop environment 204 maintained on the remote machine 106 (block 2180). In one embodiment, the desk band object 1904 directs a display of output data in the identified window region 1508' in a display 212 on the local machine 102 of the desktop environment 204 maintained on the remote machine 106.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for providing, by a remote machine, access to functionality associated with a resource executing on a local machine, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. In a networked computing system, a method for providing, by a remote machine, access to functionality associated with a resource executing on a local machine, the method comprising:

(a) receiving, by a remote agent executing on a remote machine, an identification of a shell extension associated with a resource provided by a local machine, the shell extension to be integrated into a desktop environment of the remote machine;

(b) installing, by the remote agent, a proxy handler on the remote machine, the proxy handler associated with the identified shell extension and integrating the identified shell extension of the local machine into the desktop environment of the remote machine;

(c) receiving, by the proxy handler, a request for access to the shell extension via the desktop environment of the remote machine; and (d) redirecting, by the proxy handler, the request to a shell extension invoker executing on the local machine.

2. The method of claim 1 further comprising:

(e) receiving, by the proxy handler, a result of executing the shell extension on the local machine.

3. The method of claim 1, wherein step (c) further comprises receiving, by the proxy handler from a shell, the request for access to the shell extension.

4. The method of claim 1, wherein step (b) comprises intercepting a request for an identification of a handler.

5. The method of claim 4 further comprising responding to the request with an identification of the proxy handler associated with the identified shell extension.

6. The method of claim 1 further comprising requesting, by a user of a remote desktop environment, access to the shell extension.

7. The method of claim 1 further comprising displaying, in a desktop environment generated by the remote machine, a received result of executing the shell extension on the local machine.

8. The method of claim 1 further comprising transmitting, by the proxy handler to the shell extension invoker, data associated with the request.

9. The method of claim 1 further comprising registering, by the remote agent, the proxy handler with a registry on the remote machine.

10. The method of claim 1 further comprising identifying, by a local agent executing on the local machine, the shell extension associated with the resource provided by the local machine, wherein the shell extension is to be integrated into a desktop environment of the remote machine.

11. The method of claim 10 further comprising publishing, by the local agent, the identified shell extension.

12. A networked computing system for providing, by a remote machine, access to functionality associated with a resource executing on a local machine, the system comprising:

a remote agent executing on a remote machine and receiving an identification of a shell extension associated with a resource provided by a local machine, the shell extension to be integrated into a desktop environment of the remote machine;

a shell extension invoker residing on the local machine and associated with the identified shell extension; and a proxy handler, installed on the remote machine by the remote agent, associated with the identified shell extension, integrating the identified shell extension of the local machine into the desktop environment of the remote machine, receiving a request for access to the shell extension via the desktop environment of the remote machine, and redirecting the received request to the shell extension invoker.

13. The system of claim 12, wherein the remote agent further comprises a file system filter driver intercepting a request for an identification of a handler and responding to the request with an identification of the proxy handler.

14. The system of claim 12, wherein the remote agent further comprises a registry filter driver intercepting a request for an identification of a handler and responding to the request with an identification of the proxy handler.

15. The system of claim 12, wherein the proxy handler further comprises a transceiver receiving a result of executing the shell extension on the local machine.

16. The system of claim 15, wherein the remote agent further comprises means for integrating a display of the result into a desktop environment generated by the remote machine.

17. The system of claim 12, wherein the proxy handler further comprises a transceiver transmitting, to the shell extension invoker, data associated with the request.

18. The system of claim 12, wherein the remote agent further comprises means for registering the proxy handler with a registry on the remote machine.

19. The system of claim 12 further comprising a local agent executing on the local machine and identifying the shell extension associated with the resource provided by the local machine.

20. The system of claim 19, wherein the local agent further comprises means for publishing the identified shell extension.

21. The system of claim 12, wherein the proxy handler further comprises an association with an identified shell extension providing additional functionality in a context menu.

22. The system of claim 12, wherein the proxy handler further comprises an association with an icon handler associating a customized icon with the resource.

23. The system of claim 12, wherein the proxy handler further comprises an association with an identified shell extension providing additional functionality in program execution.

24. The system of claim 12, wherein the proxy handler further comprises an association with an identified shell extension additional functionality in icon overlay.

25. The system of claim 12, wherein the proxy handler further comprises an association with an identified shell extension associating a thumbnail icon with the resource.

26. The system of claim 12, wherein the proxy handler further comprises an association with an identified shell extension providing additional functionality in a menu identifying a drop target.

27. The system of claim 12, wherein the proxy handler further comprises an association with an identified shell extension providing a display of additional information associated with the resource.

* * * * *